(12) United States Patent
De La Cruz et al.

(10) Patent No.: US 11,258,997 B2
(45) Date of Patent: *Feb. 22, 2022

(54) CAMERA-ASSISTED ARBITRARY SURFACE CHARACTERIZATION AND SLOPE-BASED CORRECTION

(71) Applicant: Texas Instruments Incorporated, Dallas, TX (US)

(72) Inventors: Jaime Rene De La Cruz, Carrollton, TX (US); Jeffrey Mathew Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,831

(22) Filed: May 1, 2020

(65) Prior Publication Data

US 2020/0260060 A1 Aug. 13, 2020

Related U.S. Application Data

(63) Continuation of application No. 16/200,614, filed on Nov. 26, 2018, now Pat. No. 10,681,318, which is a
(Continued)

(51) Int. Cl.
*H04N 9/31* (2006.01)
*G06T 7/70* (2017.01)
(Continued)

(52) U.S. Cl.
CPC ......... *H04N 9/3185* (2013.01); *G06T 5/006* (2013.01); *G06T 7/521* (2017.01); *G06T 7/70* (2017.01);
(Continued)

(58) Field of Classification Search
CPC .... H04N 9/3185; H04N 9/3194; G06T 7/521; G06T 7/70; G06T 5/006
(Continued)

(56) References Cited

U.S. PATENT DOCUMENTS 7,970,230 B2  6/2011 Kempf et al.
8,306,350 B2  11/2012 Kempf
(Continued)

*Primary Examiner* — Hai Tao Sun
(74) *Attorney, Agent, or Firm* — Michelle F. Murray; Charles A. Brill; Frank D. Cimino

(57) ABSTRACT

In described examples, structured light elements are projected for display on a projection screen surface. The projected light elements are captured for determining a three-dimensional characterization of the projection screen surface. A three-dimensional characterization of the projection screen surface is generated in response to the displayed structured light elements. An observer perspective characterization of the projection screen surface is generated in response to an observer position and the three-dimensional characterization. A depth for at least one point of the observer perspective characterization is determined in response to depth information of respective neighboring points of the at least one point of the observer perspective characterization. A compensated image can be projected on the projection screen surface in response to the observer perspective characterization and depth information of respective neighboring points of the at least one point of the observer perspective characterization.

22 Claims, 27 Drawing Sheets

Related U.S. Application Data continuation-in-part of application No. 15/813,146, filed on Nov. 14, 2017, now Pat. No. 10,684,537.

(51) Int. Cl.
    *G06T 7/521*    (2017.01)
    *G06T 5/00*    (2006.01)

(52) U.S. Cl.
    CPC ... *H04N 9/3194* (2013.01); *G06T 2207/10016* (2013.01); *G06T 2207/10028* (2013.01)

(58) Field of Classification Search
    USPC ........................................................ 345/581
    See application file for complete search history.

(56) References Cited

U.S. PATENT DOCUMENTS

| | | | |
|---|---|---|---|
| 2002/0061131 A1* | 5/2002 | Sawhney | G06T 7/97 382/154 |
| 2007/0291233 A1* | 12/2007 | Culbertson | H04N 9/3194 353/34 |
| 2011/0157159 A1* | 6/2011 | Chen | H04N 13/111 345/419 |
| 2012/0314031 A1 | 12/2012 | Shotton et al. | |
| 2016/0014385 A1* | 1/2016 | Sano | H04N 9/3194 348/571 |
| 2016/0173841 A1* | 6/2016 | De La Cruz | H04N 9/3194 353/70 |

\* cited by examiner

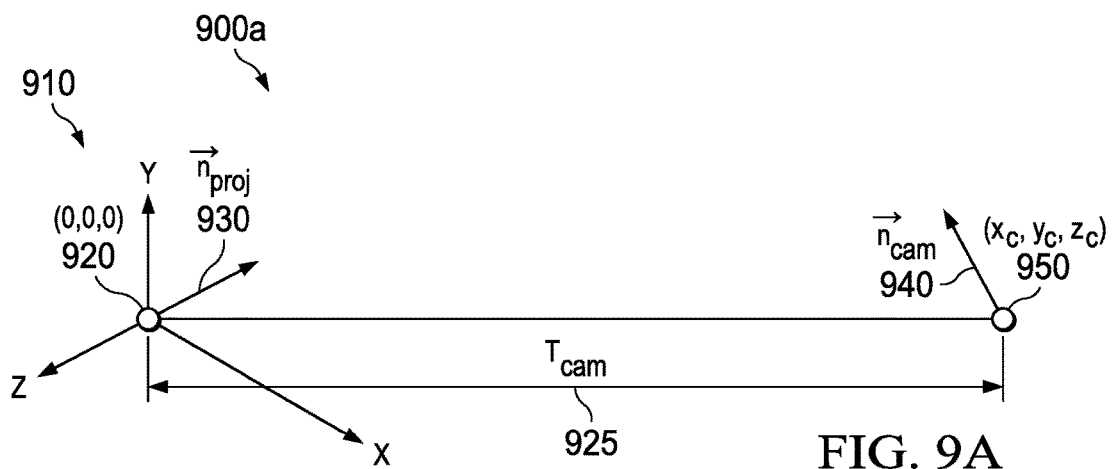
FIG. 9A
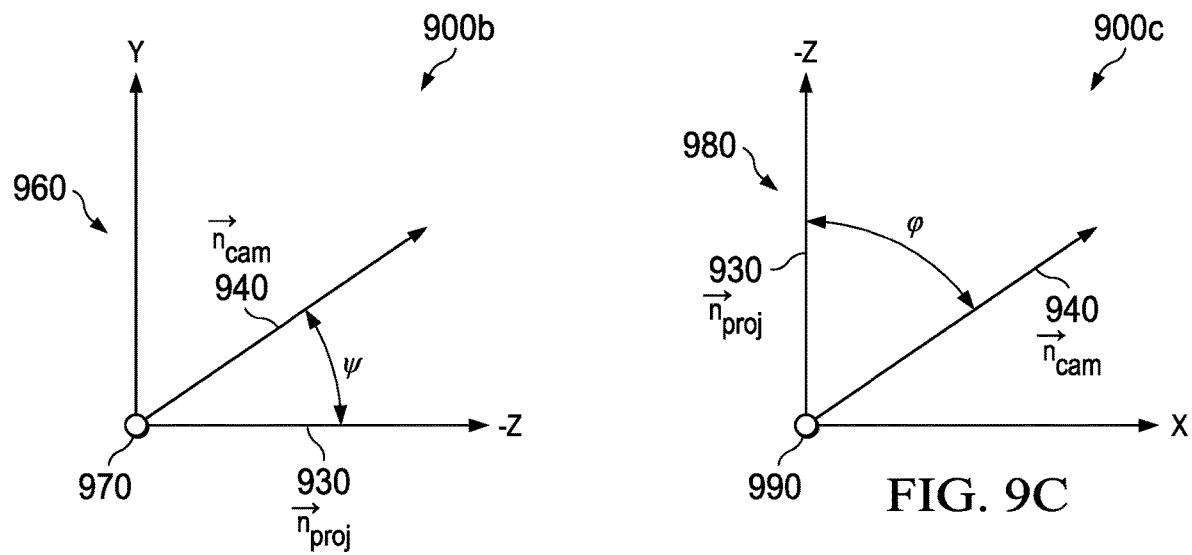
FIG. 9B
FIG. 9C

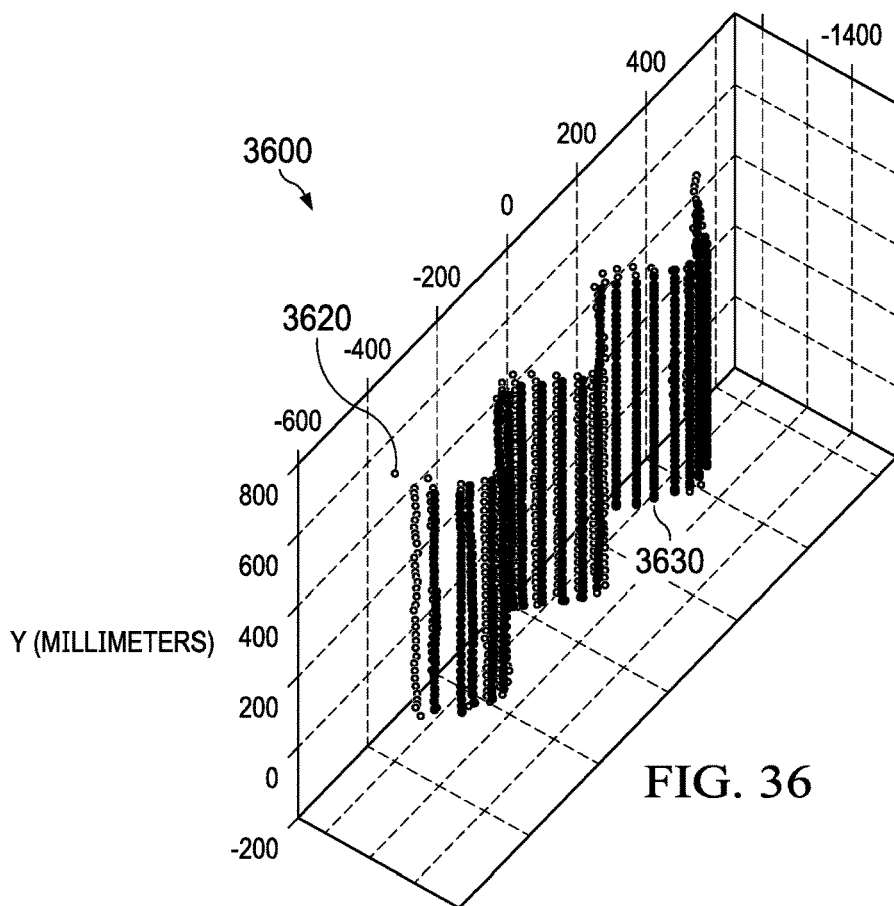
FIG. 36
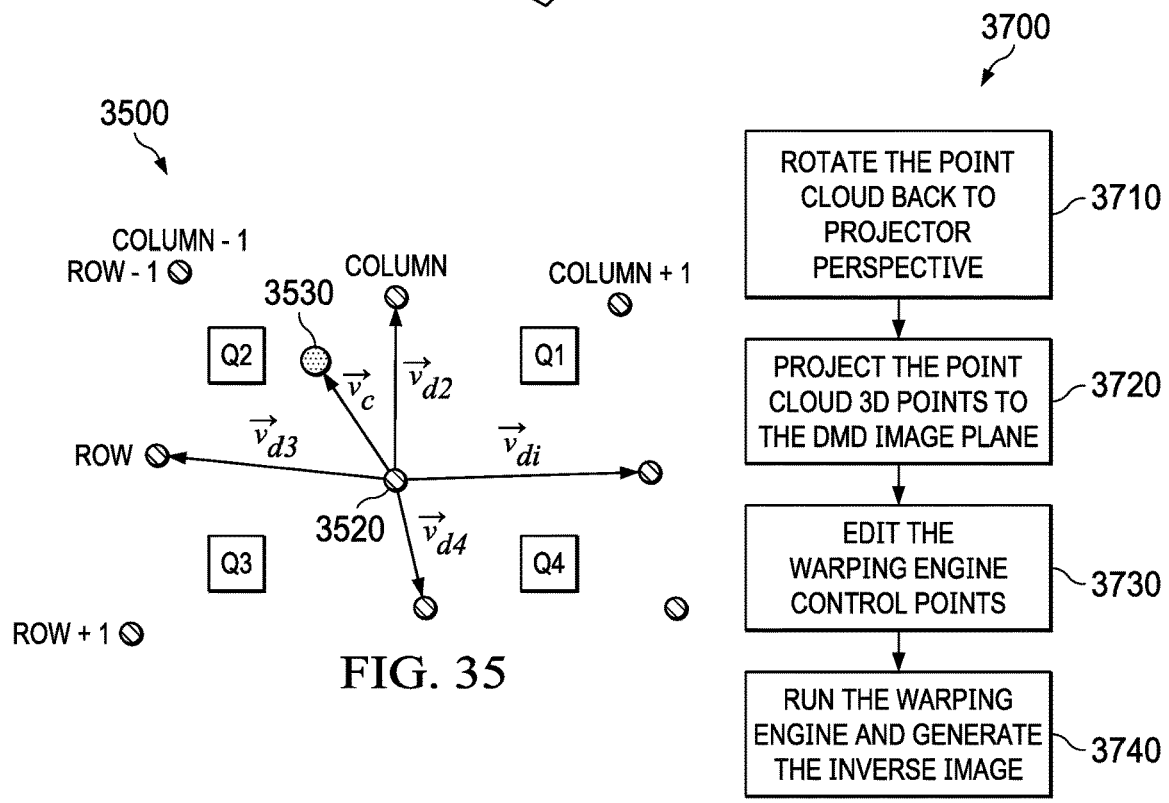
FIG. 35
FIG. 37

CAMERA-ASSISTED ARBITRARY SURFACE CHARACTERIZATION AND SLOPE-BASED CORRECTION

CROSS-REFERENCE TO RELATED APPLICATION

This application is a continuation of U.S. patent application Ser. No. 16/200,614, filed on Nov. 26, 2018, which is a continuation-in-part of U.S. patent application Ser. No. 15/813,146 filed Nov. 14, 2017, which applications are hereby incorporated herein by reference in their entireties.

BACKGROUND

When a projection system projects onto a non-uniform surface, local aspect ratio distortion can occur. For example, surface irregularities of the projection surface can cause the projected image to be distorted as observed from an observer perspective. In addition to screen surfaces being irregular, keystone distortion can occur when the projection optical axis is not perpendicular to the screen. The combination of keystone and projection surface distortion can severely limit the ability of an observer to correctly perceive the projected images.

SUMMARY

In described examples, structured light elements are projected for display on a projection screen surface. The projected light elements are captured for determining a three-dimensional characterization of the projection screen surface. A three-dimensional characterization of the projection screen surface is generated in response to the displayed structured light elements. An observer perspective characterization of the projection screen surface is generated in response to an observer position and the three-dimensional characterization. A depth for at least one point of the observer perspective characterization is determined in response to depth information of respective neighboring points of the at least one point of the observer perspective characterization. A compensated image can be projected on the projection screen surface in response to the observer perspective characterization and depth information of respective neighboring points of the at least one point of the observer perspective characterization.

BRIEF DESCRIPTION OF THE DRAWINGS

FIG. 9A is an orthographic perspective view of a geometry showing a translation parameter for system calibration of extrinsic system camera and projector parameters.

FIG. 9B is an orthographic perspective view of a geometry showing a first rotational parameter for system calibration of extrinsic system camera and projector parameters.

FIG. 9C is an orthographic perspective view of a geometry showing a second rotational parameter for system calibration of extrinsic system camera and projector parameters.

FIG. 35 is a diagram of a corrected-point locator vector extending from an uncorrected closest point from which four directional vectors point to uncorrected points for defining four quadrilaterals in an observer perspective x-y plane.

FIG. 36 is a perspective view of a system geometry of a 3D point cloud and a compensated-depth 3D point cloud.

FIG. 37 is a flow diagram for transforming the points of the compensated-depth 3D point cloud from the observer perspective to the projector perspective for warping engine input.

DETAILED DESCRIPTION

Figure 1A:
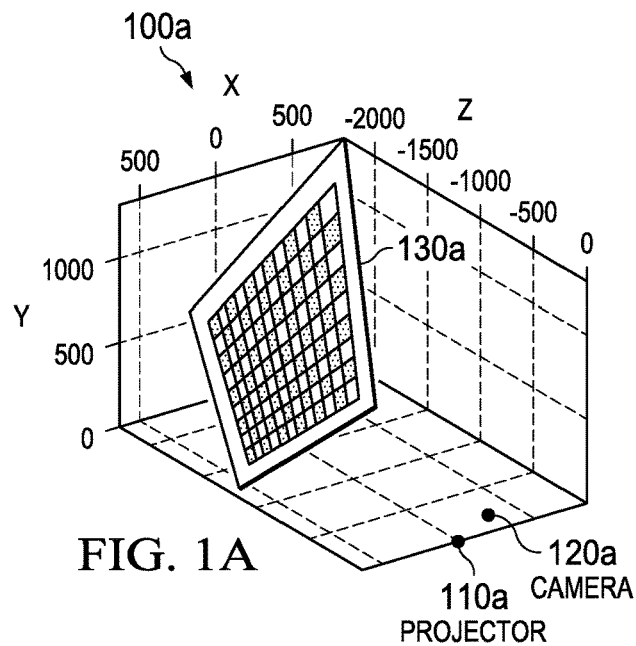
FIG. 1A is a perspective view of a system geometry of a projector and a keystoned screen for displaying an image projected thereupon.

In this description: (a) the term "portion" can mean an entire portion or a portion that is less than the entire portion; (b) the terms "angles" and "coordinates" can overlap in meaning when geometric principles can be used to convert (or estimate) values or relationships therebetween; (c) the term "screen" can mean any surface (whether symmetrical or asymmetrical) for displaying a portion of a projected image; (d) the term "asymmetric" can mean containing non-planar features (e.g., notwithstanding any other symmetrical arrangement or property of the non-planar features); (e) the term "non-planar" can mean being non-planar with respect to a plane perpendicular to an axis of projection or observation (for viewing or capturing images); and (f) the term "correction" can mean a partial correction, including compensation determined in accordance with an asymmetrical screen surface.

Correcting keystone and projection surface distortion includes scaling or warping an image and/or video to be scaled or warped before projection so a rectangular image is perceived by an observer. Unlike keystone distortion, which can be parameterized in the form of screen rotation angles and manually corrected by users, manual surface correction for projection on irregular surfaces is extremely difficult, if not virtually impossible, for a novice observer to successfully accomplish. For example, arbitrary non-planar projection surfaces/screens cannot be easily parameterized (e.g., be represented as a set of geometric equations), especially by novice observers.

A camera-assisted arbitrary surface characterization and correction process and apparatus are described hereinbelow. The described process for arbitrary surface characterization and correction implicitly corrects for incidental keystoning and arbitrary screen features (e.g., including arbitrary surface irregularities). The process includes generating an accurate characterization of the projection screen in response to a geometry of components of the projection system and an observer location. The described camera assisted and structured light-based system accurately determines the distance, position, shape and orientation of features of the projection and stores the determined characteristics as a 3D point cloud (a three-dimensional point cloud for characterizing the projection screen surface). Control points for determining an inverse image are created in response to the projection screen surface 3D point cloud so an observer located at a determined position perceives a rectangular image on the projection surface. Accordingly, the projected inverse image compensates for the otherwise apparent distortion introduced by the projection surface. The described camera assisted and structured light-based system can also correct for any keystone distortion.

The perspective transformations between the camera and the projector are analytically based (e.g., rather than numerically processed in response to user estimations and measurements), which increases the accuracy of results determined for a particular system geometry and reduces the iterations and operator skill otherwise required for obtaining satisfactory results. Iterative (and time-consuming) user-assisted calibration routines can be avoided because system geometry (such as relative screen offset angles) are implicitly determined by planar and non-planar homographic transformations performed in response to camera-provided input (e.g., which reduces or eliminates user intervention otherwise involved).

Example embodiments include dual-camera systems for minimizing the effects of tolerances occurring in projector manufacturing. For example, the dual-camera systems can include projection, image capturing and analysis of structured light patterns for correcting for manufacturing tolerances and for reducing the amount of calibration for a projector and projection system, which also lowers costs.

The compensation process described hereinbelow includes both projecting and detection of sparse structured light pattern elements, which greatly reduces an often-large amount of image processing for accurately characterizing a non-planar correction surface. The detection and analysis of sparse structured light pattern elements can also reduce the implemented resolution and cost of a digital camera (e.g., built-in or coupled to the projector), which greatly reduces the number of computations for characterizing a screen surface. Accordingly, various embodiments can be imbedded as embodied within an ASIC (application-specific integrated circuit).

The described compensation process includes three-dimensional interpolation and extrapolation algorithms for estimating projection screen surface 3D data for substituting for missing portions of the projected spare structured light pattern elements not captured by the camera (e.g., due to ambient light and other sources of noise). The estimation of uncaptured data points increases the robustness of the described process (which is able to operate in a wide variety of ambient light conditions).

Accordingly, predetermined information about the projection surface is not necessarily required by the described compensation process, which determines a system geometry for reducing distortion introduced by the projection screen surface geometries without requiring calibration input operations by the end-user.

FIG. 1A is a perspective view of a system geometry of a projector and a keystoned screen for displaying an image projected thereupon. In an example geometry 100a, a projector 110a is arranged to project an image onto a screen 130a, which is non-perpendicular to the projector 110a. When the projector 110a is arranged to project an image onto the screen 130a (which is not perpendicular to the z-axis, for example), distortion occurs so the screen 130a image appears distorted with respect to the image for projection. As described hereinbelow, the camera 120a is arranged for automatically capturing a view of the screen 130a image for geometric compensation determination.

Figure 1B:
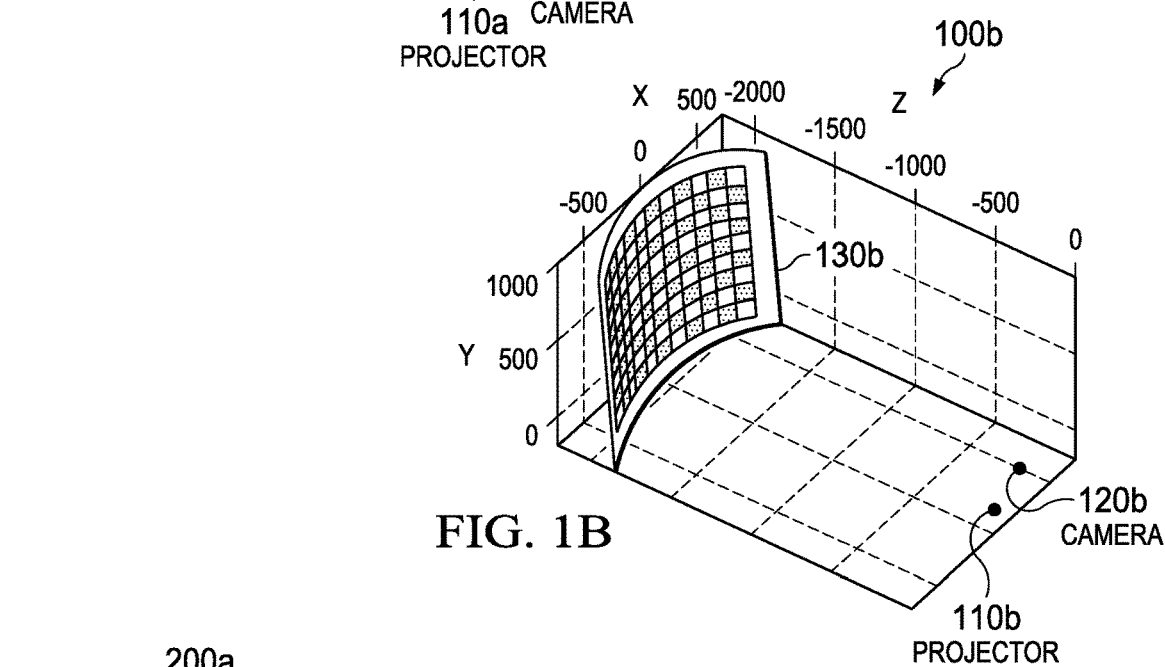
FIG. 1B is a perspective view of a system geometry of a projector and a non-planar screen for displaying an image thereupon.

FIG. 1B is a perspective view of a system geometry of a projector and a non-planar screen for displaying an image thereupon. In an example geometry 100b, a projector 110b is arranged to project an image onto a screen 130b, which is non-planar. When the projector 110b is arranged to project an image onto the screen 130b (which is curved, for example), distortion occurs so the screen 130b image appears distorted with respect to the image for projection. As described hereinbelow, the camera 120b is arranged for automatically capturing a view of the screen 130b image for geometric compensation determination.

Figure 2A:
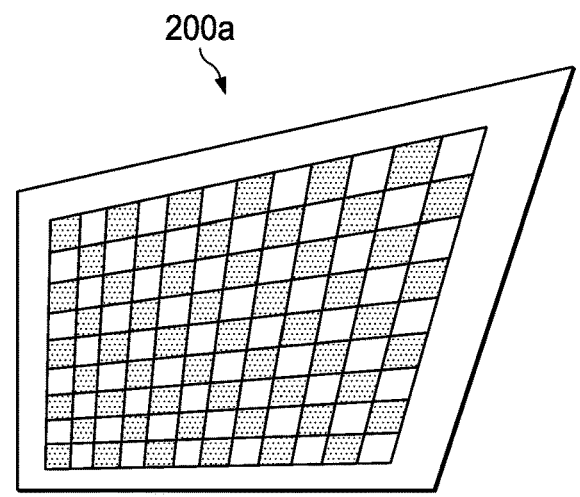
FIG. 2A is a front view of a keystoned-distorted image as observed from the perspective of an observer before correction.

FIG. 2A is a front view of a keystoned-distorted image as observed from the perspective of an observer before correction. The keystoned image 200a is keystoned along two dimensions. To the observer, the keystoned image 200a appears non-rectilinear (e.g., non-rectangular), especially with respect to the quadrilateral defining the outer margins of the image 200a.

Figure 2B:
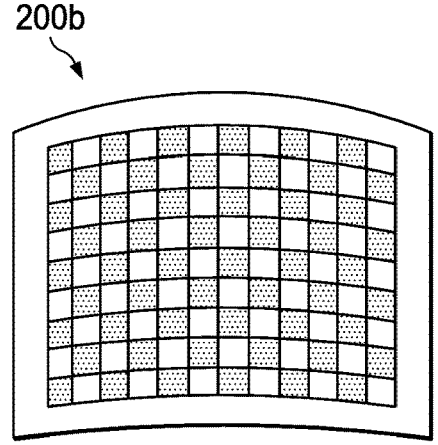
FIG. 2B is a front view of a warped-distorted image as observed from the perspective of an observer before correction.

FIG. 2B is a front view of a warped-distorted image as observed from the perspective of an observer before correction. To the observer, the image 200b appears curved and/or warped, so the entire image 200b and/or portions of the image 200b appear to be distorted with respect to a true image conceptualized by the observer. The distortion induced by the keystoning and the distortion induced by the warped projection screen surface can both contribute to the distortion of a single projected image (e.g., when the projection screen surface is both warped and keystoned with respect to the projector).

Distortion results when a digital projector (e.g., 110a or 110b) projects images onto a non-perpendicular projection surface (e.g., 130a) and/or non-planar (e.g., 130b). The resulting distortion often can lead to cognitive incongruity (e.g., in which a viewed image does not agree with an image expected by an observer). Accordingly, the distortion degrades the viewing experience of an observer. Both asymmetrical and non-perpendicular screen surfaces can cause local aspect-ratio distortion in which subportions of the projected image appear deformed and non-rectangular with respect to the rest of the displayed image projected image. Such distortion affects the ability of observers to correctly perceive information from projected images so the user experience of observing the image is adversely impacted.

In contrast to planar keystone distortion (which can often be avoided by aligning a projector with a projection surface until a rectangular image is observed), geometric compensation determination can be automatically (and quickly) determined for asymmetrical surface distortion resulting from projection of an image upon a non-planar (or otherwise asymmetrical) fixed screen. The geometries and processes for such geometric compensation are described hereinbelow.

Figure 3:
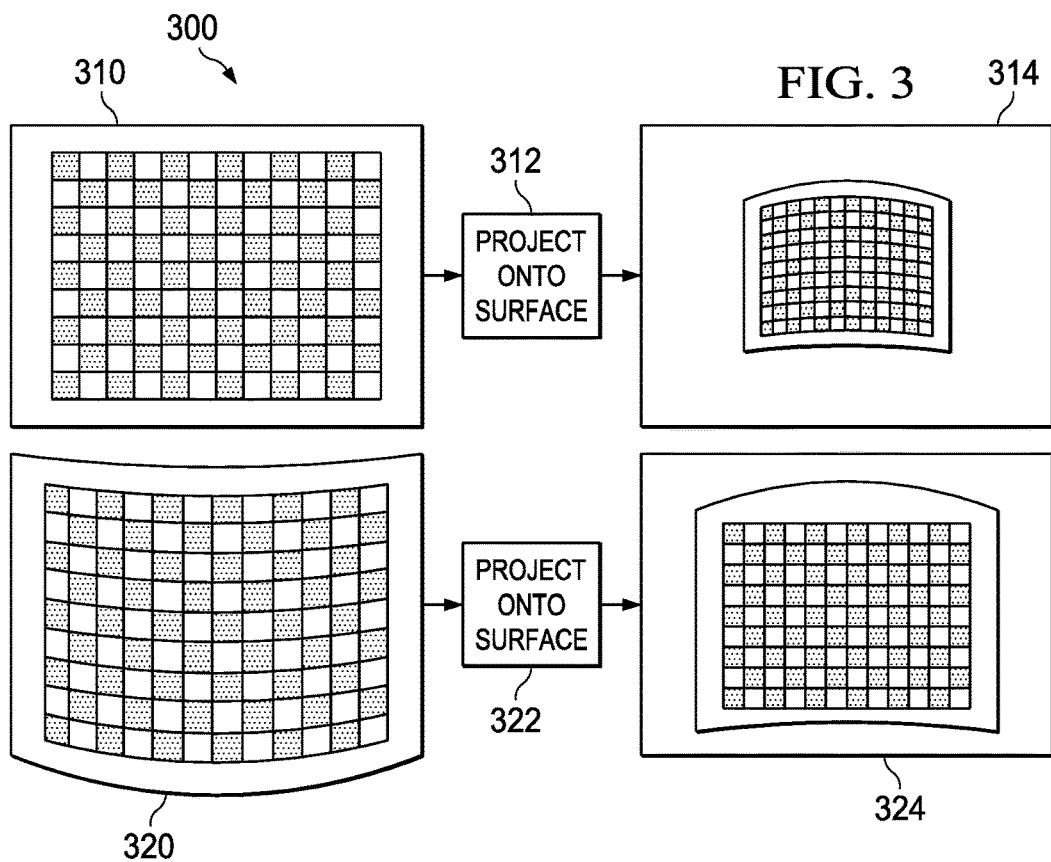
FIG. 3 is a process flow diagram of an overview of camera-assisted asymmetric characterization and compensation.

FIG. 3 is a process flow diagram of an overview of camera-assisted asymmetric characterization and compensation. Compensation (including correction) for surface distortion upon an asymmetric screen is a computationally intensive task. Correction for surface distortion includes applying a very precise transform to (e.g., pre-warping of) an input image so when the input image is projected upon the surface, an observer (usually located in a position perpendicular to the projection surfaces) perceives an undistorted rectangular image apparently displayed with an appropriate aspect ratio.

A projection screen surface characterization is generated by determining the surface topography of asymmetric screen in three-dimensional space. The projection screen surface characterization is a detailed (e.g., pointwise) characterization of the projection surface. For example, the projection screen surface characterization includes parameters such as position, shape and orientation with respect to the screen surface. The projection screen surface characterization information (e.g., stored as a "3D point cloud") is combined with information about the position of the observers to generate a pre-warped (or otherwise compensated in an inverse manner) image for projection and display upon the characterized projection screen surface. The pre-warping tends to reduce (if not virtually eliminate) any observed distortion of the displayed projected pre-warped image when observed from a determined position of an observer.

In flow 300, an image for projection is obtained in 310. In 312, the image for projection is projected onto an asymmetric screen surface (which can be one or both of non-planar and keystoned). In 314, a camera (e.g., camera 120a and/or 120b) captures the displayed projected image as distorted by the asymmetric screen surface. In 320, an image to be corrected is "pre-warped" (e.g., corrected for projection) by adjusting pixels within the image to values inversely correlated with corresponding pixels of a screen surface characterization of the asymmetric screen. (The image to be pre-warped need not be the same image used for generating the screen surface characterization.) In 322, the pre-warped image for projection is projected onto the asymmetric screen surface. In 324, the pre-warped image displayed on the asymmetric screen appears to be similar to the original (or similar to an image conceptualized by the observer), so many, if not all, of the distortions are compensated for and the viewing experience is enhanced (e.g., as compared with a projection of an image that is not pre-warped).

Figure 4:
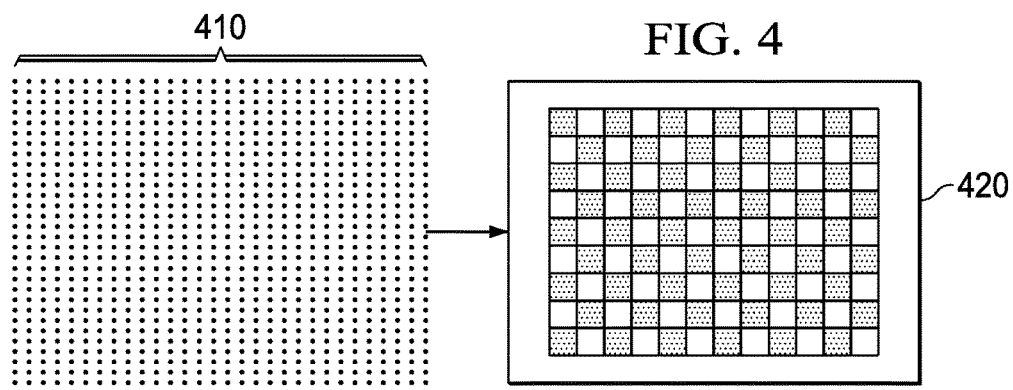
FIG. 4 is an image of rectilinear control points for automatic projection screen surface characterization.

FIG. 4 is an image of rectilinear control points for automatic projection screen surface characterization. The control points 410 are a set of points associated with respective predetermined control points of a warping engine (described hereinbelow with respect to FIG. 50) for localized image scaling. Assuming, for the sake of an example, the control points 410 are determined in response to the screen surface characterization of a non-keystoned, planar screen, an output image 410 of a checkerboard image 420 retains the rectilinear appearance of the original image when projected on the non-keystoned, planar screen.

Figure 5:
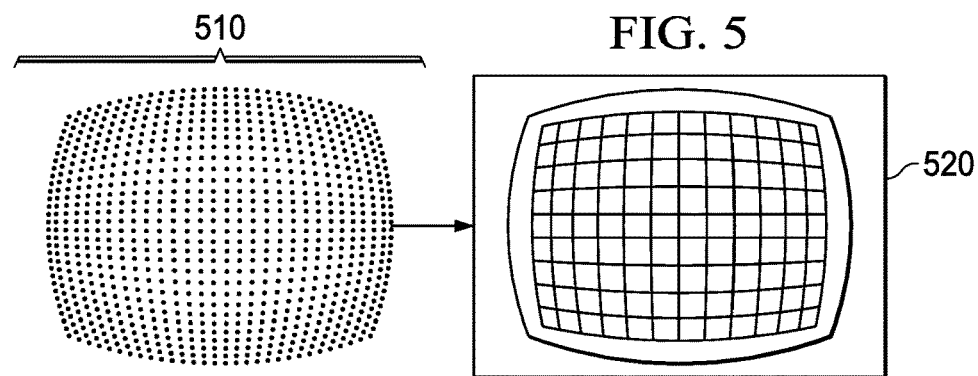
FIG. 5 is an image of asymmetric control points for screen surface characterization.

FIG. 5 is an image of asymmetrically arranged control points for screen surface characterization. The control points 510 are derived from the topology of an asymmetrical screen surface, which is generally convex. Assuming, for the sake of an example, the control points 510 are determined in response to the screen surface characterization of the convex screen, a grid image 520 loses the rectilinear appearance of the original image when projected on the convex screen. The control points 510 are for localized control over progressively scaled portions of an image to be projected on a keystoned and/or non-planar screen. The grid image to be projected is pre-warped (e.g., transformed) in accordance with an inverse function the control points 510 so the projected image (from a selected observer location) retains a rectilinear appearance (similar to the appearance of the checkerboard image 420) when projected on the convex screen.

Each point of the set of control points 410 and 510 defines a localized, progressive degree of warping for warping images by a warping engine for camera-assisted asymmetric characterization and correction. Because image warping is processed in response to each of the control points, various portions of an image to be pre-warped can be warped locally (e.g., with respect to other non-adjacent control points). Because warping can be accomplished with localized portions of an image, highly complex images can be generated in response to screens having highly asymmetric surfaces. While each one of the control points could be manually moved by a human operator, such manual movement of individual control points for the generation of highly complex warped images would be excessively time consuming and tedious (and often resulting in errors). Further, the number of such control points increases quadratically as resolution images increase (where the manual input of the increased numbers of control points by an observer increases input time and the probability of errors).

In contrast, the warping engine for camera-assisted asymmetric characterization and correction includes automated methods for defining the warping engine control points without otherwise requiring input from the user. In accordance with various embodiments, a single camera system, or a dual-camera system, can be used for analyzing and generating screen surface characterizations of asymmetric screens.

Figure 6:
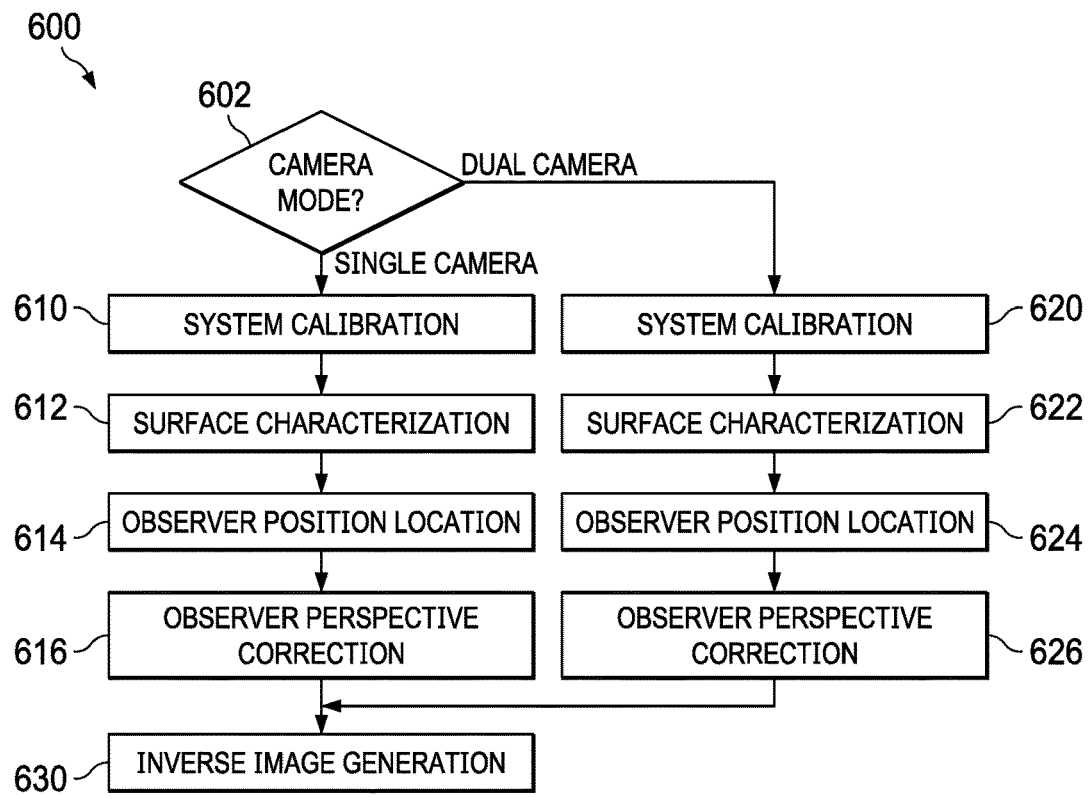
FIG. 6 is a flow diagram for single and dual camera-assisted asymmetric characterization and correction.

FIG. 6 is a flow diagram for single and dual camera-assisted asymmetric characterization and correction. The distortion of images projected by a projection system caused by non-planar and other complex non-smooth projection surfaces can be corrected for with the aid of a digital camera (which can be affixed or networked to the projection system itself). The correction of such distortions includes transformations of images in response to accurate screen surface characterization and optimizations in response to observer location.

Various embodiments include a single-camera or dual-camera systems as described hereinbelow. Various embodiments of dual-camera systems can optionally perform functions described herein with respect to a single-camera system embodiment.

In general, flow 600 includes operation 602 in which a determination is made between a single-camera mode and a dual-camera mode. When the determination is made for a single-camera mode, the process flow proceeds through operation 610 (system calibration), operation 612 (surface characterization), operation 614 (observer position location), operation 616 (observer perspective correction) and operation 630 (inverse image generation). When the determination is made for a dual-camera mode, the process flow proceeds through operation 620 (system calibration), operation 622 (surface characterization), operation 624 (observer position location), operation 626 (observer perspective correction) and operation 630 (inverse image generation). Accordingly, as a whole, the described process flow 600 comprises two main processing branches: single and dual camera modes.

While the various operations of the process flow for the single-camera system and the process flow from the dual-camera system are similar in name and function, certain details can vary between respective operations. Accordingly, the various operations of the various flows can share code between modes as well as having unique code for execution in a particular mode of operation.

The five described operations for each mode are subsequently described below in greater detail. Operation in a single-camera mode is described below with respect to FIG. 7 through FIG. 40, whereas operation in a dual-camera mode is described below with respect to FIG. 41 through FIG. 49.

Figure 7:
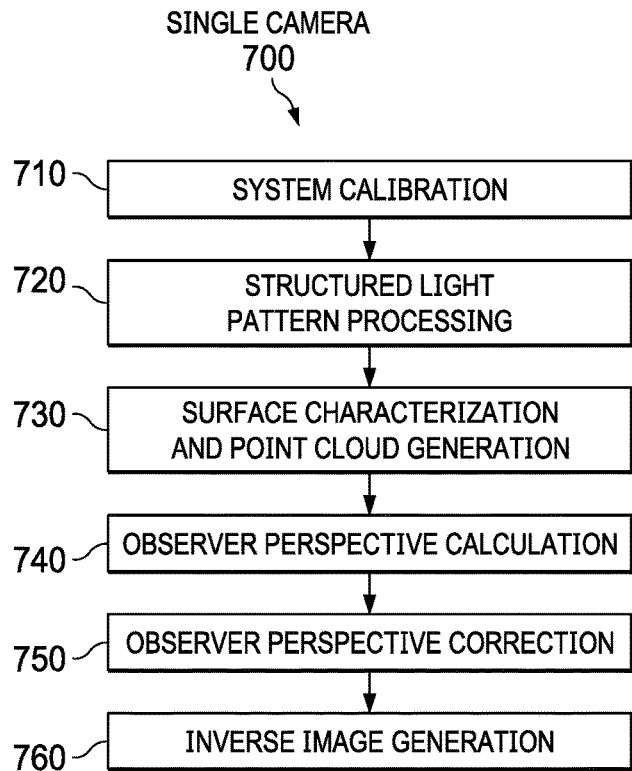
FIG. 7 is a flow diagram for single-camera-assisted projection screen surface characterization and correction.

FIG. 7 is a flow diagram for single-camera-assisted projection screen surface characterization and correction. In the single-camera mode of operation, at least one single digital camera is mechanically and/or electronically coupled to the projection system (e.g., including a digital DLP® projector). A second camera can be coupled to the projection system, albeit unused or partially used, in the single-camera mode.

The flow of single-camera mode process 700 begins in 710, where the projection system is calibrated by camera-projector calibration techniques in accordance with a pinhole camera model. Pinhole camera-based system calibration is described hereinbelow with respect to FIG. 8 and FIG. 9.

In 720, the projection screen surface is characterized by capturing information projected on the projection screen surface. For example, sparse discrete structured light patterns are projected by the projector upon a projection screen surface in sequence and captured by the camera. The sparse discrete structured light patterns include points for representing the pixels of maximum illumination wherein each point can be associated with the peak of a Gaussian distribution of luminance values. The positions of various points in the sparse discrete structured light patterns in the captured frames are skewed (e.g., shifted) in response to non-planar or keystoned portions of the projection screen surfaces. The captured camera frames of the structured light patterns can be stored in an embodying ASIC's memory for processing and for generation of the three-dimensional point cloud (3D point cloud) for characterizing the projection screen surface. The structured light pattern processing is described hereinbelow with respect to FIG. 10 through FIG. 13.

In 730, the projection screen surface is characterized in accordance with optical ray intersection parameters (such as shape, distance and orientation with respect to the projector optical axis). The projection screen surface is characterized, for example, and stored as points of the 3D point cloud. Accordingly, the 3D point cloud includes data points for modeling the screen surface from the perspective of the projector. The projection screen surface characterization is described hereinbelow with respect to FIG. 14 through FIG. 22.

In 740, the observer position coordinates can be determined in various ways: retrieved from storage in the ASIC memory; entered by the observer at run-time; or determined at run-time in response to triangulation of points of a displayed image. The observer position coordinates can be determined by analysis of (e.g., triangulation of) displayed images captured by a digital camera in a predetermined spatial relationship to the projector. When the observer position is determined by triangulation, the observer position is assumed to be perpendicular to the projection screen (and more particularly, the orientation of the observer can be presumed to be perpendicular to a best fitted plane passing through the points in the 3D point cloud). The calculations for determining an observer perspective are described hereinbelow with respect to FIG. 23 through FIG. 29.

In 750, the three-dimensional points of the 3D point cloud are rotated and translated to internally model what an observer would perceive from the observer position. With the perspective of the observer being determined, points in the 3D point cloud are rearranged to form (e.g., in outline form) a rectangular shape with the correct aspect ratio. The correction of points in the 3D point cloud is described hereinbelow with respect to FIG. 30 through FIG. 36.

In 760, the rearranged points are transformed (e.g., rotated back) to the projector perspective for input as warping points to the warping engine. The warping engine generates warped (e.g., inverse) image in response to the warping points. Processing for the inverse image generation is described hereinbelow with respect to FIG. 37 through FIG. 40.

Figure 8A:
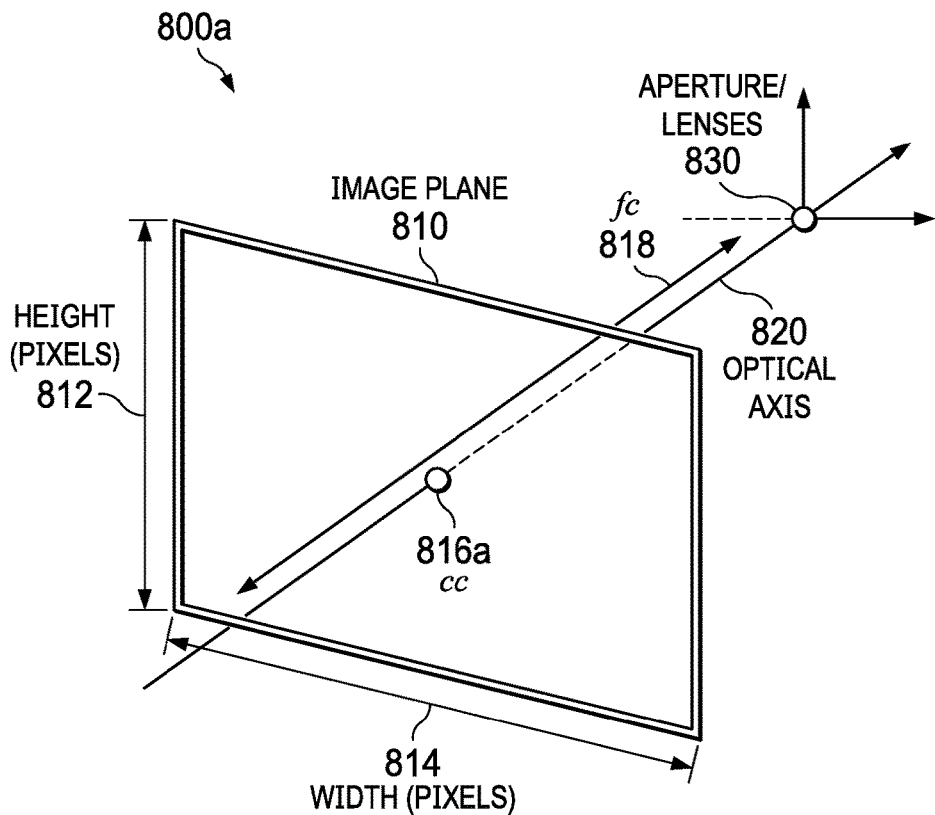
FIG. 8A is an orthographic perspective view of a geometry for system calibration of intrinsic system camera parameters.
Figure 8B:
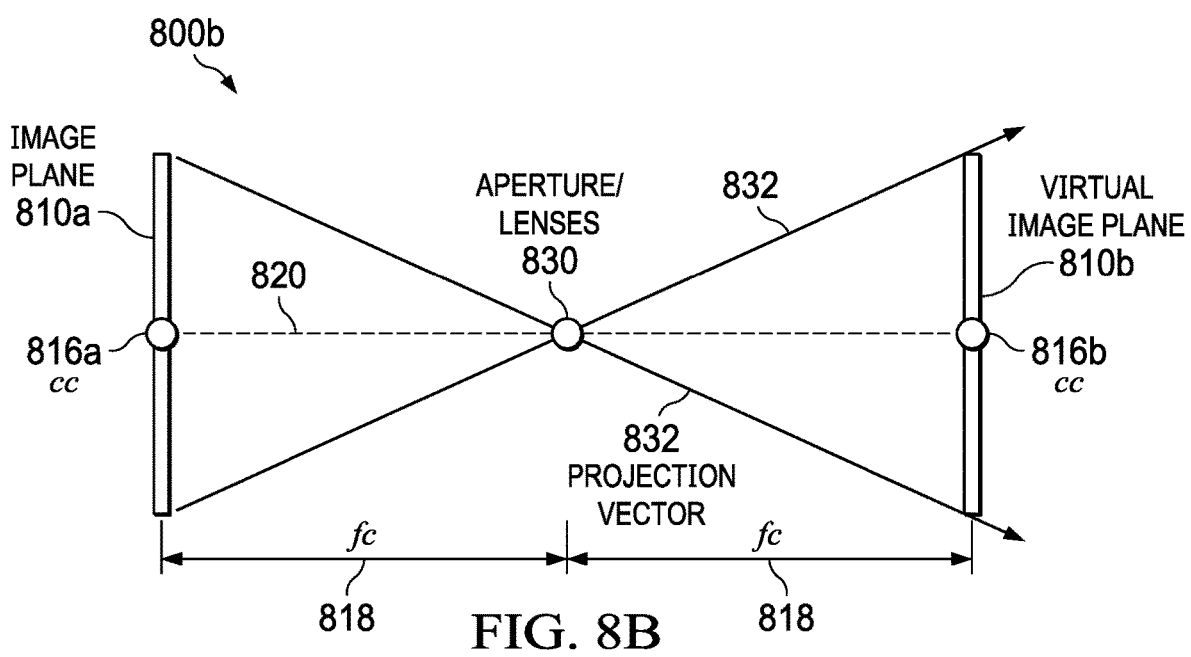
FIG. 8B is a section view of a geometry for system calibration of intrinsic projector parameters.

With reference to 710 again, camera-projector calibration data is obtained (in the single camera mode). Camera-projector calibration is in response to a simple pinhole camera model, which includes the position and orientation of the optical rays for single camera-assisted asymmetric characterization and correction. In the pinhole camera model, the following parameters can be determined: focal length (fc), principal point (cc), pixel skew ($\alpha_c$) and a distortion coefficients vector ($k_c$). Two sets of parameters are determined, one set for the camera and a second set for the projector (which is modeled as an inverse camera). FIG. 8A and FIG. 8B summarize a pinhole camera model for each of the camera and the projector.

FIG. 8A is an orthographic perspective view of a geometry for system calibration of intrinsic system camera parameters. In general, geometry 800a is a summary of a pinhole camera model of a camera for single camera-assisted asymmetric characterization and correction. The geometry 800a includes an image plane 810 characterized by a height 812 and a width 814 in which the height 812 and the width 814 are usually expressed as pixels. The image plane 810 includes the principal point (cc) 816a through which an optical axis 820 passes. The optical axis 820 is perpendicular to the image plane 810 and is perpendicular to the aperture/lenses 830 of a projector for projecting an image of the image plane 810. The image plane 810 is separated from the aperture/lenses 830 by a focal length (fc) 818.

FIG. 8B is a section view of a geometry for system calibration of intrinsic projector parameters. In general, geometry 800b is a summary of a pinhole camera model of a projector for single camera-assisted asymmetric characterization and correction. The geometry 800b includes an image plane 810a including projection vectors 832 for extending outwards from each pixel of the image plane 810a. The projection vectors 832 converge on a virtual pinhole point associated with the aperture/lenses 830 of the projector. The projecting vectors 832 further intersect a virtual image plane 810b so the virtual image plane 810b is inverted and reversed with respect to the image plane 810a. Both the image plane 810a and the virtual image plane 810b include a respective principal point (cc) through which an optical axis 820a passes. The optical axis 820a is perpendicular to both the image plane 810a and the virtual image plane 810b. The image plane 810a is separated from the aperture/lenses 830 by a focal length (fc) 818 and the aperture/lenses 830 is separated from the virtual image plane 810b by the focal length (fc) 818.

The intrinsic camera/projector parameters characterize information about the camera/projector internal geometry. Accordingly, a system for single-camera-assisted asymmetric characterization and correction is calibrated in accordance with a first set of intrinsic parameters for the camera and a second set of intrinsic parameters for the projector. In contrast, extrinsic parameters are determined for describing the relative position and orientation of the camera with respect to the projector's optical axis. The camera/projector system extrinsic parameters (described hereinbelow) include the translation vector (the distance $T_{cam}$ from the projector to the camera in millimeters) and the rotation matrix (including the angles $\psi$ and $\varphi$) of the camera with respect to the projector.

As shown in FIG. 9A for example, the projector is assumed to be centered at the origin (0,0,0) and the optical axis (e.g. normal vector) of the projector is assumed to point towards the negative-z axis. The camera normal vector is positioned at a distance (e.g., modeled by the translation vector) from the origin and is oriented differently with respect to the orientation of the projector. FIGS. 9A, 9B and 9C show extrinsic calibration parameters.

FIG. 9A is an orthographic perspective view of a geometry showing a translation parameter for system calibration of extrinsic system camera and projector parameters. In general, geometry 900a includes a center of the projector 920 positioned at the origin (0,0,0) and having an orientation 910 defined by the x, y and z axes. The projector normal vector 930 $\vec{n}_{proj}$ is oriented in the opposite direction of the z axis. A center of the camera 950 is positioned at the point $(x_c, y_c, z_c)$ and includes a camera normal vector 940 $\vec{n}_{cam}$. The center of the camera 950 is offset from the center of the projector 920 by the offset distance 925 $T_{cam}$, which extends from point 920 (0,0,0) to point 950 $(x_c, y_c, z_c)$. In addition to the translation, first rotation and second rotation parameters describe orientation of the camera with respect to corresponding axes of the projector.

FIG. 9B is an orthographic perspective view of a geometry showing a first rotational parameter for system calibration of extrinsic system camera and projector parameters. In general, geometry 900b includes the projector normal vector 930 $\vec{n}_{proj}$ (oriented in the opposite direction of the z axis), which intersects the y axis at point 970. The projector normal vector 930 $\vec{n}_{proj}$ and the y axis define a first plane 960 (e.g., in which they and z axes lie). The camera normal vector 940 $\vec{n}_{cam}$ also intersects the point 970 and includes a first rotation ψ from the projector normal vector 930 $\vec{n}_{proj}$, where the first rotation ψ is within the first plane. A second rotation of the camera normal vector 940 $\vec{n}_{cam}$ is described with reference to FIG. 9C.

FIG. 9C is an orthographic perspective view of a geometry showing a second rotational parameter for system calibration of extrinsic system camera and projector parameters. In general, geometry 900c includes the projector normal vector 930 $\vec{n}_{proj}$ (oriented in the opposite direction of the z axis), which intersects the x axis at point 990 (where the projector normal vector 930 and the x axis define a second plane 980). The camera normal vector 940 $\vec{n}_{cam}$ also intersects the point 990 and includes a second rotation φ from the projector normal vector 930 $\vec{n}_{proj}$, where the second rotation α is rotated within the second plane.

The translation vector 925$T_{cam}$ is the distance from the camera center 920 $(x_c, y_c, z_c)$ to the origin 950 (0,0,0) and can be expressed in millimeters. The rotation matrix $R_{cam}$ (which includes the first rotation ψ and the second rotation φ) accounts for the relative pitch, yaw and roll of the camera normal vector $\vec{n}_{cam}$ with respect to the projector normal vector (e.g., the optical axis $\vec{n}_{proj}$). Both intrinsic and extrinsic parameters can be obtained by iterative camera calibration methods described hereinbelow. The calibration data can be stored in a file in ASIC memory and retrieved in the course of executing the functions described herein.

With reference to 720 again, sparse discrete structured light patterns are displayed by the projector in temporal sequence, where each projected and displayed pattern is captured by the camera and processed (in the single camera mode). Discrete and sparse structured light patterns are used to establish a correlation between the camera and the projector: the correlation is determined in response to the positions of the structured light elements in both the projected (e.g., undistorted) and captured (e.g., distorted by an asymmetric non-planar screen) images.

As introduced above, the warping engine provides a set of discrete control points for warping an image distributed over an entire programmable light modulator (imager) such as a digital micromirror device (DMD) for DLP®-brand digital light projection. Individual portions of the image for projection can be moved/edited to warp the input image (e.g., to correct for surface distortion) before the DMD is programmed with the pre-warped image for projection. The number of points in the 3D point cloud (which includes projection screen surface spatial information) is usually the same as the number of (e.g., usable) control points in the warping engine. Accordingly, the position of each of the structured light pattern elements corresponds with a respective position of a warping engine control point (e.g., because the projection screen surface is characterized at locations corresponding to a respective warping engine control points).

Figure 10:
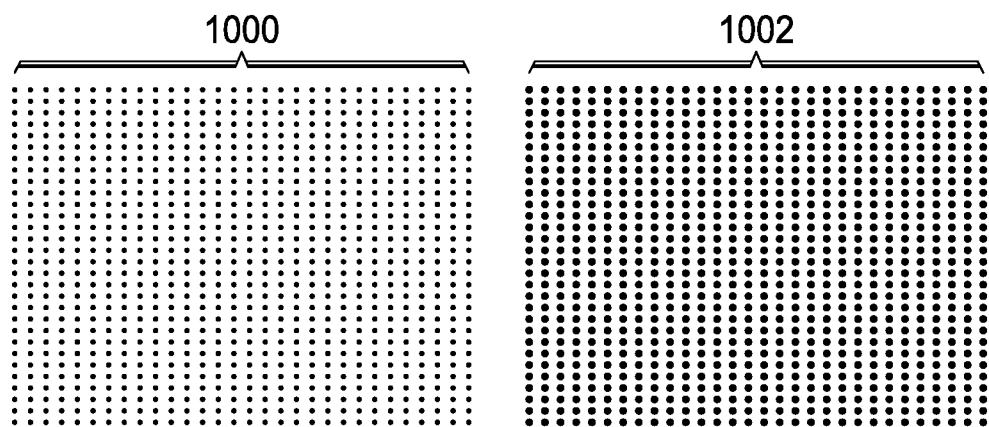
FIG. 10 is an image of a correspondence between warping engine control points and structured light elements for screen surface characterization.

FIG. 10 is an image of a correspondence between warping engine control points and structured light elements for screen surface characterization. For example, the warping engine control points 1000 are congruent in a one-to-one spatial relationship to the structured light elements 1002. The screen surface (for displaying an image projected thereupon) is characterized at the locations in which each point of the structured light elements 1002 are projected. In the example, the structured light elements 1002 are 2D Gaussian functions (e.g., in which pixels increase in luminance when approaching a centroid), which are represented in FIG. 10 as dots.

Given the discrete and relatively sparse nature of the warping engine control points (e.g., in which a single warping engine control point is used to warp multiple pixels in a local area), the correspondence between the camera and projector image planes is usually determined (e.g., only) at the structured light elements positions. The structured light elements are projected, captured and processed to establish the camera-projector correspondence. Sparse structured light patterns such as circles, rectangles or Gaussians (such as mentioned above) can be more rapidly processed as compared with processing other more complex structured light patterns (e.g., sinusoidal and De Bruijn sequences). Additionally, because of the degree of ambient light in a usual projection environment (e.g., which ranges from complete darkness to varying degrees of ambient light), bright elements over a dark background can be relatively easily identified and noise minimized.

Determining the correspondence between the camera and projector includes matching the positions (e.g., the centroids) of structured light elements from each projected pattern to each camera-captured patterns. Accordingly, a correspondence is determined in which each element in the projected image corresponds to a respective element displayed and captured in the camera image plane. While the element centroids in the projected image are known (e.g., the initial positions of the warping engine control points are normally predetermined), the elements centroids in the camera-captured image are unknown (e.g., due to being skewed by projection for display on an asymmetric surface). The determination of the centroids correspondence is normally computationally intensive.

Figure 11:
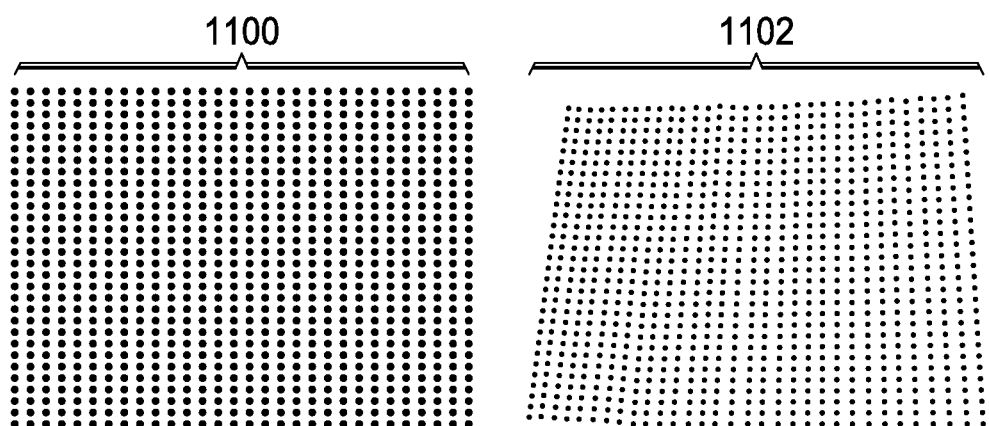
FIG. 11 is an image showing an asymmetric correspondence between warping engine control points and captured structured light elements for screen surface characterization.

FIG. 11 is an image showing an asymmetric correspondence between warping engine control points and captured structured light elements for screen surface characterization. For example, a pattern 1100 is projected for display on an asymmetric screen surface. The image observed and/or captured (e.g., the displayed image 1102) is distorted with respect to the projected image 1100. Accordingly, the centroids in the distorted camera-captured pattern 1102 are indefinite, while the centroids in the projected pattern 1100 are predetermined (e.g., known). The determination of the centroid correspondence is normally computationally intensive (even despite input that might be given by a human observer).

To help determine the correspondence between each centroid of the projected image 1100 and a respective centroid of the displayed image 1102, time multiplexed patterns are used. As shown in FIG. 10, the structured light elements 1002 are arranged in an M-by-N element raster array, which usually corresponds to a similar arrangement of the warping engine control points. Each element is associated with a single row-column pair, so each of the structured light elements can have a unique code and/or identification number.

In an embodiment, Gray codes are used to encode the column and row indexes, so each structured light element is associated with two binary Gray-encoded sequences: a first sequence is for encoding column information for a particular structured light element and a second sequence is for encoding row information for the particular structured light element. The binary sequences are obtained from patterns projected, displayed and captured in sequence: each successive, displayed pattern contributes additional bits (e.g., binary digits) for appending to the associated sequence. In each pattern, a series of elements, usually entire rows or columns, can be turned on (displayed) or off (not displayed). Each successive pattern halves the width of the previously projected entire column (or halves the height of the previously projected row) so the number of columns (or row) in the successive pattern is doubled in accordance with a Gray code encoding. For example, a Gray code series can be 1, 01, 0110, 01100110, 0110011001100110, .... Accordingly, the number of patterns for encoding column information is a log function, which exponentially reduces the number of (e.g., required) unique codes. The number of unique codes for the column information $N_h$ is:

$$N_h = \log_2(N) \qquad (\text{Eq. 1})$$

where N is the number of columns in the array. The number of structured light patterns for encoding row information $N_v$ is:

$$N_v = \log_2(M) \qquad (\text{Eq. 2})$$

where M is the number of rows in the array.

In order to optimize memory utilization in an example, one pattern is processed at a time and the search for element bit information is limited to regions in a captured image in which a structured light element is likely to exist. Initially, an entire structured light pattern (e.g., in which all of the structured light elements are visible) is projected, displayed and captured. The captured structured light elements are identified in accordance with a single-pass connected component analysis (CCA) process. The single-pass CCA is a clustering process in which connected components with intensities above a predetermined threshold value are searched for (e.g., which lowers processing of false hits due to low intensity noise). Identified clusters of connected elements are assigned local identifiers (or tags) and their centers of mass (e.g., centroids) and relative areas are numerically determined. When the entire image has been searched and all of the detected connected component clusters identified and tagged, the connected components are sorted in descending order in response to the relative area of each connected component. For a camera-captured image in which N elements are expected, only the first N elements in area-based descending order are considered; any remaining connected element clusters of lesser areas are considered noise and discarded. Any remaining connected element clusters of lesser areas can be discarded in accordance with a heuristic in which the structured light pattern elements are the larger (and brighter elements) in the camera captured image and in which the smaller bright elements are noise, which then can be discarded. In contrast, two-pass methods for detecting connected components and blobs in images consume a considerable amount of memory and processing power. The single-pass CCA method described herein retrieves the camera-captured image from the embedded DLP® ASIC memory as a unitary operation and analyzes the image line by line. The line-by-line analysis optimizes execution speed without sacrificing robustness, for example.

Figure 12A:
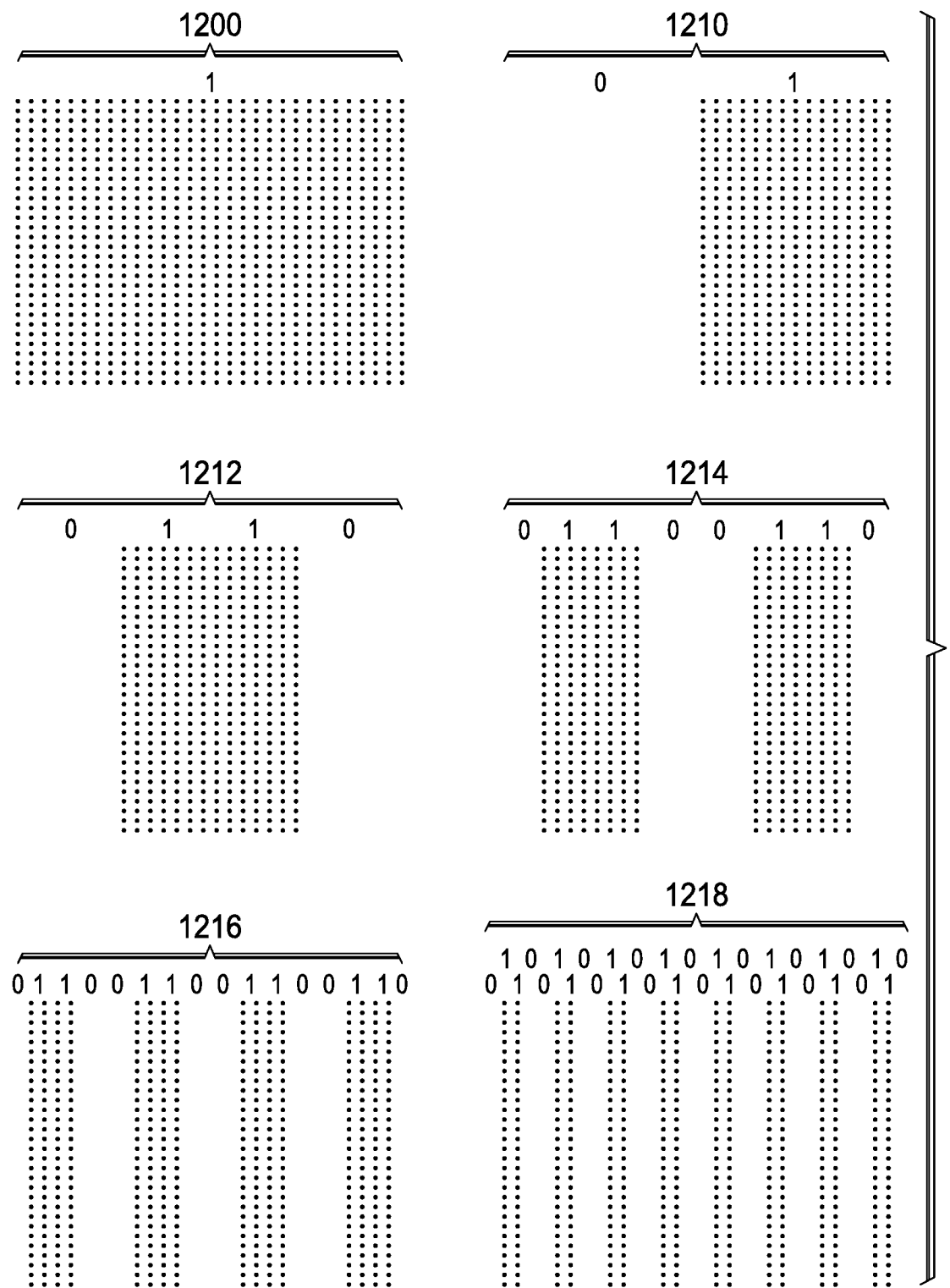
FIG. 12A is an image showing columns of Gray-encoded captured structured light elements for screen surface characterization.

FIG. 12A is an image showing columns of Gray-encoded captured structured light elements for screen surface characterization. For example, image 1200 shows a first captured pattern of a column (or row) encoded in accordance with a Gray-encoded sequence of "1." Image 1210 shows a second captured pattern of a column encoded in accordance with a Gray-encoded sequence of "01." Image 1212 shows a third captured pattern of a column encoded in accordance with a Gray-encoded sequence of "0110." Image 1214 shows a fourth captured pattern of a column encoded in accordance with a Gray-encoded sequence of "01100110." Image 1216 shows a fifth captured pattern of a column encoded in accordance with a Gray-encoded sequence of "0110011001100110." Image 1218 shows a sixth captured pattern of a column encoded in accordance with a Gray-encoded sequence of "01100110011001100110011001100110." The expanding Gray-encoded sequences can be expanded to generate additional patterns for capturing to achieve higher screen characterization resolutions. Accordingly, the Gray-encoding is expandable to achieve higher resolutions for mapping larger numbers of captured structured light elements to larger numbers of warping engine control points.

Figure 12B:
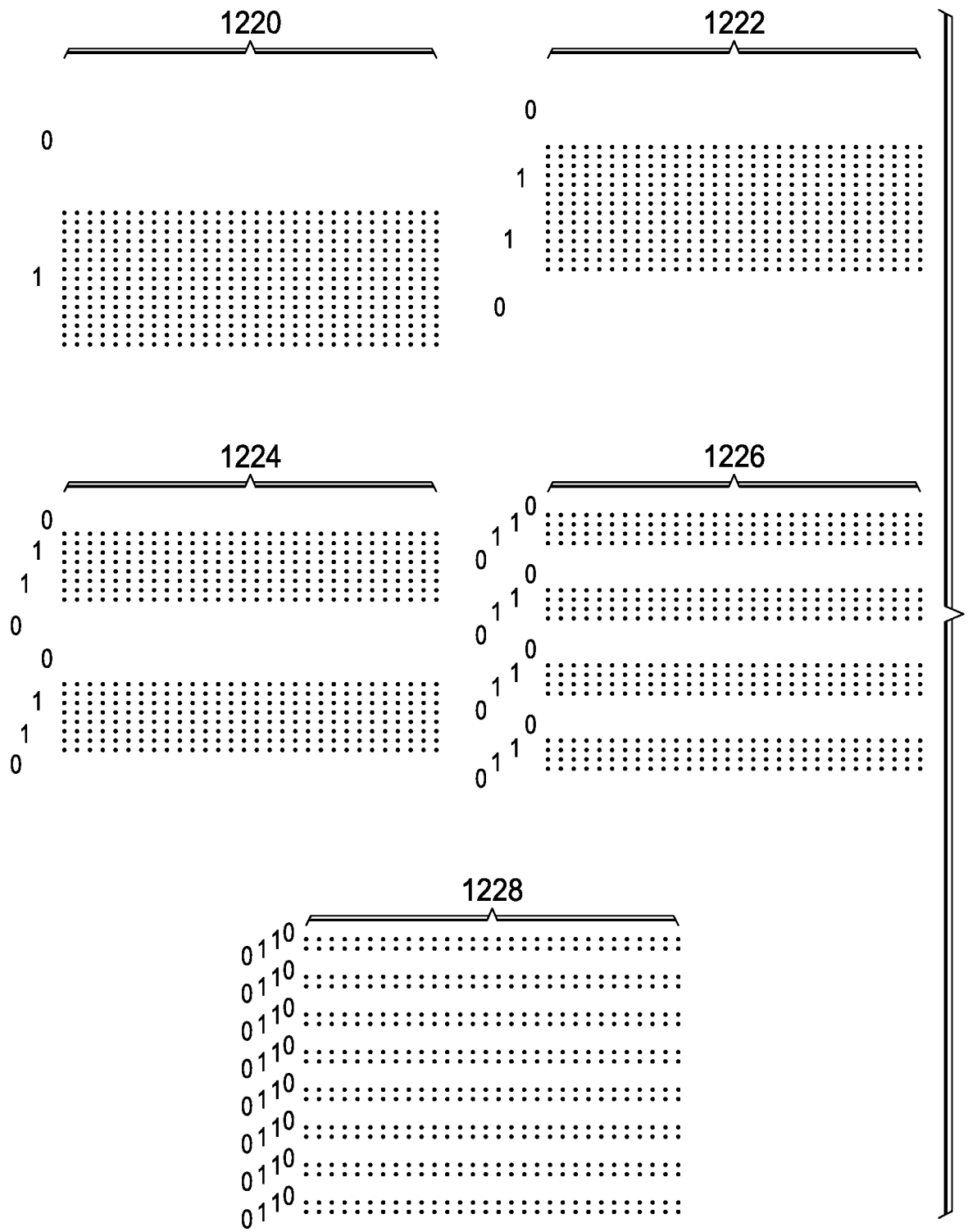
FIG. 12B is an image showing rows of Gray-encoded captured structured light elements for screen surface characterization.

FIG. 12B is an image showing rows of Gray-encoded captured structured light elements for screen surface characterization. Similarly, a sequence of images in response to patterns of rows encoded with expanding Gray-encoded sequences can be captured. Image 1200 shows a first captured pattern of a row (which is also a column) encoded in accordance with a Gray-encoded sequence of "1." Image 1220 shows a second captured pattern of a row encoded in accordance with a Gray-encoded sequence of "01." Image 1222 shows a third captured pattern of a row encoded in accordance with a Gray-encoded sequence of "0110." Image 1224 shows a fourth captured pattern of a row encoded in accordance with a Gray-encoded sequence of "01100110." Image 1226 shows a fifth captured pattern of a row encoded in accordance with a Gray-encoded sequence of "0110011001100110." Image 1228 shows a sixth captured pattern of a row encoded in accordance with a Gray-encoded sequence of "01100110011001100110011001100110." Each of the images for the rows and each of the images for the columns are sequentially analyzed line-by-line to determine a two dimensional mapping of coordinates for each identifiable structured light element to a corresponding warping engine control point. (The line-by-line analysis reduces the memory space otherwise required for determining warping engine control points.)

Because the positions of any displayed structured light elements do not change from pattern to pattern, (e.g., only) the full (e.g., first) pattern is analyzed in response to the single-pass CCA. Subsequent patterns are (e.g., only) searched in locations in which a structured light element is positioned for display. The narrowing of search areas helps optimize ASIC memory utilization by processing patterns in sequence. Accordingly, images containing the Gray-encoded column and row pattern information are not necessarily fully analyzed. For example, only the pixels corresponding to the locations of the structured light elements identified from the entire pattern are analyzed, which greatly improves the execution speed of the detection of the captured structured light elements.

The projected structured light elements are matched with the corresponding captured and identified structured light elements. The centroids of the structured light elements and the associated row-column information are stored in the ASIC memory for retrieval during subsequent processing described herein. The centroid information for each identified structured light element and geometry information determined during system calibration are provided is input for processes for determining an optical ray orientation (described hereinbelow with respect to FIG. 15).

While Gray-encoding of rows and columns of the structured light elements is relatively robust with respect to matching the projected and the captured structured light elements, it is possible to have missing points (control point data holes, or "holes") for which structured light elements are projected but insufficient data is captured by processing captured images. A hole is a structured light element for which sufficient information (e.g., for fully characterizing a point on a screen) is not detected by the single-pass CCA. Holes can result when not all projected Gray sequences of structured light elements are captured. For example, holes can occur when the ambient light conditions are not optimal, when an external illumination source contaminates the scene and/or when a structured light element is projected on a screen surface discontinuity.

Data for filling holes (e.g., sufficient data for characterizing a warping engine control point) can be generated (e.g., estimated) in response to three-dimensional interpolation and extrapolation of information sampled from valid neighboring the structured light elements when sufficient neighboring information is available. Each unfilled warping engine control point (e.g., a control point for which sufficient control point data have not been captured and extracted) is indicated by storing the addresses of each unfilled warping engine control point memory in an array structure (hole map) for such missing data. The hole map contains status information for all possible row and column pairs for the structured light element array and indicates (for example) whether row-column information was correctly decoded (e.g., a point having information determined in response to the analysis of Gray-code encoding), estimated by interpolation and/or extrapolation, or undetermined (in which case a hole remains).

Figure 13:
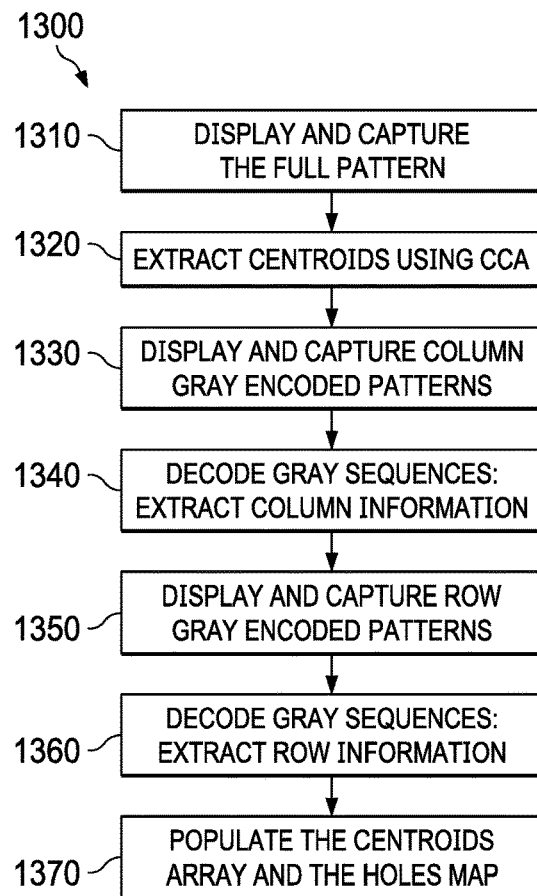
FIG. 13 is a flow diagram for structured light element processing.

FIG. 13 is a flow diagram for structured light element processing. The process flow 1300 begins in 1310, when an image including a full pattern (e.g., image 1200) is projected, displayed and captured. In 1320, the centroids of each structured light element captured from the displayed full pattern are extracted in accordance with the CCA process described hereinabove. In 1330, a sequence of images including ever-higher resolution patterns of Gray-encoded columns are projected, displayed and captured. In 1340, column information of structured light elements displayed in columns is extracted in response to decoding the associated Gray-encoded patterns. In 1350, a sequence of images including increasingly higher resolution patterns of Gray-encoded rows are projected, displayed and captured. In 1360, row information of structured light elements displayed in rows is extracted in response to decoding the associated Gray-encoded patterns. In 1370, the centroid array and the holes map are populated in response to row information and column information of identified structured light elements. Accordingly, the output of flow 1300 includes the centroid array for indexed retrieval of the associated captured structured light elements positions by rows and columns, and includes a holes map for indexed retrieval of positions of otherwise uncharacterized points for which structured light elements were projected (e.g., but not captured).

With reference to 730 again, the projection screen surface is characterized in accordance with optical ray intersection parameters (in the single camera mode). The optical ray intersection parameters are determined for estimating information for filling holes in the hole map. The accuracy of the screen surface characterization parameters is increased by "filling in" holes in the hole map by populating the centroid array with information estimated (e.g., by interpolation and/or extrapolation) of neighboring structured light element information. The observed or estimated screen surface characterization parameters are stored for indexed retrieval in the 3D point cloud. The points of the 3D point cloud represent the projection screen surface from the perspective of the projector.

Figure 14:
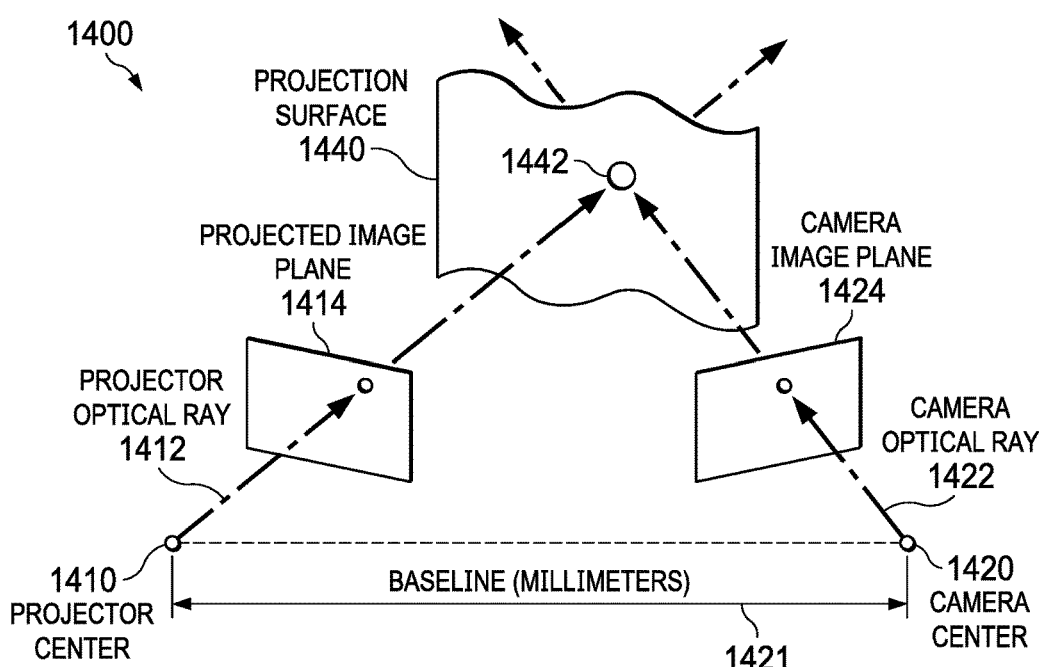
FIG. 14 is an orthographic perspective view of a geometry for construction of projector optical rays for generating a three-dimensional point cloud for representing a projection screen surface.

FIG. 14 is an orthographic perspective view of a geometry for construction of projector optical rays for generating a three-dimensional point cloud for representing a projection screen surface. In general, geometry 1400 includes a geometry for calculating the spatial information of the projection screen surface 1440. An actual three-dimensional position for each (e.g., 1442) of the structured light elements projected onto the projection screen surface can be calculated by determining the intersections (e.g., 1442) between corresponding pairs of optical rays (e.g., 1412 and 1422) originating from the camera and the projector respectively.

The projector center 1410 is a point located at the origin (0, 0, 0) of a 3D Cartesian coordinate system. The projector center 1410 point is considered to be the center of projection. Optical rays 1412 originate at the center of projection 1410, pass through each one of the structured light pattern elements in the projector image plane 1414, pass through the projection surface 1440 at point 1442 and extend onto infinity.

The camera center 1420 is a point located at a certain distance (baseline) 1421 from the center of projection 1410. The camera center 1420 is determined by the camera-projector calibration data and is represented by a translation vector and a rotation matrix (discussed above with respect to FIG. 9C). Optical rays 1422 originate at the camera center 1420, pass through each one of the centroids of the camera captured structured light elements of the camera image plane 1424, pass through the projection surface 1440 at point 1442 and extend onto infinity.

Each one of the optical rays from the projector intersects a corresponding (e.g., matched) camera ray and intersect exactly at a respective point 1442 of the projection screen surface 1440. When the length of the baseline 1421 (e.g., in real units) is determined, the real position of each intersection point 1442 can be determined. The set of intersection points 1442 lying on the projection screen surface form the 3D point cloud for characterizing the projection screen surface.

Figure 15:
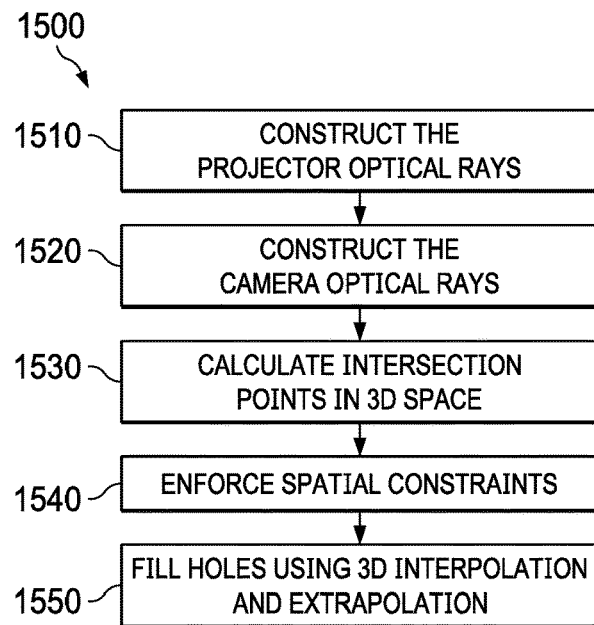
FIG. 15 is a flow diagram for generating a three-dimensional point cloud for characterizing the projection screen surface.

FIG. 15 is a flow diagram for generating a three-dimensional point cloud for characterizing the projection screen surface. The process flow 1500 begins in 1510, where the projector optical rays are constructed. In 1520, the camera optical rays are constructed. In 1530, the intersection point for each projector optical ray and a respective camera optical ray is determined in three-dimensional space. In 1540, spatial constraints are enforced. In 1550, holes are filled in accordance with three-dimensional interpolation and extrapolation techniques.

With reference to 1510, the orientation of the projector optical rays is determined in response to the location of the centroids of the structured light elements in the projected structured light pattern and is determined in response to the projector calibration data. The structured light elements are positioned at the initial locations of the warping engine control points. The optical rays are defined as vectors in 3D dimensional space originating at the center of projection.

Figure 16:
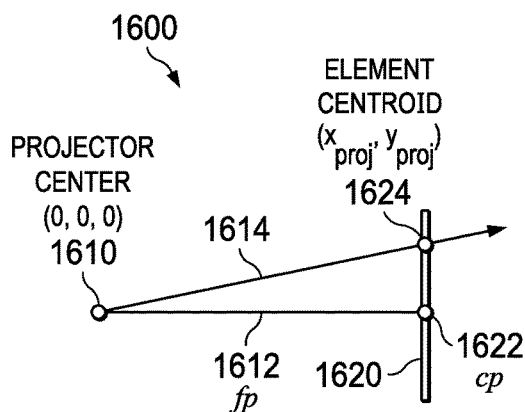
FIG. 16 is a side perspective view of a geometry for determination of projector optical rays.

FIG. 16 is a side perspective view of a geometry for determination of projector optical rays. In general, geometry 1600 shows the geometry of optical rays between a projector center 1610 and a projection screen surface 1620. The projector center 1610 is located at the origin (0,0,0) and includes a projector focal length $f_p$ 1612 with respect to the projection screen surface 1620. The projection screen surface 1620 includes a principal point $c_p$ 1622, which is a point by the focal length $f_p$ 1612 is characterized. An optical ray 1614 associated with a structured light element is projected from the origin 1620 for intersecting the projection screen surface 1620 at centroid 1624. The orientation or inclination of an optical ray is characterized in response to the position (e.g., x, y coordinates in pixels) of a respective structured light element and by the projector's focal length $f_p$ and principal point $c_p$.

The lenses of a projector introduce tangential and radial distortion to each structured light pattern projected through the lenses. Accordingly, the projector optical rays are distorted in accordance with:

$$\vec{pr} = \begin{bmatrix} \frac{x_{proj} - cc_{proj,x}}{fc_{proj,x}} \\ \frac{y_{proj} - cc_{proj,y}}{fc_{proj,y}} \\ 1 \end{bmatrix} \quad \text{(Eq. 3)}$$

where $fc_x$ and $fc_y$ are the x and y components of the projector's focal length in pixels and $cc_x$ and $cc_y$ are the x and y components of the principal point. The optical distortion can be corrected in response to an inverse distortion model. After correcting for the projection lens-induced distortion, the optical rays are normalized to be unit vectors in accordance with:

$$\vec{v_p} = \frac{\vec{PR}}{\|\vec{PR}\|} \quad \text{(Eq. 4)}$$

Figure 17:
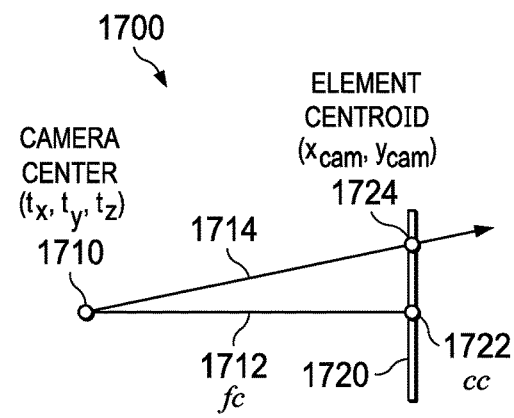
FIG. 17 is a side perspective view of a geometry for determination of camera optical rays.

FIG. 17 is a side perspective view of a geometry for determination of camera optical rays. In general, geometry 1700 shows the geometry of optical rays between a camera center 1710 and a projection screen surface 1720. The camera center 1710 is located at the origin (0,0,0) and includes a camera focal length $f_p$ 1712 with respect to the projection screen surface 1720. The projection screen surface 1720 includes a principal point $c_p$ 1722, which is a point by the focal length $f_p$ 1712 is characterized. An optical ray 1714 associated with a structured light element is projected from the origin 1720 for intersecting the camera screen surface 1720 at centroid 1724.

With reference to 1520 again, the orientation of the camera optical rays is determined. Similarly to the origin of the projector optical rays, the camera optical rays originate at the camera center, pass through the centroids of each one of the camera-captured structured light pattern elements and extend onto infinity. The equations for characterizing the optical rays of the camera are similar to the projector optical rays: optical rays are defined as vectors in 3D space (e.g., being undistorted and normalized).

However, at least two differences between the camera optical rays and projection optical rays exist. Firstly, the intrinsic parameters of the camera are for defining the orientation of the optical rays and the distortion coefficients of the camera are for correcting the tangential and radial distortion introduced by the camera optics. Secondly, each of the undistorted and normalized camera optical rays is rotated (e.g., multiplied by the extrinsic rotation matrix $R_{cam}$) to compensate for the relative orientation of the camera with respect to the projector's optical axis. Accordingly, the equations of the camera optical rays are as follows:

$$\vec{cr} = \begin{bmatrix} \frac{x_{cam} - cc_{cam,x}}{fc_{cam,x}} \\ \frac{y_{cam} - cc_{cam,y}}{fc_{cam,y}} \\ 1 \end{bmatrix} \quad \text{(Eq. 5)}$$

$$\vec{v_c} = R_{cam} \cdot \left( \frac{\vec{cr}}{\|\vec{cr}\|} \right) \quad \text{(Eq. 6)}$$

With reference to 1530, the intersection point for each projector optical ray and a respective camera optical ray is determined in three-dimensional space. The intersection points for each optical ray pair are determined in accordance with geometric and vector principles described hereinbelow.

Figure 18:
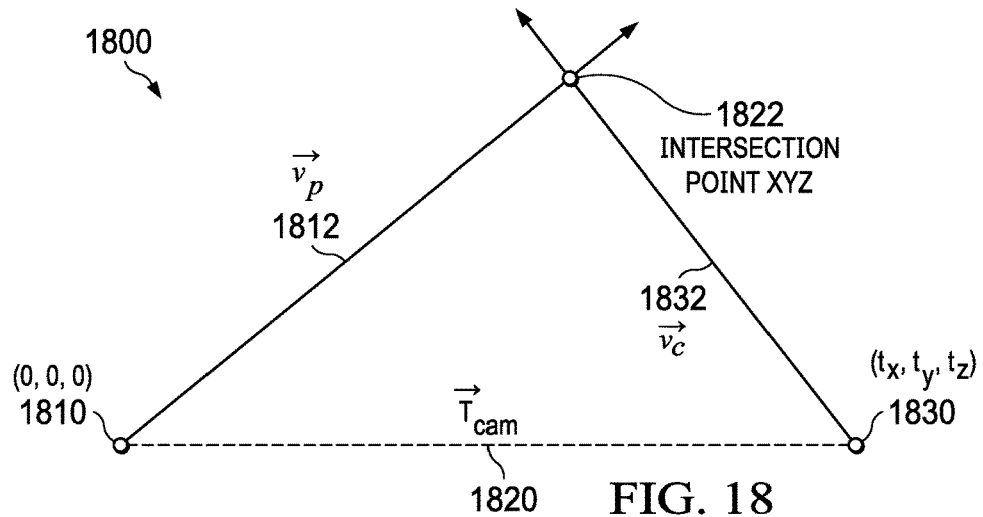
FIG. 18 is an orthographic perspective view of a geometry for determining intersections of each corresponding pair of optical rays originating respectively from a camera and a projector.

FIG. 18 is an orthographic perspective view of a geometry for determining intersections of each corresponding pair of optical rays originating respectively from a camera and a projector. In general, geometry 1800 includes a projector center 1810 located at the origin (0, 0, 0). An optical ray vector $\vec{v_p}$ 1812 originates at the projection center 1810 and extends into infinity. The camera center 1830 is a point located at a distance (e.g., expressed by a scalar of the translation vector $\vec{T}_{cam}$ 1820) from the camera center 1830. An optical ray vector $\vec{v_c}$ 1832 originates at the camera center 1830 and extends into infinity. Each pair of optical ray vectors $\vec{v_p}$ 1812 and $\vec{v_c}$ 1832 intersect at an intersection point 1822 (e.g., where the intersection point 1822 is defined in accordance with the x axis, the y axis and the z axis). Accordingly, a set of intersections exists from which the surface of a projection screen can be characterized.

The two sets of optical rays (e.g., a first set of projector rays and a second set of camera rays) intersect (or pass each other within a margin resulting from numerical errors and/or rounding factors) in accordance with a surface of a projection screen being characterized. For N elements in the structured light patterns, there exist N projector optical rays, N camera optical rays and N intersection points in 3D space.

The magnitude of the translation vector $\vec{T}_{cam}$ 1820 can be expressed in mm (or other convenient unit of distance) and represents an actual position of the camera with respect to the projector optical axis. Accordingly, the coordinates for the XYZ position can be expressed in millimeters and can be determined for each of the N intersection points for a first set of optical rays extending through a camera image plane and a second set of set of optical rays extending through a projector image plane. For each intersection of a ray pair $\vec{P}_n$ and $\vec{C}_n$, an XYZ position with respect to the projector center is:

$$\vec{P}_c = \begin{bmatrix} 0 \\ 0 \\ 0 \end{bmatrix} \quad \text{(Eq. 7)}$$

$$\vec{C}_c = \vec{T}_{cam} = \begin{bmatrix} x_c \\ y_c \\ z_c \end{bmatrix} \quad \text{(Eq. 8)}$$

$$\vec{W}_0 = \vec{P}_c - \vec{C}_c = \begin{bmatrix} -x_c \\ -y_c \\ -z_c \end{bmatrix} \quad \text{(Eq. 10)}$$

$$a = \vec{P}_n \cdot \vec{P}_n \quad b = \vec{P}_n \cdot \vec{C}_n \quad c = \vec{C}_n \cdot \vec{C}_n \quad \text{(Eq. 11)}$$
$$d = \vec{P}_n \cdot \vec{W}_0 \quad e = \vec{C}_n \cdot \vec{W}_0$$

The closest point $XYZ_n$ (in vector form) between the two rays $\vec{P}_n$ and $\vec{C}_n$ is:

$$sC = \frac{be - cd}{ac + b^2} \quad \text{(Eq. 12)}$$

$$tC = \frac{ae - bd}{ac + b^2} \quad \text{(Eq. 13)}$$

$$\vec{P}_{sC} = \vec{P}_c + sC * \vec{P}_n \quad \text{(Eq. 14)}$$

$$\vec{P}_{tC} = \vec{C}_c + tC * C_n \quad \text{(Eq. 15)}$$

$$\overrightarrow{XYZ_n} = \begin{bmatrix} X \\ Y \\ Z \end{bmatrix} = 0.5(\vec{P}_{sC} + \vec{P}_{tC}) \quad \text{(Eq. 16)}$$

An intersection is determined for each N optical ray pair so the actual displayed position of each structured light element projected onto the screen is determined. The (e.g., entire) set of such intersection points defines a 3D point cloud for describing the spatial information of the projection screen surface.

Figure 19:
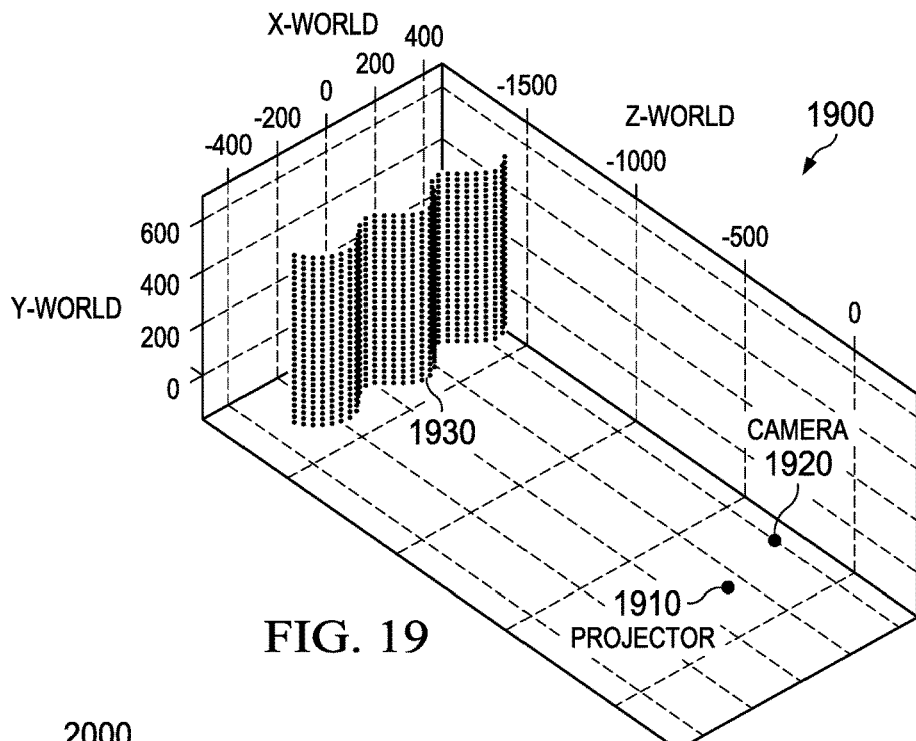
FIG. 19 is a perspective view of a system geometry of a three-dimensional point cloud generated in response to a "wavy" projection screen surface model.

FIG. 19 is a perspective view of a system geometry of a three-dimensional point cloud generated in response to a "wavy" projection screen surface model. In an example geometry 1900, the projector 1910 is arranged to project an image onto a "wavy" (e.g., warped) non-planar display screen, portions of which are non-perpendicular to the projector 1910. When the projector 1910 is arranged to project an image onto the display screen, apparent distortion occurs so the display screen image appears to the camera 1920 as being distorted with respect to the (e.g., true) projected image for projection. Each point in the 3D point cloud 1930 represents a three-dimensional point on the non-planar (or otherwise asymmetrical) display screen (where each point can be enumerated with a convenient unit of measurement).

With reference to 1540, spatial constraints are imposed on points in the 3D point cloud 1930. Although the ray intersection usually produces very accurate results, it remains possible to obtain 3D points that do not accurately characterize the projection surface, for example. Accordingly, some points of the 3D point cloud do not lie within (e.g., fall within a pixel-width) of the projection screen surface. The inaccurate pixels can produce visually apparent errors in subsequent processing operating while relying upon the 3D point cloud as input. Such errors can be caused by errors in the camera-projection calibration data or inaccuracies in the centroid information of the camera-captured structured light pattern elements.

Because points in the cloud are arranged in raster scan order, they can be analyzed line by line and column by column. Heuristics are applied to detect any outliers (i.e. points not lying in the projection screen surface), wherein the set of applied heuristics includes heuristics for application in response to a raster scan order. The outliers can be can be normalized or otherwise compensated for in response to one or more locations of neighboring points determined (e.g., by the heuristics) to lie within the projection screen surface.

For example, a first heuristic is for determining whether distortion introduced by the projection surface results in neighboring points being mapped out of order in horizontal or vertical raster scans. In an example situation, a first optical ray located to the left of a second neighboring (e.g., adjacent and/or diagonally adjacent) optical ray should result in corresponding 3D point-cloud points calculated to have x-value in the same order as the first and second optical rays: no error is determined when the 3D point associated with the first optical ray is to the left of the 3D point-cloud point associated with the second optical ray; in contrast, an error is determined when the 3D point-cloud point associated with the first optical ray is to the right of the 3D point-cloud point associated with the second optical ray.

A second heuristic is for determining whether a discontinuity (e.g., caused by an uneven surface) of the actual projection screen surface is supported by the 3D point cloud and whether any such discontinuities are so large that they can cause a vertical or horizontal reordering of any 3D point-cloud points (e.g., as considered to be an error by the first heuristic).

In view of the first and second example heuristics, all 3D point-cloud points in any single row are considered to be monotonically increasing so the x-component of successive points increase from left to right. When a 3D point-cloud point is out of order (when compared to neighboring points in the same row), the out-of-order 3D point-cloud point is considered to be invalid. The same constraint applies to all 3D point-cloud points in column: out-of-order 3D point-cloud points are considered to be invalid in the event any y-components of successive points do not increase monotonically from the top to the bottom of a single column.

The first and second heuristics can be applied in combination with a degree of curvature (e.g., slope) determined for a given reference point and neighboring points on the 3D point cloud (as described hereinbelow with reference to FIG. 28A and FIG. 28B). The slope information for the surface of each point in a row of points can be used to more accurately determine the topology of row of points (e.g., as present on actual projection screen surface). For example, topology of row of points can be more accurately determined using interpolation (e.g., quadratic and cubic), in which the slope information (which is related to acceleration of the change in surface depth for a given point) is used to fit a curve to the points of the row of points being ordered. If the determined topology is not substantially planar (e.g., the slope for a given point is around vertical with respect to a best fitted plane, described hereinbelow), the given 3D point-cloud point can be determined to be invalid. The determined topology of a row of points can be used, for example, to determine a correct ordering of points and/or to determine whether information (e.g., depth information) is invalid. The given 3D point-cloud point can be determined to be invalid when, for example, the determined topology is not substantially planar (e.g., the slope for a given point is around vertical).

Any 3D point-cloud point determined to be invalid is stored (e.g., indicated as invalid) in the holes map. In the event a location in the holes map was previously indicated to be valid, the said indication is overwritten so the invalid 3D point-cloud point is considered to be hole.

With reference to 1550, holes in the holes map can be replaced with indications of valid values when sufficient information exists to determine a heuristically valid value. For example, a hole can be "filled" with valid information when sufficient information exists with respect to values of neighboring valid 3D point-cloud points so 3D interpolation and/or 3D extrapolation can determine sufficiently valid information (e.g., information associated with a heuristically valid value).

Because the locations of the projected structured light elements are defined in response to the initial positions of the warping engine points, each point in the 3D point cloud is evaluated (e.g., in raster order) to determine whether each 3D point-cloud point is heuristically located within the projection screen surface. Errors (e.g., in which a 3D point-cloud point does not lie within the projection screen surface) can occur during calibration or as a result of a failure to correctly determine the row-column information in the structured light pattern processing block (e.g., see 720). In such cases, the missing point (or hole) 3D information can be estimated (e.g., calculated) in response to sufficient neighboring point spatial information. In an embodiment, the 3D point cloud is searched for missing points in response to missing and/or invalid holes indicated by the holes map. When a hole is indicated, an estimation of a correct 3D position can usually be calculated by 3D extrapolation or interpolation (including using slope information hereinbelow with reference to FIG. 28A and FIG. 28B) response to linear sequences of successive and valid 3D point-cloud points. After a correct 3D position is estimated for a "former" hole, the estimated position can be used in determining estimated position information for any remaining hole(s).

The horizontal sequencing of holes indicated by the hole map can be examined on a row-by-row basis. Each of the points of a row of the 3D point cloud is examined to determine whether any hole (including other indications of invalidity) exists for the examined point. When a hole is indicated to be associated with the examined point, the two closest (e.g., valid) neighbors in the 3D point cloud associated with valid 3D information are selected. For example, the closest neighbors in the row are 3D point-cloud points not indicated to be holes themselves (or otherwise invalid themselves). Scans for searching for the two closest neighbors can proceed in an outward direction from (e.g., proceeding to the left and proceeding to the right of) the 3D point-cloud point determined to be a hole.

Various scenarios exist in which a distance, a directional vector and a reference vector can be determined for sufficiently generating missing point data of the 3D point cloud. The various scenarios can include the possibility both left and right neighbors were found, the possibility only the left neighbor was found, the possibility only the right neighbor was found and the possibility no neighbors were found. Methods for generating missing point data of the 3D point cloud are described hereinbelow.

Figure 20:
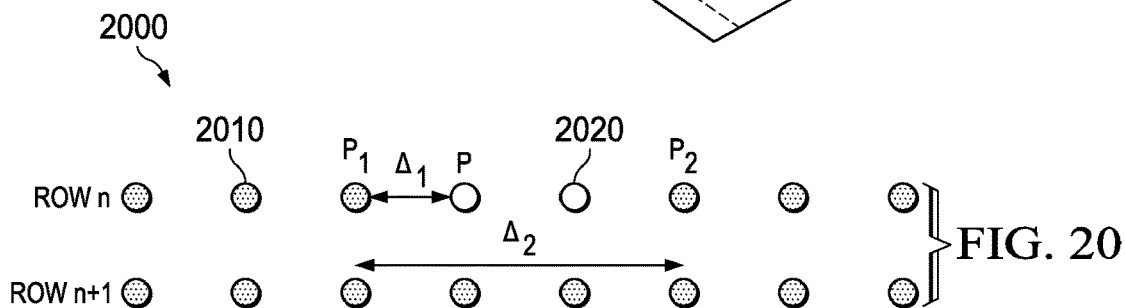
FIG. 20 is a diagram of invalid 3D point-cloud points between left and right neighboring valid 3D point-cloud points.

FIG. 20 is a diagram of invalid 3D point-cloud points between left and right neighboring valid 3D point-cloud points. For example, scenario 2000 includes a row n, which includes valid 3D point-cloud points 2010 and invalid (e.g., missing) 3D point-cloud points 2020. The scenario 2000 also includes a row n+1, which (e.g., exclusively) includes valid 3D point-cloud points 2010. In scenario 2000, the horizontal position of the hole can be determined by 3D interpolation in response to data from the closest left and right valid neighbor 3D point-cloud point.

A directional vector is defined with $p_1$ as its origin and its orientation defined by the 3D position of points $p_1$ and $p_2$:

$$\vec{v}_1 = \begin{bmatrix} p_{1,x} \\ p_{1,y} \\ p_{1,z} \end{bmatrix} \text{ and } \vec{v}_2 = \begin{bmatrix} p_{2,x} \\ p_{2,y} \\ p_{2,z} \end{bmatrix} \quad \text{(Eq. 17)}$$

The distances $\Delta_1$ and $\Delta_2$ are defined in terms of the 3D point cloud array column indexes of the missing point and its two neighbors:

$$\Delta_1 = \|col_p - col_{p1}\| \quad \text{(Eq. 19)}$$

$$\Delta_2 = \|col_{p2} - col_{p1}\| \quad \text{(Eq. 20)}$$

$$\Delta = \frac{\Delta_1}{\Delta_2} \quad \text{(Eq. 21)}$$

The reference vector is set to be equal to $\vec{v}_1$:

$$\vec{v}_{ref} = \vec{v}_1 = \begin{bmatrix} p_{1,x} \\ p_{1,y} \\ p_{1,z} \end{bmatrix} \quad \text{(Eq. 22)}$$

Figure 21:
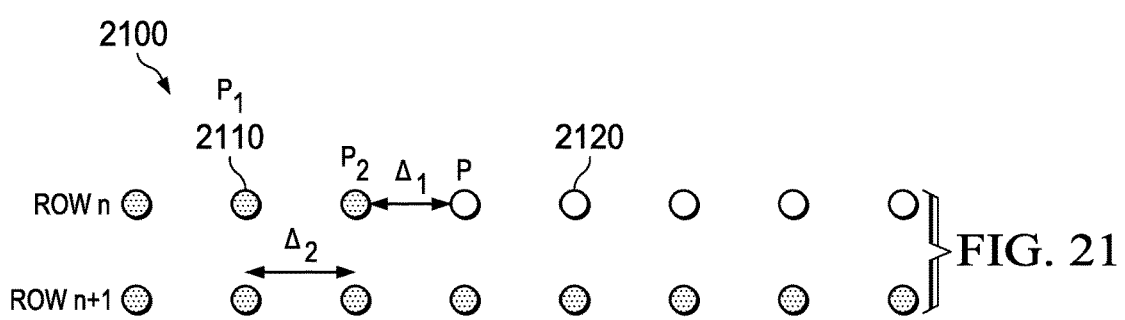
FIG. 21 is a diagram of invalid 3D point-cloud points between left neighboring valid 3D point-cloud points and no right-side neighboring valid 3D point-cloud points.

FIG. 21 is a diagram of invalid 3D point-cloud points between left neighboring valid 3D point-cloud points and no right-side neighboring valid 3D point-cloud points. For example, scenario 2100 includes a row n, which includes valid 3D point-cloud points 2110 and invalid 3D point-cloud points 2120. The scenario 2100 also includes a row n+1, which (e.g., exclusively) includes valid 3D point-cloud points 2110. In scenario 2100, interpolation is not immediately possible because only a left neighboring valid 3D point-cloud point can be found. When only a left neighboring valid 3D point-cloud point is found (for example), the search is extended leftwards to search for an additional neighboring valid 3D point-cloud point. If a second neighbor is found, the missing point value can be calculated by 3D extrapolation; otherwise, insufficient data exists to generate valid data for the invalid 3D point-cloud points.

The vectors and distances for "filling" holes are:

$$\vec{v}_1 = \begin{bmatrix} p_{1,x} \\ p_{1,y} \\ p_{1,z} \end{bmatrix} \text{ and } \vec{v}_2 = \begin{bmatrix} p_{2,x} \\ p_{2,y} \\ p_{2,z} \end{bmatrix} \quad \text{(Eq. 23)}$$

$$\vec{v} = \vec{v}_2 - \vec{v}_1 \quad \text{(Eq. 24)}$$

$$\Delta_1 = \|col_p - col_{p2}\| \quad \text{(Eq. 25)}$$

$$\Delta_2 = \|col_{p2} - col_{p1}\| \quad \text{(Eq. 26)}$$

$$\Delta = \frac{\Delta_1}{\Delta_2} \quad \text{(Eq. 27)}$$

$$\vec{v}_{ref} = \vec{v}_2 = \begin{bmatrix} p_{2,x} \\ p_{2,y} \\ p_{2,z} \end{bmatrix} \quad \text{(Eq. 28)}$$

Figure 22:
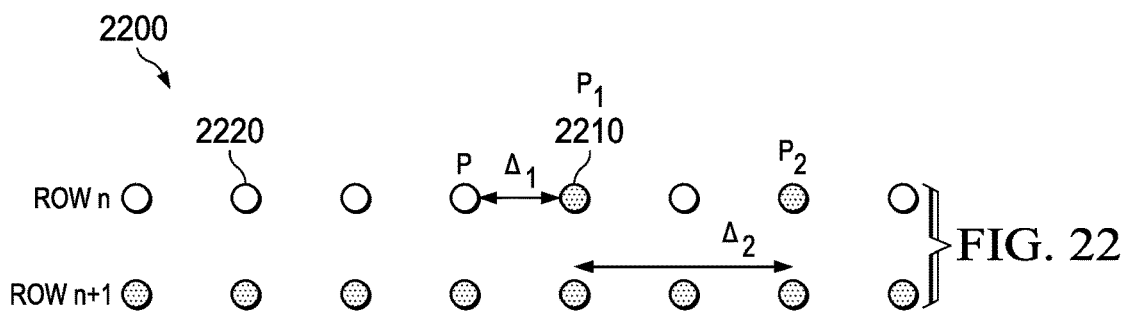
FIG. 22 is a diagram of invalid 3D point-cloud points between right neighboring valid 3D point-cloud points and no left-side neighboring valid 3D point-cloud points.

FIG. 22 is a diagram of invalid 3D point-cloud points between right neighboring valid 3D point-cloud points and no left-side neighboring valid 3D point-cloud points. For example, scenario 2200 includes a row n, which includes valid 3D point-cloud points 2210 and invalid 3D point-cloud points 2220. The scenario 2200 also includes a row n+1, which (e.g., exclusively) includes valid 3D point-cloud points 2210. In scenario 2200, interpolation is not immediately possible because only a right neighboring valid 3D point-cloud point can be found. When only a right neighboring valid 3D point-cloud point is found, the search is extended rightwards to search for an additional neighboring valid 3D point-cloud point. If a second neighbor is found, the missing point value can be calculated by 3D extrapolation; else, insufficient data exists to generate valid data for the invalid 3D point-cloud points.

The vectors and distances are:

$$\vec{v}_1 = \begin{bmatrix} p_{1,x} \\ p_{1,y} \\ p_{1,z} \end{bmatrix} \text{ and } \vec{v}_2 = \begin{bmatrix} p_{2,x} \\ p_{2,y} \\ p_{2,z} \end{bmatrix} \quad \text{(Eq. 29)}$$

$$\vec{v} = \vec{v}_1 - \vec{v}_2 \quad \text{(Eq. 30)}$$

$$\Delta_1 = \|col_p - col_{p1}\| \quad \text{(Eq. 31)}$$

$$\Delta_2 = \|col_{p2} - col_{p1}\| \quad \text{(Eq. 32)}$$

$$\Delta = \frac{\Delta_1}{\Delta_2} \quad \text{(Eq. 33)}$$

$$\vec{v}_{ref} = \vec{v}_1 = \begin{bmatrix} p_{1,x} \\ p_{1,y} \\ p_{1,z} \end{bmatrix} \quad \text{(Eq. 34)}$$

When no right- and left-side neighboring valid three-dimensional point-cloud points can be found, information from sources other than the neighboring points can be used to supply an estimated missing point 3D position. For example, when a row n, which includes (e.g., exclusively) invalid 3D point-cloud points and a row n+1, which (e.g., exclusively) includes valid 3D point-cloud points, insufficient data exists to generate valid data for the invalid 3D point-cloud points.

Notwithstanding determination of missing points by interpolation or extrapolation techniques, a new 3D position value for the missing point can be determined as:

$$p = \begin{bmatrix} p_x \\ p_y \\ p_z \end{bmatrix} = \vec{v}_{ref} + \left( \frac{\Delta}{\|\vec{v}\|} \right) \vec{v} \quad \text{(Eq. 35)}$$

Accordingly, horizontal scanning processes generate information for filling control point data holes in response to 3D position data from valid neighbors arrayed in a first dimension (e.g., along the same row). When incomplete spatial information results from processing data from neighbors arrayed in a first dimension, further spatial information for filling holes is obtained from vertical scans of valid neighbor 3D point-cloud points. The vertical scans include searching the 3D point cloud array on a column-by-column basis (e.g., where a selected n-th element of each row is scanned as a single column). The vertical scanning process is similar to the horizontal scanning process described hereinabove (except that the searching is scanned in a top-to-bottom order, instead of in a left-to-right order, or scanned in a bottom-to-top order, instead of in a right-to-left order). Accordingly, the associated vector equations described hereinabove are applicable for both the described vertical and horizontal scanning processes. The data for filling the new 3D point-cloud point can be in response to the average of the filled values obtained in the horizontal and vertical scans.

With reference to 740 again, the observer position coordinates are determined (in the single camera mode). While the obtained 3D point cloud can be used for accurately describing the projection surface position and orientation in real-world units, the origin of the associated coordinate system is the center of projection. Accordingly, the projection screen surface is characterized from the projector perspective (as compared to being characterized from the perspective of the camera or an observer). The position coordinates are transformed to a second perspective for correcting for distortion introduced by non-planar and non-smooth projection screen surfaces so a rectangular image with an appropriate aspect ratio can be observed from the second perspective (e.g., observer perspective) without perceiving (e.g., uncorrected) local area distortion during projection of an image.

Accordingly, the 3D point cloud of the projection screen surface is transformed in accordance with the observer position coordinates. The observer position can be defined in response to a user input or an optimal observer position heuristically estimated from projection screen surface information from the 3D point cloud, for example. Defining the observer position in response to user input includes the user defining the position of the observer as a pair of pitch and yaw angles with respect to the projection surface. Defining the observer position in response to estimation includes optimizing the image correction for conditions in which the observer is assumed beforehand to be located in a position perpendicular (e.g., generally perpendicular) to a point of the projection screen surface.

Figure 23:
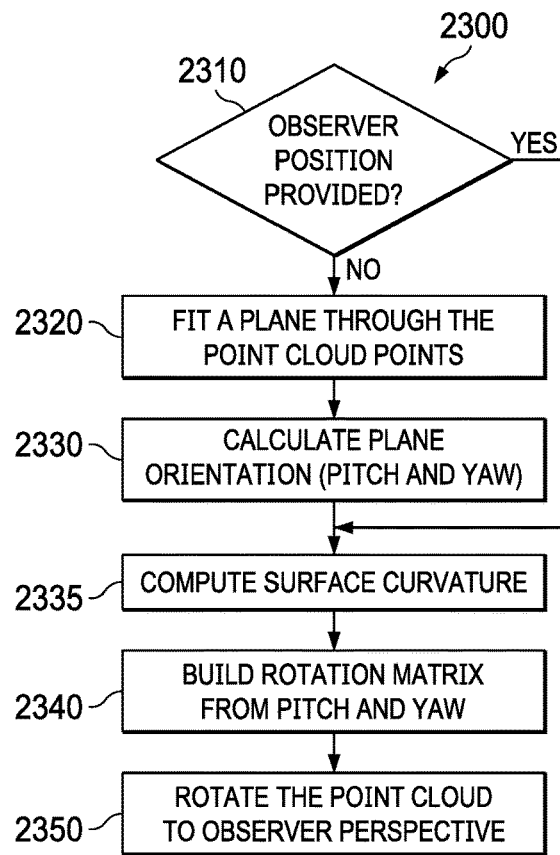
FIG. 23 is a flow diagram for determining observer position coordinates for observing the projection screen surface.

FIG. 23 is a flow diagram for determining observer position coordinates for observing the projection screen surface. The observer perspective of the point cloud can be obtained by rotating the point cloud by pitch and yaw angles for describing the position of the observer.

The process flow 2300 begins in 2310, in which it is determined whether an observer position has been provided or otherwise determined. For example, the observer position can be determined from user inputs via a user interface, a predetermined location or Wi-Fi imaging. When it is determined an observer position has been provided, the process flow proceeds to 2340 (described further below). Otherwise the process flow proceeds to 2320.

In 2320, the plane is fitted through 3D point-cloud points. For example, each point of the 3D point-cloud points is translated in a rotation in accordance with the determined position of the observer. In order to move the points and calculate the observer's perspective or point of view. As mentioned above, the position of the observer can be defined as a pair of pitch and yaw angles with respect to the center of the projection surface and can be either defined by the user or assumed to be a central location generally perpendicular to a center portion of the screen. To move the points, a plane that best fits the entire 3D point cloud (or at least portions of the 3D point cloud) can be determined in response to a least squares fitting analysis.

Figure 24:
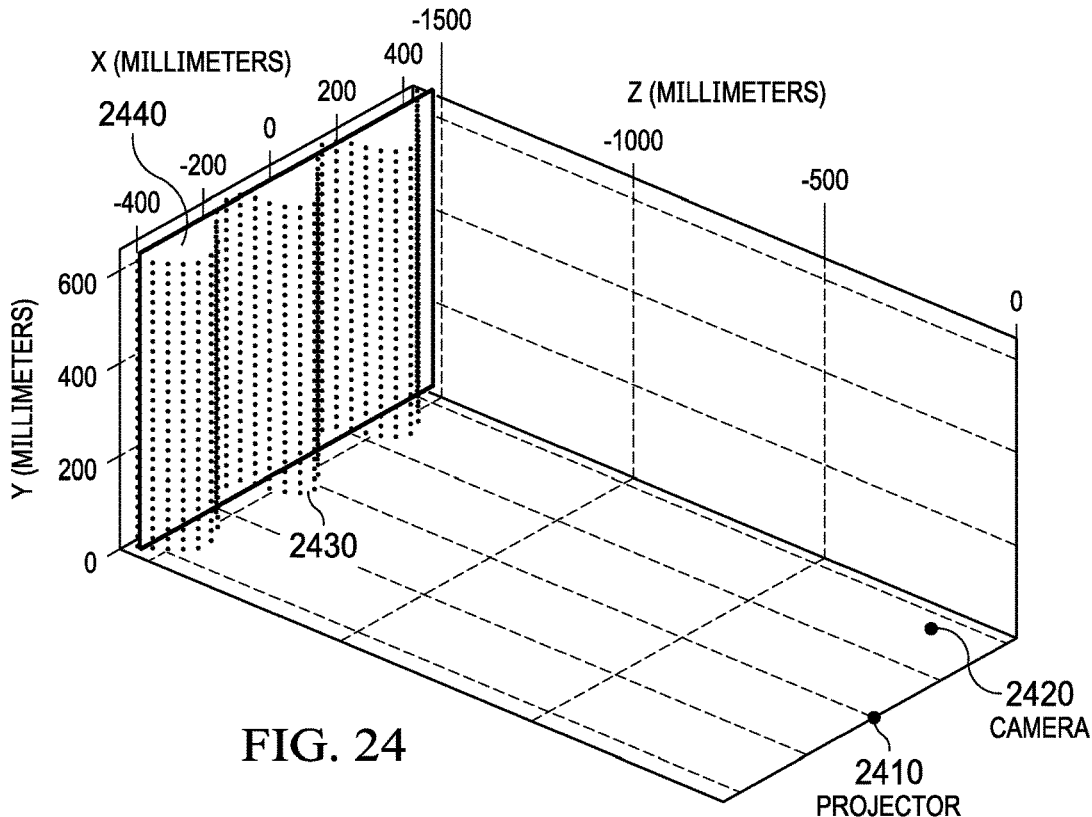
FIG. 24 is a perspective view of a system geometry of a plane fitted to a three-dimensional point cloud.

FIG. 24 is a perspective view of a system geometry of a plane fitted to a three-dimensional point cloud. In an example geometry 2400, the projector 2410 is arranged to project an image onto a non-planar (or otherwise asymmetrical) display screen, portions of which are non-perpendicular to the projector 2410. When the projector 2410 is arranged to project an image onto the display screen, apparent distortion occurs so the display screen image appears to the camera 2420 and/or an observer (not shown) at another potential viewing location (e.g., a vantage point different from the projector position). Each point in the 3D point cloud 2430 represents a three-dimensional point on the non-planar (or otherwise asymmetrical) display screen. The plane 2440 extends through the 3D point cloud 2430 in accordance with a least squares analysis of the 3D point cloud 2430.

The least squares fitting analysis is for generating coefficients of the equation of a plane in 3D spaces in response to 3D point-cloud points. For example:

$$Ax+Bx+Cz=D \qquad \text{(Eq. 36)}$$

where D is the determinant defined by the coefficients A, B and C.

Expressed in terms of z:

$$\vec{a} \rightarrow z = a_1 x + a_2 y + a_3 \qquad \text{(Eq. 37)}$$

where a is the determinant defined by the coefficients $a_1$, $a_2$ and $a_3$.

The x-y points in the 3D point cloud are received as input for determining a pseudo-Vandermonde matrix for the objective matrix input when executing a least squares optimization analysis. The z points are received as input for determining the right-hand side (RHS) vector of the equation:

$$\vec{b} = V\vec{a} \qquad \text{(Eq. 38)}$$

For N points in the point cloud, the pseudo-Vandermonde matrix and the RHS z-vector are:

$$V = \begin{bmatrix} x_1 & y_1 & 1 \\ x_2 & y_2 & 1 \\ x_3 & y_3 & 1 \\ \vdots & \vdots & \vdots \\ x_N & y_N & 1 \end{bmatrix} \qquad \text{(Eq. 39a)}$$

$$\vec{b} = \begin{bmatrix} z_1 \\ z_2 \\ z_3 \\ \vdots \\ z_N \end{bmatrix} \qquad \text{(Eq. 39b)}$$

The solution to Eq. 38, which contains the coefficients of the plane as specified in Eq. 37 is:

$$\vec{a} = (V^T V)^{-1} V^T \vec{b} \qquad \text{(Eq. 40)}$$

With reference back again to 2330, the fitted plane (e.g., 2440) orientation is determined with respect to the angles formed between the projector optical axis and the fitted plane normal vector. The plane's normal vector coefficients are obtained from the plane equation coefficients of Eq. 36:

$$\vec{n}_{plane} = \begin{bmatrix} n_{plane,x} \\ n_{plane,y} \\ n_{plane,z} \end{bmatrix} = \begin{bmatrix} A \\ B \\ C \end{bmatrix} \qquad \text{(Eq. 41)}$$

Figure 25:
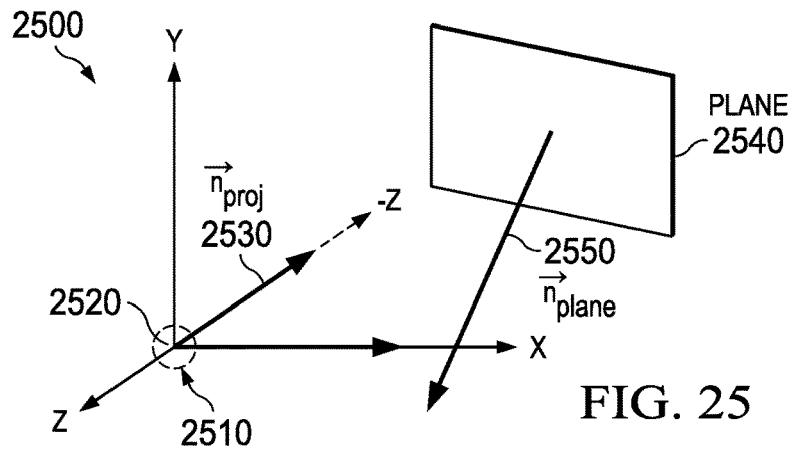
FIG. 25 is an orthographic perspective view of a geometry showing a projector optical axis and a fitted plane normal vector.

FIG. 25 is an orthographic perspective view of a geometry showing a projector optical axis and a fitted plane normal vector. In general, geometry 2500 includes a center 2520 of the projector positioned at the origin (0,0,0) and having an orientation 2510 defined by the x, y and z axes. The projector normal vector 2530 $\vec{n}_{proj}$ is oriented in the opposite direction of the z axis. A fitted plane 2540 is determined in response to a least squares analysis of a 3D point cloud of a projection screen surface through with the projector normal vector 2530 $\vec{n}_{proj}$ extends. A fitted plane normal vector 2550 $\vec{n}_{plane}$ extends from a central point of the fitted plane 2540 (e.g., so the fitted plane normal vector 2550 $\vec{n}_{plane}$ is perpendicular to fitted plane 2540).

The pitch and yaw angles of the fitted plane can be determined by calculating the angles between the projector optical axis and the screen plane normal vector. The optical axis of the projector can be defined as the vector:

$$\vec{n}_{proj} = \begin{bmatrix} 0 \\ 0 \\ -1 \end{bmatrix} \qquad \text{(Eq. 42)}$$

Figure 26:
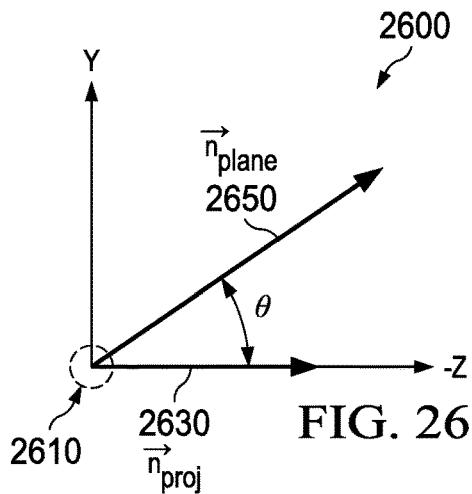
FIG. 26 is an orthographic perspective view of a geometry showing a pitch angle between a projector optical axis and a fitted plane normal vector.

FIG. 26 is an orthographic perspective view of a geometry showing a pitch angle between a projector optical axis and a fitted plane normal vector. In general, geometry 2600 includes the projector normal vector 2630 $\vec{n}_{proj}$ (oriented in the opposite direction of the z axis), which intersects they axis. The projector normal vector 2630 $\vec{n}_{proj}$ and they axis define a first plane 2610. The fitted plane normal vector 2650 $\vec{n}_{plane}$ intersects the origin of they and −z axes so the fitted plane normal vector 2650 $\vec{n}_{plane}$ also includes a first angle θ from the projector normal vector 2630 $\vec{n}_{proj}$, where the first angle θ is a pitch angle rotated within the first plane. The pitch angle (θ) is:

$$\vec{V}_\theta = \begin{bmatrix} 0 \\ n_{plane,y} \\ n_{plane,z} \end{bmatrix} \qquad \text{(Eq. 43)}$$

$$\theta = \tan^{-1}\left(\frac{\|\vec{n}_{proj} \times \vec{V}_\theta\|}{\vec{n}_{proj} \cdot \vec{V}_\theta}\right) \qquad \text{(Eq. 44)}$$

A yaw angle (φ) of the fitted plane normal vector 2650 $\vec{n}_{plane}$ is described with reference to FIG. 27.

Figure 27:
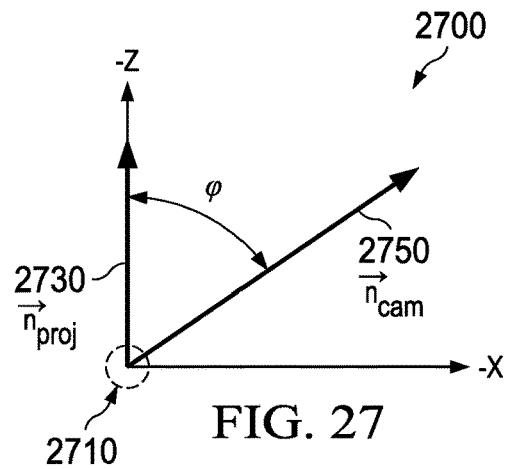
FIG. 27 is an orthographic perspective view of a geometry showing a yaw angle between a projector optical axis and a fitted plane normal vector.

FIG. 27 is an orthographic perspective view of a geometry showing a yaw angle between a projector optical axis and a fitted plane normal vector. In general, geometry 2700 includes the projector normal vector 2730 $\vec{n}_{proj}$ (oriented in the opposite direction of the z axis), which intersects the −x axis (where the projector normal vector 2730 and the x axis define a second plane 2710). The fitted plane normal vector 2750 $\vec{n}_{plane}$ also intersects the origin of the −x and the −z axes so the fitted plane normal vector 2750 $\vec{n}_{plane}$ includes a second angle φ with respect to the projector normal vector 7630 $\vec{n}_{proj}$, where the second angle φ is the pitch angle rotated within the second plane. The yaw angle (φ) is:

$$\vec{V}_\varphi = \begin{bmatrix} n_{plane,x} \\ 0 \\ n_{plane,z} \end{bmatrix} \quad \text{(Eq. 45)}$$

$$\varphi = \tan^{-1}\left(\frac{\|\vec{n}_{proj} \times \vec{V}_\varphi\|}{\vec{n}_{proj} \cdot \vec{V}_\varphi}\right) \quad \text{(Eq. 46)}$$

With reference back again to 2335, a surface curvature for each point in a point cloud is calculated. The surface curvature for each point can be calculated by determining a vector (e.g., direction) that is normal to a surface defined at each point of the 3D point cloud. The surface curvature (e.g., of a surface topology described by a 3D point cloud) can be used to enhance the accuracy of the transforms described herein, and to decrease noise, for example, that results from errors and/or distortion in measurement (e.g., which can be caused by ambient light obscuring structured elements that are optically projected and optically captured for characterizing a projection screen surface), quantization, calculations, missing data and discontinuities in data related to the point cloud.

For example, the curvature at each point of a given surface topology (e.g., as described by the 3D point cloud) can be quantized by determining how much the normal vector for each 3D point-cloud point deviates (e.g., is angled away from) from the normal vector for a perfect planar surface (e.g., the best-fitted plane 2440). In a perfect planar surface, the normal vectors at each one of the cloud's points include the same magnitude and orientation as magnitude and orientation of the best-fitted plane. In contrast, non-planar surfaces (such as projection surfaces defined by a 3D point cloud) include a normal vector at each point (e.g., in a given surface) that can independently deviate from the orientation of the normal vector of the best-fitted plane (e.g., for the given surface). The greater the deviation of points in the projection surface from a perfect planar surface, the greater the difference in magnitude and orientation of the normal vector of each point (e.g., in the given surface) with respect to the perfect planar surface.

The normal vector for each point of a numerical description (e.g., 3D point cloud) of a surface for projection (e.g., non-planar projection screen) can be calculated numerically using data from the 3D point cloud. As described hereinbelow with respect to FIG. 28A and FIG. 28B, the normal vector for each point can be determined in response to neighboring point information for each point of the description of the projection surface (which is described by the 3D point cloud).

Figure 28A:
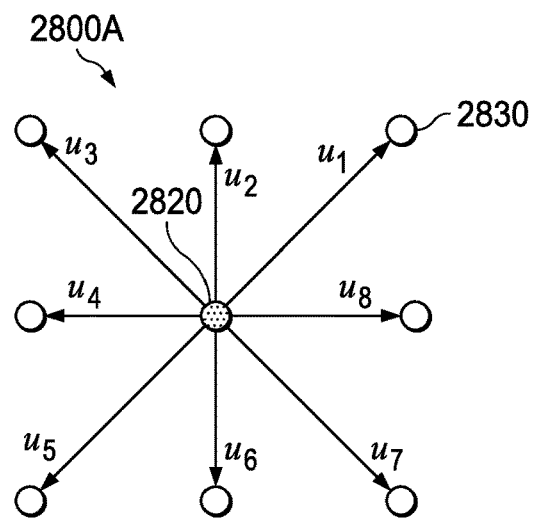
FIG. 28A is a top-view diagram of example directional vectors for a reference point and the neighboring points of a reference point.

FIG. 28A is a top-view diagram of example directional vectors for a reference point and the neighboring points of a reference point. For each reference point 2820 of an example description of a projection surface, there are eight neighboring points 2830 (less neighboring points exist for the reference points located along an edge and/or at a corner of the described projection surface). A respective directional vector $\vec{u}$ is determined between a given reference point and each of the closest neighbors, and a cross product determined in response to each of the directional vectors $\vec{u}$, such that a normal vector $\vec{u}_{avg}$ for the reference point can be determined (as described hereinbelow).

Figure 28B:
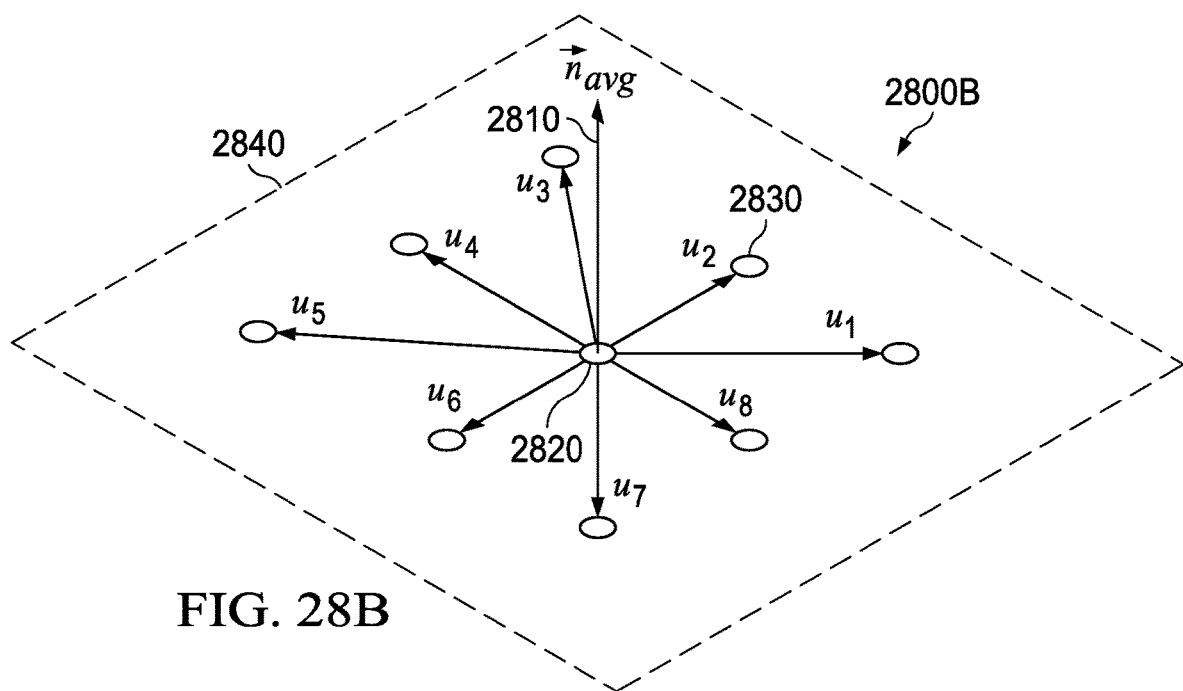
FIG. 28B is an orthogonal diagram of an example normal vector determined in response to directional vectors for a reference point.

FIG. 28B is an orthogonal diagram of an example normal vector determined in response to directional vectors for a reference point. For example, a normal vector $\vec{n}_{avg}$ (2810) is determined in response to each cross product of adjacent pairs (e.g., $\vec{u}_1$ and $\vec{u}_2$, $\vec{u}_2$ and $\vec{u}_3$, ..., $\vec{u}_8$ and $\vec{u}_1$) of directional vectors $\vec{u}$, in which the x, y components of the 3D point cloud lie in the reference plane 2840.

As the magnitude of the directional vectors becomes vanishingly small (e.g., in theory), the z-components of the respective neighbor points approach the reference plane 2840, and the cross products of the adjacent pairs of directional vectors $\vec{u}$ approach a like value (which is perpendicular to the directional vectors $\vec{u}$). In a similar manner (e.g., because of a relative closeness of neighboring points in the point cloud, the average of each cross product can be used to substantially determine (e.g., approximate) the normal vector $\vec{n}_{avg}$ for a reference point within the 3D point cloud.

For a reference point $\vec{p}$ and a neighbor point $\vec{q}$ (where the reference point $\vec{p}$ and each neighbor point $\vec{q}$ are points from a 3D point cloud), the directional vector in 3D space can be calculated as:

$$\vec{u} = \begin{bmatrix} u_x \\ u_y \\ u_z \end{bmatrix} = \vec{q} - \vec{p} \quad \text{(Eq. 47)}$$

The cross product of two adjacent pairs (e.g., $\vec{u}_1$ & $\vec{u}_2$) directional vectors is (e.g., when the adjacent directional vector pair is coplanar):

$$\vec{v} = \begin{bmatrix} v_x \\ v_y \\ v_z \end{bmatrix} = \vec{u}_1 \times \vec{u}_2 \quad \text{(Eq. 48)}$$

For each of the n-pairs of adjacent directional vectors, the average surface normal for a 3D point cloud element is defined as:

$$\vec{v}_{avg} = \frac{\vec{v}_1 + \vec{v}_2 + \ldots + \vec{v}_n}{n} \quad \text{(Eq. 49)}$$

The calculated average vector $\vec{v}_{avg}$ is a close approximation (e.g., substantially close to the value) of the normal vector $\vec{n}_{avg}$. The normal vector $\vec{n}_{avg}$ can be substantially determined, for example, when interpolations performed in response to the calculated normal vector $\vec{v}_{avg}$ over a given set of data points is at least as accurate as interpolations performed without determining the normal vector $\vec{v}_{avg}$.

The average vector $\vec{v}_{avg}$ can be determined for each point of the 3D point cloud. The resulting average vector $\vec{v}_{avg}$ for each point of the 3D point cloud can be stored in memory. The stored array (e.g., stored as a bi-dimensional array) of average vectors $\vec{v}_{avg}$ can be used as slope information for ordering, validating and/or normalizing the points of a 3D point cloud as determined by triangulation (e.g., as described hereinabove with respect to FIGS. 19-22).

The stored array of average vectors $\vec{v}_{avg}$ can also be used as slope information for filtering and correcting results of transforms of the 3D point cloud determined for a particular projection screen surface. For example, the depth-compensated point-cloud matrix 3530, the projector-perspective compensated-depth 3D point cloud 3730 and the warping engine control points 3840b can be filtered in response to stored array of average vectors $\vec{v}_{avg}$ (in which such matrixes are described below at least with respect to FIGS. 35-38). Such filtering can include normalizing or "clipping." Normalizing can include weighted averaging in which weights for points in a matrix are applied in response to a standard deviation from a mean. Clipping can include reassigning a statistically valid value to "outlier" points that include depths that exceed a topology derived from the 3D point cloud and the stored array of average vectors $\vec{v}_{avg}$ Accordingly, noise in the warping control points (which can result from quantization thresholds or projection surface calculations) can be reduced, which results in higher quality transformations of pixels for display (which in turn can improve the apparent quality of a transformed and projected image.

In cases where data for a neighboring point is missing (e.g., because of a reference point being located at a corner or along an edge, or because a physical obstruction has obscured a line of sight to a surface point being triangulated), less neighboring points (e.g., less than eight) can be used to determine the average vector $\vec{v}_{avg}$. In one example, each of the directional vectors $\vec{u}$ can be parametrically weighted to compensate for missing or non-symmetrically spaced neighboring points (e.g., where symmetrical spacing includes an angular spacing of 45-degrees between adjacent directional vectors $\vec{u}$). As an example of parametric weighting when the directional vector $\vec{u}_7$ is missing, the directional vectors $\vec{u}_8$ and $\vec{u}_6$ can be more heavily weighted in accordance with geometric principles to help compensate for a lack of data sufficient to define the directional vector $\vec{u}_7$ (a new vector $\vec{u}_7$ can also be constructed based on the neighboring points of the pointed-to point of $\vec{u}_7$). As another example of parametric weighting, directional vectors for neighboring points can be more heavily weighted for neighboring points closer to the given point, and less heavily weighted for neighboring points farther from the given point.

With reference again to 2340, a rotation matrix is determined (e.g., built) for a rotation operation of the fitted plane and the 3D point cloud. The rotation operation is defined by a 3D rotation matrix. For proper rotation, each point in the point cloud (in vector form) is respectively multiplied by the rotation matrix. Assuming a roll angle of zero degrees, the rotation matrix M is:

$$M = \begin{bmatrix} \cos(\varphi) & -\cos(\theta)+\sin(\theta)\sin(\varphi) & \cos(\theta)\sin(\varphi) \\ 0 & \cos(\theta)\cos(\varphi) & -\sin(\theta)\cos(\varphi) \\ -\sin(\varphi) & \sin(\theta)\cos(\varphi) & \cos(\theta)\cos(\varphi) \end{bmatrix} \quad \text{(Eq. 50)}$$

In 2350, the 3D point cloud is rotated in accordance with the rotation operation. The rotation operation is in response to the pitch and yaw angles of the observer with respect to the fitted plane. The rotated 3D points ($\vec{p}_r$) can be expressed from the observer point of view (the observer perspective) as follows:

$$\vec{p}_r = M\vec{p} \quad \text{(Eq. 51)}$$

Figure 29:
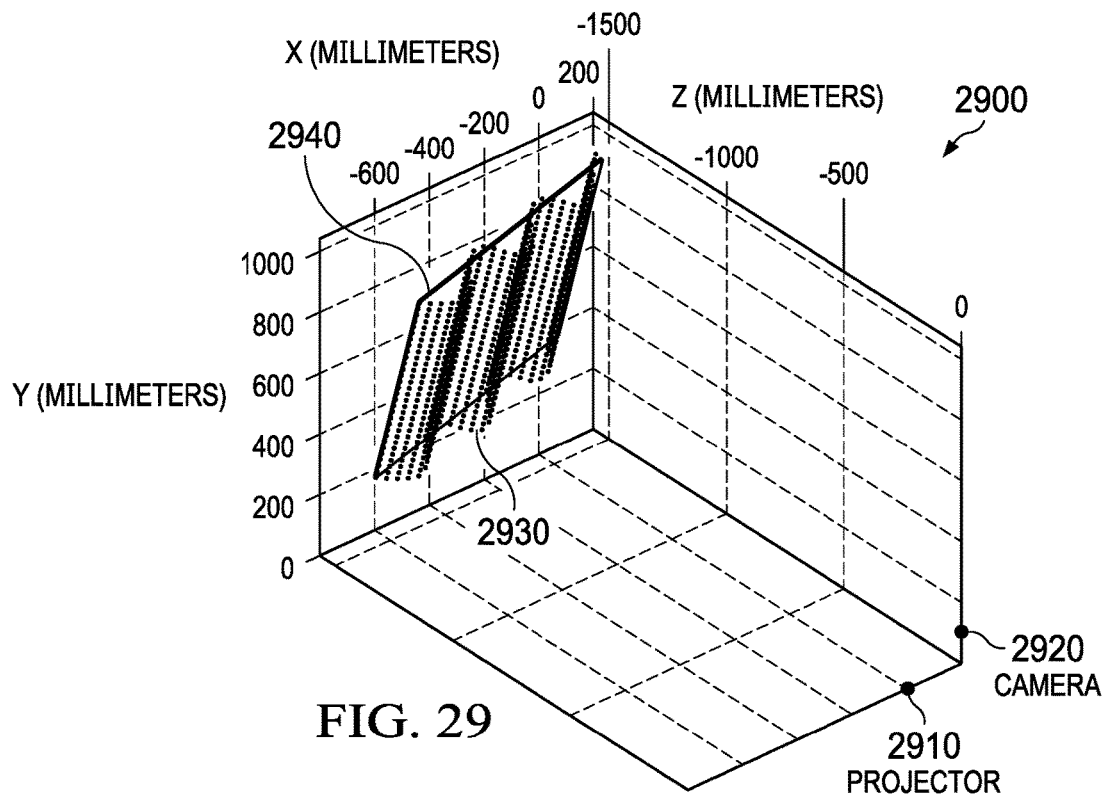
FIG. 29 is a perspective view of a system geometry of a fitted plane and a three-dimensional point cloud rotated in response to an observer's perspective.

FIG. 29 is a perspective view of a system geometry of a fitted plane and a three-dimensional point cloud rotated in response to an observer's perspective. In an example geometry 2800, a 3D point cloud 2830 and a fitted plane 2840 are rotated in accordance with an observer location (e.g., specified by coordinates). The 3D point cloud 2830 is a 3D point cloud such as 3D point cloud 1930. Accordingly, the 3D point cloud is determined based the geometries of the projector 2810 and the camera 2820. The rotation of the 3D point cloud is performed in response to orienting the fitted plane normal vector 2550 $\vec{n}_{plane}$ with respect to the coordinates of the observer.

With reference to 750 again, the three-dimensional points of the 3D point cloud are rotated (in the single camera mode) and translated for mathematically modeling what an observer would see from the observer position. Accordingly the distortion perceived by the observer can be both identified and corrected. The rotation of the 3D point cloud is for rearranging the points in the 3D point cloud to create a rectangular image with little or no apparent local aspect ratio distortion. The points in the 3D point cloud are rearranged to form (e.g., in outline) a rectangular area with the correct aspect ratio being in response to the determined perspective of the observer. The correction of various points within the 3D point cloud is described hereinbelow with respect to FIG. 30.

Figure 30:
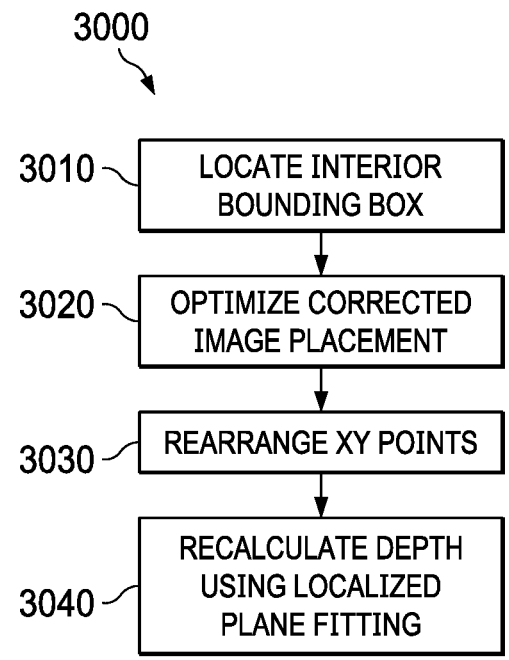
FIG. 30 is a flow diagram for identifying and correcting distortion perceived by the observer.

FIG. 30 is a flow diagram for identifying and correcting distortion perceived by the observer. Flow 2900 begins in 2910, where a location of interior bounding box is determined. The interior bounding box defines a boundary for including whichever points of the 3D point cloud are to be displayed after correcting for distortion as perceived from the position of the observer.

The points in the rotated 3D point cloud represent the projection screen surface position, shape and orientation as perceived by an observer. The points of the 3D point cloud are mathematically derived in response to the intersection of (e.g., notional) optical rays emanating from the each of the projector and the camera. The projector optical rays, in turn, are defined the positions of the warping engine control points, each of which controls a portion of an entire imager plane area (e.g., an array of micromirrors) so the entire imager plane area is controlled by the warping engine control points. While the 3D point cloud ideally covers the largest image that could be projected by the projector, the projection of the corrected image can entail reducing the number of pixels of the projected image. Accordingly, portions of the edges of the 3D point cloud are bounded by an interior bounding box before projection of the corrected image.

The interior bounding box defines which pixels are to be corrected (e.g., defining a limited subset of pixels to be processed reduces processing requirements and speeds performance). The interior bounding box also forms the rectangular outside border of the displayed image (e.g., projected onto an asymmetric screen surface and observed from the observer coordinates).

Figure 31:
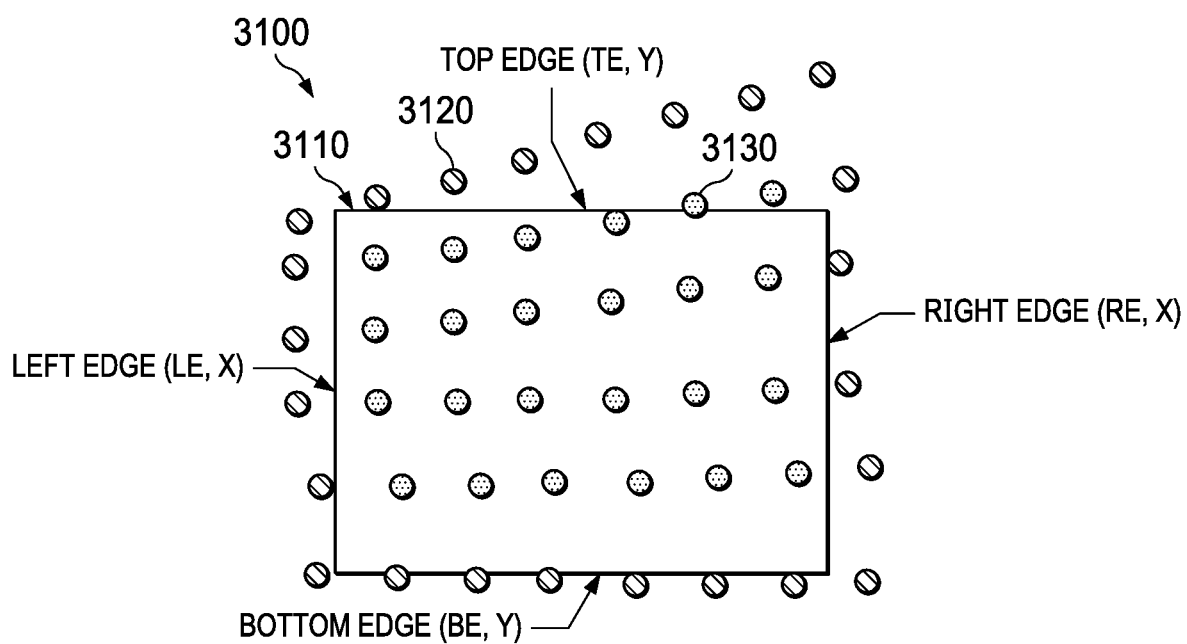
FIG. 31 is a diagram of an interior bounding box for defining a rectangular area of a distorted three-dimensional point cloud as perceived by an observer.

FIG. 31 is a diagram of an interior bounding box for defining a rectangular area of a distorted three-dimensional point cloud as perceived by an observer. The 3D point cloud includes point cloud exterior points 3020 and point cloud interior points 3030. The interior bounding box 3010 limits which rows and columns constitute the point cloud interior points 3030. The operations for determining the interior bounding box 3010 are performed in the x-y plane. (Changes in depth occur along the z axis and are described hereinbelow with respect to FIG. 32, FIG. 33, FIG. 33 and FIG. 34.)

The interior bounding box (IBB) defines the working area, that is, the valid area in the x-y plane in which all of the points are moved for correction of distortion. The point cloud raster scan array is searched along the edges of the 3D point cloud to help determine the maximum and minimum values in the x and y directions.

The corners of the IBB 3010 are defined with respect to the edges of the IBB 3010. For example: the left edge (LE) corner is adjacent to the top-most x component of the first column in the array; the right edge (RE) corner is adjacent to the bottom-most x component of the last column in the array; the bottom edge (BE) corner is adjacent to the left-most y component of the last row in the array; and the top edge (TE) corner is adjacent to the right-most y component of the first row in the array. (Accordingly, the corner being denoted lies in a clockwise direction adjacent to the describing edge.)

With reference to 2920, the optimal image size and placement is evaluated. The optimal placement for the corrected image is evaluated in response to the edges of the IBB 3010 are defined. The aspect ratio of the IBB 3010 is determined in accordance with the expression:

$$A_{ibb} = \frac{RE_x - LE_x}{TE_y - BE_y} \tag{Eq. 52}$$

Similarly, the aspect ratio of the imager (e.g., DMD, or liquid crystal display) is calculated as follows:

$$A_{DMD} = \frac{HRes_{DMD}}{VRes_{DMD}} \tag{Eq. 53}$$

Depending on the relationship between the IBB 3010 and DMD aspect ratios, the corners of the corrected image (x-y points) from the observer perspective are:

If $A_{ibb} \geq A_{DMD}$:     a $$h = TE_y - BE_y \tag{Eq. 54}$$

$$w = A_{DMD} * h \tag{Eq. 55}$$

$$q = \frac{RE_x - LE_x - w}{2} \tag{Eq. 56}$$

$$tl_x = LE_x + q \quad tl_y = TE_y \tag{Eq. 57}$$

$$tr_x = RE_x - q \quad tr_y = TE_y \tag{Eq. 58}$$

$$br_x = RE_x - q \quad br_y = BE_y \tag{Eq. 59}$$

$$bl_x = LE_x + q \quad bl_y = BE_y \tag{Eq. 60}$$

If $A_{DMD} < A_{IBB}$:     b

-continued $$w = RE_x - LE_x \tag{Eq. 61}$$

$$h = \frac{w}{A_{DMD}} \tag{Eq. 62}$$

$$q = \frac{TE_y - BE_y - h}{2} \tag{Eq. 63}$$

$$tl_x = LE_x \quad tl_y = TE_y - q \tag{Eq. 64}$$

$$tr_x = RE_x \quad tr_y = TE_y - q \tag{Eq. 65}$$

$$br_x = RE_x \quad br_y = BE_y + q \tag{Eq. 66}$$

$$bl_x = LE_x \quad bl_y = BE_y + q \tag{Eq. 67}$$

where q is the vertical or horizontal (depending on the aspect ratio) padding for helping define the location of the first corrected point inside the IBB 3010 so the aspect ratio is maintained in the corrected image.

In 2930, the x-y components of the 3D point cloud interior points of the rotated point cloud are moved to a respective new location inside the rectilinear interior bounding box. The x-y components of the 3D points are rearranged into a rectangular grid for reconstructing the distorted image (in which the distortion results from non-planar and non-smooth regions in the projection screen surface). Local aspect ratio distortion can result from uneven rotation and rearrangement of the x-y components of the 3D point cloud interior points of the rotated point cloud. The local aspect ratio distortion is corrected by spacing the points in the x and y directions evenly. The spacing between x components and the spacing between y components is:

$$S_x = \frac{tr_x - tl_x}{N - 1} \tag{Eq. 68}$$

$$S_y = \frac{tl_y - bl_y}{N - 1} \tag{Eq. 69}$$

where N is the number of columns and M is the number of rows in the point cloud array, respectively. After the vertical and horizontal spacings are determined, each of the points in the point cloud is mapped to a respective new location in the observer perspective x-y plane, where the respective new locations are:

$$\vec{p}_c = \begin{bmatrix} p_{c,x} \\ p_{c,y} \\ p_{u,z} \end{bmatrix} = \begin{bmatrix} tl_x + S_x(col - 1) \\ tl_y - S_y(row - 1) \\ p_{u,z} \end{bmatrix} \tag{Eq. 70}$$

Figure 32A:
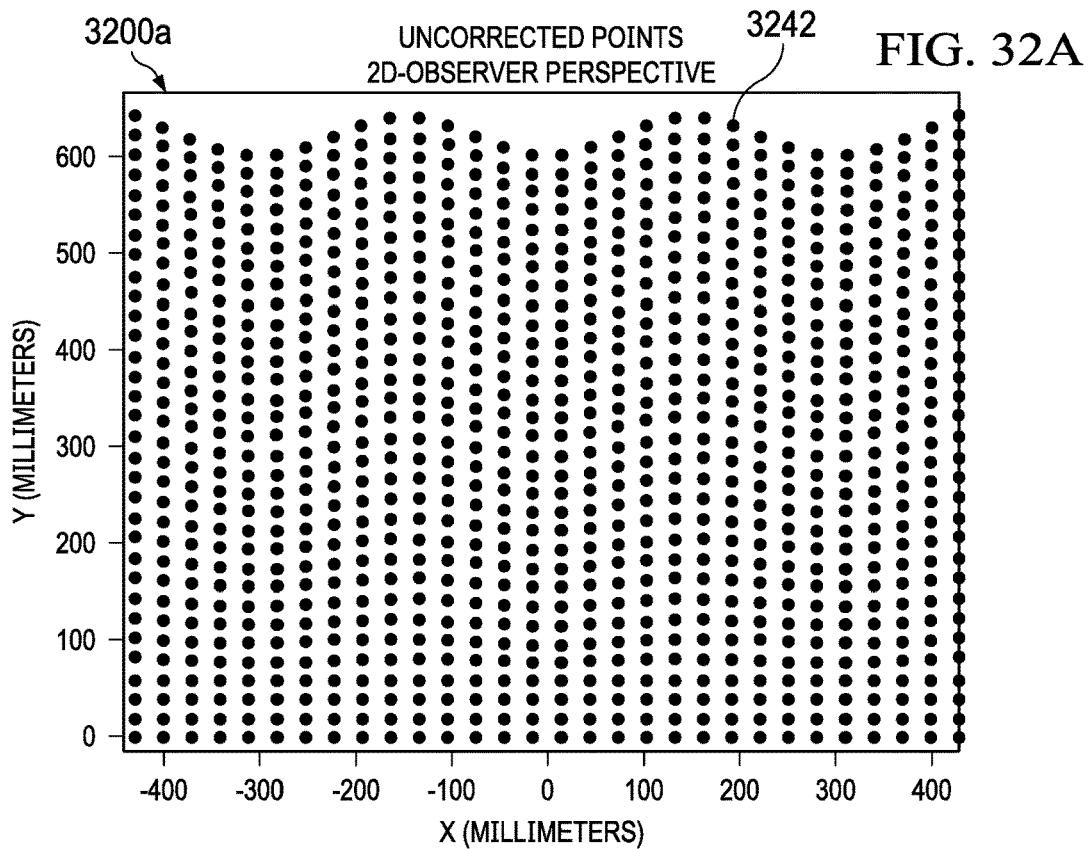
FIG. 32A is a perspective view of an uncorrected x-y spacing point cloud.

FIG. 32A is a perspective view of an uncorrected x-y spacing point cloud. In an observer perspective x-y plane 3100a, uncorrected x-y spacing point cloud points are mapped to an observer perspective x-y plane. Even though the point cloud points have been mapped to a two-dimensional plane from the point of view of an observer, distortions caused by the uneven projection screen surface during capture of the three-dimensional point cloud are apparent (e.g., as demonstrated by the non-rectilinear patterns even when displayed in an x-y plane).

Figure 32B:
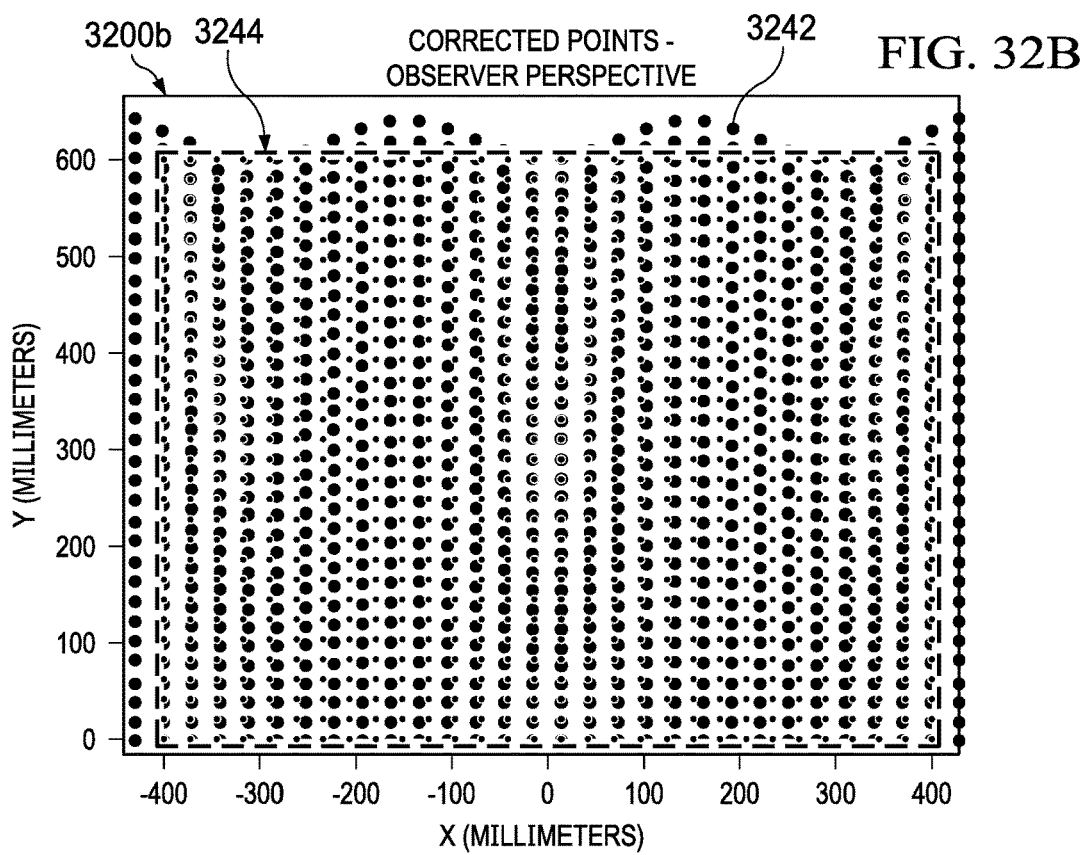
FIG. 32B is a perspective view of corrected x-y spacing for an observer perspective x-y point cloud.

FIG. 32B is a perspective view of corrected x-y spacing for an observer perspective x-y point cloud. For example, the observer perspective x-y plane (generally as 3100b)

includes a geometric projection of the 3D point cloud 3142 into the observer perspective x-y plane and a rectilinear grid 3144 of corrected x-y spacing points in the observer perspective x-y plane.

When the uncorrected x-y spacing points 3142 are respectively mapped to corrected x-y spacing points (e.g., as shown by rectilinear grid 3144), the points of the corrected x-y spacing point cloud appear to be uniformly distributed in a normal grid pattern. Accordingly, the corrected x-y spacing points in the observer perspective x-y plane 3100b are separated from adjacent corrected x-y spacing points in accordance with a uniform aspect ratio distributed across the entire set of corrected x-y spacing points.

The corrected x-y spacing points are generated by mapping the point cloud points to a new location in the x-y plane independently of depth information (e.g., generated in accordance with Eq. 70 without regard for changes in depth resulting from the respacing). Correcting the spacing the x-y point cloud points without adjusting the depths of the pixels being mapped can lead to distortion when the corrected x-y point cloud points are repositioned over an asymmetric screen surface with an uneven topology.

Figure 33:
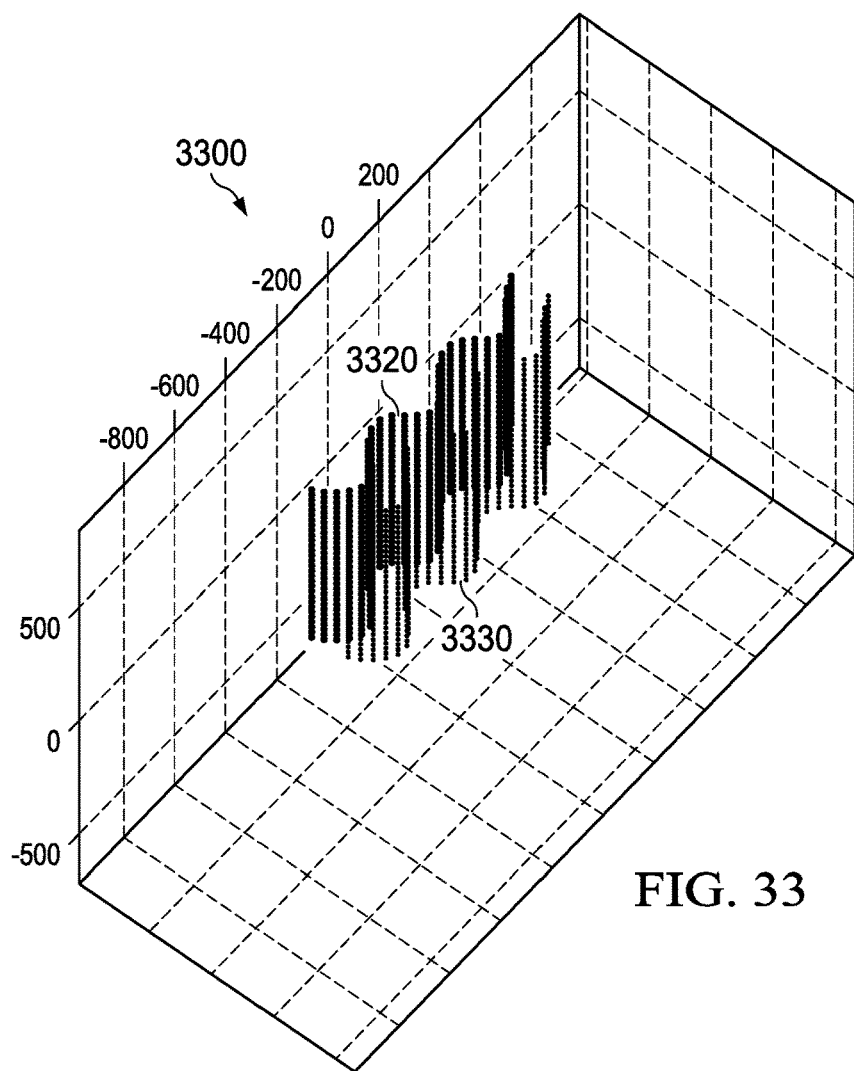
FIG. 33 is a perspective view of a system geometry of a 3D point cloud and an uncorrected depth 3D point cloud.

FIG. 33 is a perspective view of a system geometry of a 3D point cloud and an uncorrected depth 3D point cloud. In an example geometry 3200, a 3D point cloud 3220 and an uncorrected depth (but x-y corrected) 3D point cloud 3230 are arranged. The 3D point cloud 3220 is the characterization of the projection screen surface as captured by a camera, which captures information characterized asymmetries of the projection screen surface. The uncorrected depth 3D point cloud 3230 includes corrected x-y spacing points for which each of the corrected x-y spacing points include a depth (e.g., z-information), which has not been corrected in response to laterally moving (e.g., in an x-y plane of an observers perspective) the points across a projection screen surface of uneven topology. Accordingly, at least some of the points of the uncorrected depth 3D point cloud do not lie within the projection screen surface characterized by the 3D point cloud. As described hereinbelow, compensated depth information of each point can be determined from the projection screen surface parametric information stored in the 3D point cloud.

With reference again to 2940, the depth of each corrected x-y spacing point of the observer-perspective two-dimensional plane is generated in accordance with localized plane fitting on a non-rectangular grid. For example, the compensated depths can be determined by replacing uncorrected depth values with "reconstituted" depth values determined from the original 3D point cloud.

The newly generated depth information is calculated by a local plane fitting algorithm over a non-regular grid array. The original point cloud is aligned with the corrected x-y (but not z) spacing cloud so depth information of each point corrected x-y (but not z) spacing cloud is determined by the depth information of the closest neighbors in a geometric projection of the 3D point cloud in accordance with the observer perspective x-y plane.

For example, searching, selection, fitting and depth generation operations are performed for determining the compensated depth information for each point $\vec{p}_c$ in the corrected x-y (but not z) spacing cloud. The searching operation includes searching for the closest point in a geometric projection of the 3D point cloud in accordance with the observer perspective x-y plane. The selection operation includes selecting the closest point neighbors on the original 3D point cloud as determined by associated vector-angles. The fitting operation includes fitting a plane through the selected point neighbors. The depth determination operation includes determining a depth in response to the fitted plane and the selected closest point neighbors.

In the searching operation for depth determination, the point $\vec{p}_{ref}$ closest to $\vec{p}_c$ is searched for (e.g., only) in a geometric projection of the 3D point cloud into an observer perspective x-y plane. Accordingly, a Euclidian distance is minimized, wherein the Euclidian distance from the point (for which depth information is being generated) to the closest point in (the geometric projection of the 3D point cloud in accordance with) the observer perspective x-y plane. To reduce processing requirements, the 3D point cloud interior points are searched, while the 3D point cloud exterior points can be excluded (see FIG. 31). The Euclidean distance between the point for which depth information is being generated and the closest point in the geometric projection of the 3D point cloud in accordance with the observer perspective x-y plane is:

$$\vec{p}_{ref} = \min(\|p_c - p_{u,all}\|) \quad \text{(Eq. 71)}$$

Figure 34:
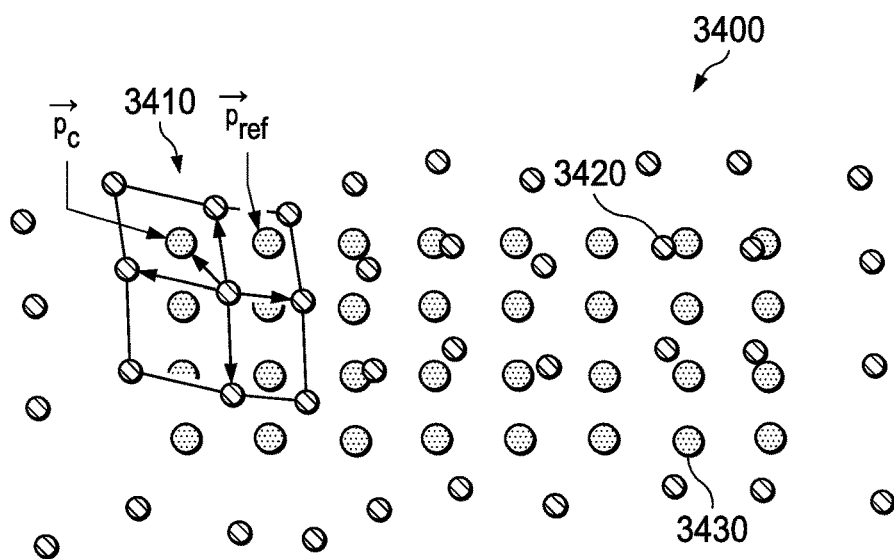
FIG. 34 is a diagram of an observer perspective x-y plane including a geometric projection of the 3D point cloud into the observer perspective x-y plane and the corrected x-y spacing points in the observer perspective x-y plane.

FIG. 34 is a diagram of an observer perspective x-y plane including a geometric projection of the 3D point cloud into the observer perspective x-y plane and the corrected x-y spacing points in the observer perspective x-y plane. For example, the observer perspective x-y plane 3300 includes a geometric projection 3320 of the 3D point cloud into the observer perspective x-y plane. The observer perspective x-y plane 3300 also includes the corrected x-y spacing points 3330 in the observer perspective x-y plane.

The geometric projection 3320 determines an uncorrected grid, whereas the corrected x-y spacing points 3330 determine a corrected grid. The uncorrected grid includes a set 3310 of closest neighbors for surrounding a closest neighbor $\vec{p}_{ref}$. Four quadrilaterals are formed by the set 3310 of closest neighbors and the closest neighbor $\vec{p}_{ref}$. One of the four quadrilaterals surrounds a particular point $\vec{p}_c$ of the corrected grid for which depth information is being determined.

Accordingly, the (e.g., entire) geometric projection 3320 of the 3D point cloud into the observer perspective x-y plane is searched to determine the closest neighbor $p_{ref}$ to the particular point $\vec{p}_c$ for which depth information is being determined. After the closest neighbor $p_{ref}$ to the particular point $\vec{p}_c$ is determined, the particular one of the four quadrilaterals surrounding a particular point $\vec{p}_c$ is identified and selected.

In the selection operation for depth determination, each of the four quadrilaterals is evaluated to identify and select the particular quadrilateral surrounding a particular point $\vec{p}_c$. Except for the apparent distortion in the uncorrected array, the corrected point would otherwise be located inside a rectangle. However, when such distortion occurs, the corrected point $\vec{p}_c$ occurs in one of the four adjacent, irregular quadrilaterals (of the uncorrected grid), which share the closest point $\vec{p}_{ref}$ as one corner of each of the four quadrilaterals. A two-dimensional, corrected-point locator vector (in the observer perspective x-y plane) $\vec{v}_c$ defines a spatial relationship between the $\vec{p}_{ref}$ vector and the particular point $\vec{p}_c$ vector. Accordingly:

$$\vec{v}_c = \vec{p}_c - \vec{p}_{ref} \quad \text{(Eq. 72)}$$

The angle $\omega_c$ of the directional vector is:

$$\omega_c = \tan^{-1}\frac{\vec{v}_{c,y}}{\vec{v}_{c,x}} \quad \text{(Eq. 73)}$$

The four directional vectors $\vec{v}_{d1\text{-}4}$ of the edges of a quadrilateral are respectively:

$$\vec{v}_{d1} = \vec{p}_{c(row,col+1)} - \vec{p}_{c(row,col)} \quad \text{(Eq. 74)}$$

$$\vec{v}_{d2} = \vec{p}_{c(row-1,col)} - \vec{p}_{c(row,col)} \quad \text{(Eq. 75)}$$

$$\vec{v}_{d3} = \vec{p}_{c(row,col-1)} - \vec{p}_{c(row,col)} \quad \text{(Eq. 76)}$$

$$\vec{v}_{d4} = \vec{p}_{c(row+1,col1)} - \vec{p}_{c(row,col)} \quad \text{(Eq. 77)}$$

The angles of the four directional vectors $\vec{v}_{d1\text{-}4}$ are calculated similarly as in Eq. 73 and are stored as a vector $\vec{\omega}_d$. The angles $\omega_c$ and $\vec{\omega}_d$ are rotated with respect to the angle of the directional vector corresponding to the right directional vector $\vec{v}_{d1}$.

$$\omega_c = \omega_c - \vec{\omega}_{d1} \quad \text{(Eq. 78)}$$

$$\vec{\omega}_d = \vec{\omega}_d - \vec{\omega}_{d1} \quad \text{(Eq. 79)}$$

Accordingly, each of the four directional vectors $\vec{v}_{d1\text{-}4}$ is defined in terms of the vector $\vec{v}_{d1}$. The quadrilateral in which the point $\vec{p}_c$ vector is located is determined in response to each of the four directional vectors $\vec{v}_{d1\text{-}4}$. The identification and selection of the enclosing quadrilateral defines which points in the original 3D point cloud are for recalculating the depth information of the corrected x-y spacing points in the observer perspective x-y plane.

FIG. 35 is a diagram of a corrected-point locator vector extending from an uncorrected closest point from which four directional vectors point to uncorrected points for defining four quadrilaterals in an observer perspective x-y plane. For example, the observer perspective x-y plane 3400 (e.g., which is similar to 3300) includes a closest point ($\vec{p}_{ref}$) 3420. The four directional vectors $\vec{v}_{d1\text{-}4}$ extend outwards from the closest point 3420 towards respective neighboring points of the uncorrected grid, which includes irregularly spaced uncorrected points in (e.g., irregular) rows and (e.g., irregular) columns. The corrected-point locator vector $\vec{v}_c$ extends from the closest point 3420 to the corrected point $\vec{p}_c$ 3430 for which depth information is to be determined.

The four quadrilaterals can be defined with respect to the row and column number of the closest point ($\vec{p}_{ref}$) 3420. A preceding row is one row before the row including the closest point in a vertical direction. A succeeding row is one row after the row including the closest point in the vertical direction. A preceding column is one column before the column including the closest point in a horizontal direction. A succeeding column is one column after the column row including the closest point in the horizontal direction.

A first quadrilateral Q1 includes a first point (which is the closest point 3420), a second point (which is pointed to by the vector $\vec{v}_{d2}$ and is in a preceding row and the same column with respect to the closest point 3420), a third point (which is in the preceding row and a succeeding column with respect to the closest point 3420) and a fourth point (which is pointed to by the vector $\vec{v}_{d1}$ and is in the same row and the succeeding column with respect to the closest point 3420).

A second quadrilateral Q2 includes a first point (which is the closest point 3420), a second point (which is pointed to by the vector $\vec{v}_{d2}$ and is in a preceding row and the same column with respect to the closest point 3420), a third point (which is in the preceding row and a preceding column with respect to the closest point 3420) and a fourth point (which is pointed to by the vector $\vec{v}_{d2}$ and is in the same row and the preceding column with respect to the closest point 3420).

A third quadrilateral Q3 includes a first point (which is the closest point 3420), a second point (which is pointed to by the vector $\vec{v}_{d4}$ and is in a succeeding row and the same column with respect to the closest point 3420), a third point (which is in the succeeding row and a preceding column with respect to the closest point 3420) and a fourth point (which is pointed to by the vector $\vec{v}_{d3}$ and is in the same row and the preceding column with respect to the closest point 3420).

A fourth quadrilateral Q4 includes a first point (which is the closest point 3420), a second point (which is pointed to by the vector $\vec{v}_{d4}$ and is in a succeeding row and the same column with respect to the closest point 3420), a third point (which is in the succeeding row and a succeeding column with respect to the closest point 3420) and a fourth point (which is pointed to by the vector $\vec{v}_{d1}$ and is in the same row and the succeeding column with respect to the closest point 3420).

The quadrilaterals and the points from the uncorrected point cloud (e.g., original 3D point cloud for characterized the projection screen surface). Collectively the quadrilaterals are defined in terms of $\vec{C}$. Each of the quadrilaterals of $\vec{C}$ are searched to determine which quadrilateral includes (encloses) a geometrical projection (e.g., from the observer perspective) of the corrected point $\vec{p}_c$. The determined enclosing quadrilateral is for determining a depth for the corrected point $\vec{p}_c$ in response to local plane fitting of the enclosing quadrilateral.

For Q1, and assuming $\omega_{d1} \geq \omega_c < \omega_{d2}$, the vertices of the quadrilateral Q1 can be expressed in 3D space:

$$C_{1,xyz} = \begin{bmatrix} p_{u,row,col-1,x} \\ p_{u,row,col-1,y} \\ p_{u,row,col-1,z} \end{bmatrix} \quad \text{(Eq. 80a)}$$

$$C_{2,xyz} = \begin{bmatrix} p_{u,row-1,col+1,x} \\ p_{u,row-1,col+1,y} \\ p_{u,row-1,col+1,z} \end{bmatrix}$$

$$C_{3,xyz} = \begin{bmatrix} p_{u,row,col+1,x} \\ p_{u,row,col+1,y} \\ p_{u,row,col+1,z} \end{bmatrix} \quad \text{(Eq. 80b)}$$

$$C_{4,xyz} = \begin{bmatrix} p_{u,row,col,x} \\ p_{u,row,col,y} \\ p_{u,row,col,z} \end{bmatrix}$$

For Q2, and assuming $\omega_{d2} \leq \omega_c < \omega_{d3}$, the vertices of the quadrilateral Q2 can be expressed in 3D space:

$$C_{1,xyz} = \begin{bmatrix} p_{u,row-1,col-1,x} \\ p_{u,row-1,col-1,y} \\ p_{u,row-1,col-1,z} \end{bmatrix} \quad \text{(Eq. 81a)}$$

$$C_{2,xyz} = \begin{bmatrix} p_{u,row-1,col,x} \\ p_{u,row-1,col,y} \\ p_{u,row-1,col,z} \end{bmatrix}$$

$$C_{3,xyz} = \begin{bmatrix} p_{u,row,col,x} \\ p_{u,row,col,y} \\ p_{u,row,col,z} \end{bmatrix} \quad \text{(Eq. 81b)}$$

$$C_{4,xyz} = \begin{bmatrix} p_{u,row,col-1,x} \\ p_{u,row,col-1,y} \\ p_{u,row,col-1,z} \end{bmatrix}$$

For Q3, and assuming $\omega_{d3} \leq \omega_c < \omega_{d4}$, the vertices of the quadrilateral Q3 can be expressed in 3D space:

$$C_{1,xyz} = \begin{bmatrix} p_{u,row,col-1,x} \\ p_{u,row,col-1,y} \\ p_{u,row,col-1,z} \end{bmatrix} \quad \text{(Eq. 82a)}$$

$$C_{2,xyz} = \begin{bmatrix} p_{u,row,col,x} \\ p_{u,row,col,y} \\ p_{u,row,col,z} \end{bmatrix}$$

$$C_{3,xyz} = \begin{bmatrix} p_{u,row+1,col,x} \\ p_{u,row+1,col,y} \\ p_{u,row+1,col,z} \end{bmatrix} \quad \text{(Eq. 82b)}$$

$$C_{4,xyz} = \begin{bmatrix} p_{u,row+1,col-1,x} \\ p_{u,row+1,col-1,y} \\ p_{u,row+1,col-1,z} \end{bmatrix}$$

For Q, and assuming $\omega_{d4} \leq \omega_c$, the vertices of the quadrilateral Q4 can be expressed in 3D space:

$$C_{1,xyz} = \begin{bmatrix} p_{u,row,col,x} \\ p_{u,row,col,y} \\ p_{u,row,col,z} \end{bmatrix} \quad \text{(Eq. 83a)}$$

$$C_{2,xyz} = \begin{bmatrix} p_{u,row,col+1,x} \\ p_{u,row,col+1,y} \\ p_{u,row,col+1,z} \end{bmatrix}$$

$$C_{3,xyz} = \begin{bmatrix} p_{u,row+1,col+1,x} \\ p_{u,row+1,col+1,y} \\ p_{u,row+1,col+1,z} \end{bmatrix} \quad \text{(Eq. 83b)}$$

$$C_{4,xyz} = \begin{bmatrix} p_{u,row+1,col,x} \\ p_{u,row+1,col,y} \\ p_{u,row+1,col,z} \end{bmatrix}$$

In the fitting operation for depth determination, a plane is fitted in response to corners selected from the enclosing quadrilateral. Depth information can be generated for the corrected point $\vec{p}_c$ 3430 in response to the fitted plane. The generated depth information can be a z component for projecting the corrected point $\vec{p}_c$ 3430 onto a virtual surface define by the original 3D point cloud (e.g., so a new point is generated for an image for generating an inverse image for distortion reduction in accordance with the observer perspective). The planes can be fitted through four points of the enclosing quadrilateral of $\vec{C}$, in accordance with Eq. 80-Eq. 83. Accordingly, the equation of a fitted local plane is calculated similarly with respect to Eq. 39-Eq. 40:

$$V = \begin{bmatrix} C_{1,x} & C_{1,y} & 1 \\ C_{2,x} & C_{2,y} & 1 \\ C_{3,x} & C_{3,y} & 1 \\ C_{4,x} & C_{4,y} & 1 \end{bmatrix} \quad \text{(Eq. 84)}$$

$$\vec{b} = \begin{bmatrix} C_{1,z} \\ C_{2,z} \\ C_{3,z} \\ C_{4,z} \end{bmatrix} \text{ and} \quad \text{(Eq. 85)}$$

$$\vec{a} = (V^T V)^{-1} V^T \vec{b} \quad \text{(Eq. 86)}$$

In the operation for determining a depth determination, the depth information is generated for the corrected point $\vec{p}_c$ in response to the fitted local plane. The depth information for the corrected point $\vec{p}_c$ can be determined in accordance with:

$$\vec{p}_{c,z} = a_1 \vec{p}_{c,x} + a_2 \vec{p}_{c,y} + a_3 \quad \text{(Eq. 87)}$$

FIG. 36 is a perspective view of a system geometry of a 3D point cloud and a compensated-depth 3D point cloud. In an example geometry 3500, a 3D point cloud 3520 and a compensated-depth 3D point cloud 3530 are arranged. The 3D point cloud 3520 is the characterization of the projection screen surface as captured by a camera, which captures information characterized asymmetries of the projection screen surface. The compensated-depth 3D point cloud 3530 includes corrected x-y spacing points for which each of the corrected x-y spacing points include a compensated depth (e.g., z-information) which has been corrected in response to laterally moving (e.g., in an x-y plane of an observers perspective) the points across an asymmetric (e.g., of uneven topology) projection screen surface. Accordingly, at least some of the points of the uncorrected depth 3D point cloud lie within (e.g., on) the projection screen surface characterized by the 3D point cloud. As described hereinbelow, the compensated-depth 3D point cloud is input to a warping engine for generating an inverse image for display on the characterized projection screen surface with reduced or no apparent distortion when viewed from the observer perspective.

With reference to 760 again, the compensated-depth 3D point cloud is transformed (e.g., rotated back) to the projector perspective for input as warping points to the warping engine. The warping engine generates a warped (e.g., inverse) image in response to the warping points. Processing for the inverse image generation is described hereinbelow with respect to FIG. 37 through FIG. 40.

The projector-perspective compensated-depth 3D point cloud describes a compensated point arrangement so an observer perceives a substantially rectangular, distortion-free image with a correct aspect ratio when viewed from the determined observer perspective. Each point of the compensated-depth 3D point cloud can be defined in a 3D space in real-world linear units (such as mm, inches, meters or feet). The translated x-y positions of the compensated-depth 3D point-cloud points determine adjustments for the warping engine to generate the inverse image for projection onto the asymmetric projection screen surface.

The point information from the compensated-depth 3D point cloud, however, is not directly input to the warping engine because the points of the compensated-depth 3D point cloud are defined from the observer perspective and because the points are denominated in three-dimensional real-world units.

FIG. 37 is a flow diagram for transforming the points of the compensated-depth 3D point cloud from the observer perspective to the projector perspective for warping engine input. The process flow 3600 helps ensure each point from compensated-depth 3D point cloud is usable by the warping engine for generating an inverse image for projection in accordance with the asymmetry of the projection screen surface. Projecting the inverse image in accordance with the asymmetry of the projection screen surface reduces the apparent distortion that would otherwise be apparent when viewing an image on the projection screen surface, which enhances the viewing experience.

The process flow 3600 begins in 3610, where the compensated-depth 3D point cloud is transformed to the projector perspective. The transformation includes rotating the compensated-depth 3D point cloud from the observer perspective to the projector perspective. Each of the points in the compensated-depth 3D point cloud is multiplied by a rotation matrix. The rotation matrix encodes the rotation transformation for executing the inverse operation of the rotation in Eq. 50. Accordingly, the inverse rotation is:

$$R = M^{-1} = M^T \quad \text{(Eq. 88)}$$

The observer perspective compensated-depth 3D point cloud is transformed to generate a projector-perspective compensated-depth 3D point cloud. For each point in the observer-perspective compensated-depth 3D point cloud:

$$\vec{p}_{co} = R\vec{p}_c \quad \text{(Eq. 89)}$$

where $\vec{p}_{co}$ is a corrected point-cloud point in 3D space from the projector perspective and $\vec{p}_c$ is the corrected point but from the observer perspective.

In 3620, the projector-perspective compensated-depth 3D point cloud is geometrically projected for fitting the image plane of a DMD. The point cloud is scaled for projection from the projector perspective. However, the points of the projector-perspective compensated-depth 3D point cloud are defined in terms of real-world linear units whereas the digital micromirror image plane is defined in terms of pixels and camera-projector calibration data defined in terms of projector optical rays.

For each point in the projector-perspective compensated-depth 3D point cloud, the corresponding projected pixel position is:

$$\vec{p}_{co,n} = \frac{\vec{p}_{co}}{p_{co,z}} \quad \text{(Eq. 90)}$$

$$u_c = \vec{p}_{co,n,x} * fc_{proj,x} + cc_{proj,x} \quad \text{(Eq. 91)}$$

$$v_c = \vec{p}_{co,n,y} * fc_{proj,y} + cc_{proj,y} \quad \text{(Eq. 92)}$$

Figure 38:
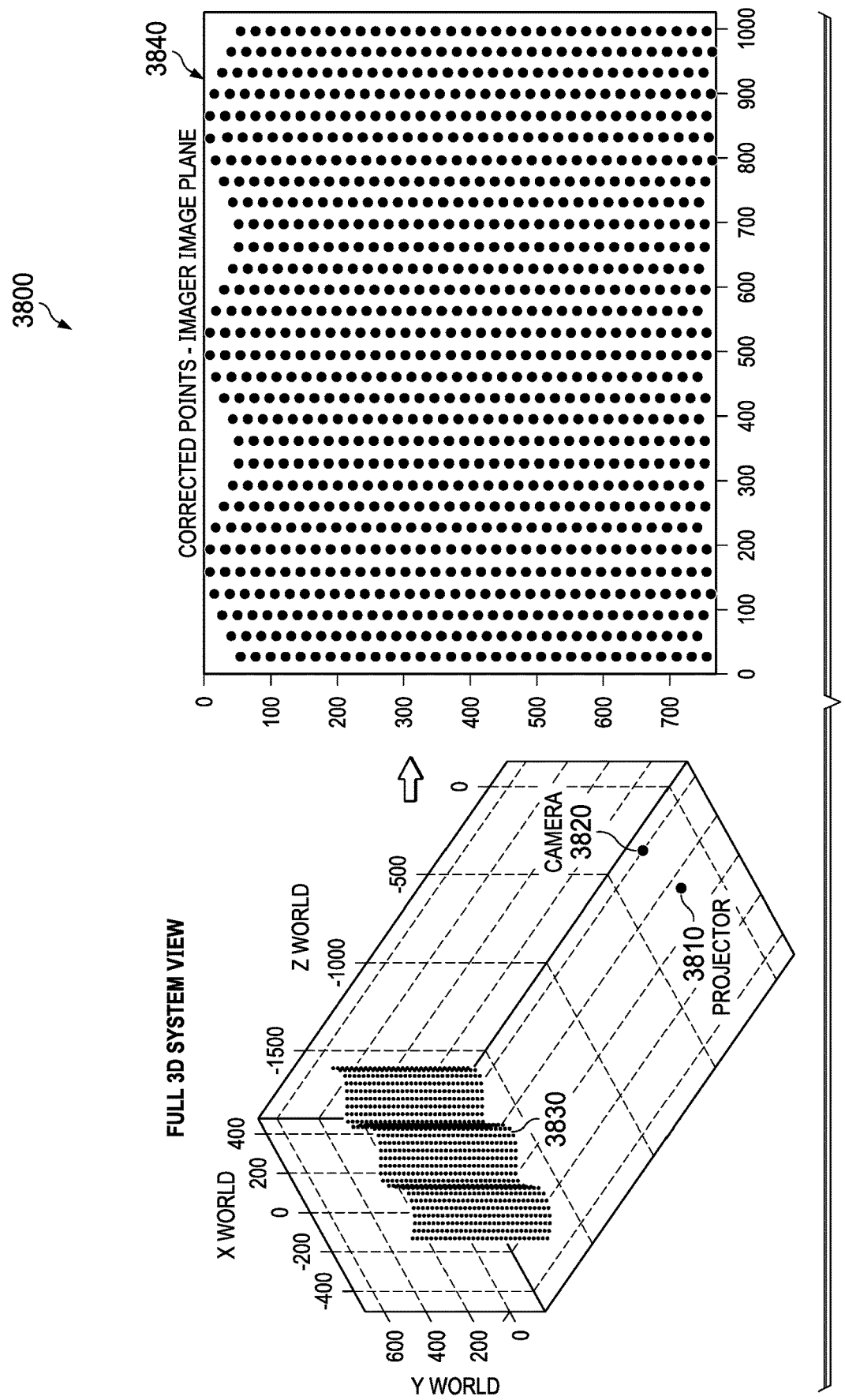
FIG. 38 is a diagram of a transformation from a projector-perspective compensated-depth 3D point cloud system geometry to an imager plane.

FIG. 38 is a diagram of a transformation from a projector-perspective compensated-depth 3D point cloud system geometry to an imager plane. The system geometry includes the relative positioning of the projector 3710, the camera 3720 and the projector-perspective compensated-depth 3D point cloud 3730. The projector-perspective compensated-depth 3D point cloud is geometrically projected to the imager plane 3740. The imager of the image plane 3740 can include a DMD or an LCD (liquid crystal display) imager, for example.

The imager plane 3740 includes a projector-perspective compensated-depth 3D point cloud system geometry geometrically projected. The image plane 3740 includes a two-dimensional geometric projection of the projector-perspective compensated-depth 3D point cloud 3730. Accordingly, the points of the projector-perspective compensated-depth 3D point cloud 3730 are usually defined in pixels rather than being defined in three-dimensional space.

With reference again to 3630, the warping engine control points are edited. The warping map points can be "edited" by mapping (e.g., transferring) the points of the two-dimensional geometric projection of the projector-perspective compensated-depth 3D point cloud 3730 (e.g., as geometrically projected onto the imager plane) to the warping engine.

Figure 39:
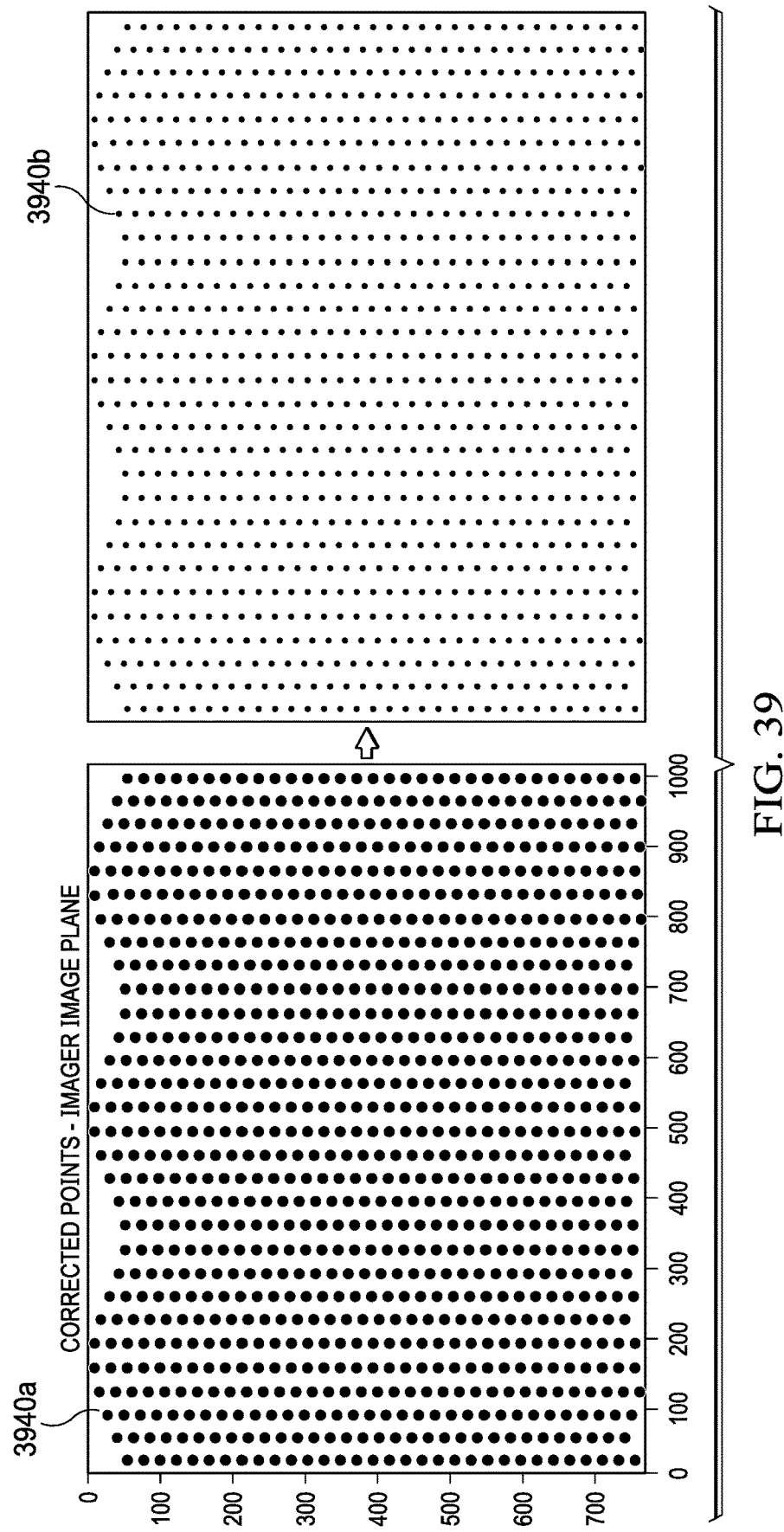
FIG. 39 is a diagram of a mapping of an imager plane including geometric projection of a projector-perspective compensated-depth 3D point cloud into warping engine control points.

FIG. 39 is a diagram of a mapping of an imager plane including geometric projection of a projector-perspective compensated-depth 3D point cloud into warping engine control points. The image plane 3840a includes a two-dimensional geometric projection of the projector-perspective compensated-depth 3D point cloud 3730. The two-dimensional geometric projection can be directly adapted as the control points for the warping engine (e.g., assuming the warping engine control points 1000 maintain a one-to-one relationship with the structured light elements 1002). Accordingly, the warping engine control points 3840b can be similar to (e.g., can be generated in response to) as the projector-perspective compensated-depth 3D point-cloud 3730 points after geometric projection onto the image plane 3840a.

With reference to 3640, the warping engine generates one or more inverse images in response to the warping engine control points. For example, warping engine receives (and inputs) the warping engine control points to the warping engine hardware so real-time frame rates can be achieved to create the appearance of uninterrupted moving images (e.g., movies). The output of the warping engine is a frame that includes an inverse image with respect to a raw (e.g., uncorrected) input image for projection (e.g., where the input images are received as a video stream). The inverse image, when projected onto the projection screen surface, compensates for the physical irregularities of the asymmetric projection screen surface, so an observer looking at the screen will perceive a rectangular image substantially free of distortion.

Figure 40:
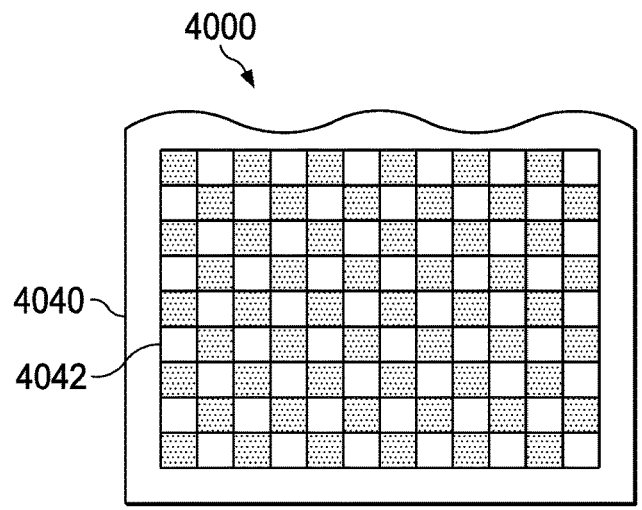
FIG. 40 is an image of a projected inverse image generated in response to including geometric projection of a projector-perspective compensated-depth 3D point cloud in accordance with example embodiment.

FIG. 40 is an image of a projected inverse image generated in response to including geometric projection of a projector-perspective compensated-depth 3D point cloud in accordance with example embodiment. The inverse image 3900 is generated by the warping engine hardware and includes distortions that are the inverse of distortions of the projection screen surface 3940. For example, the inverse image 3900 includes a distorted checkerboard pattern 3942, which when projected and displayed on a projection screen surface 3940 including distortions inverse to the distortions of the distorted checkerboard pattern 3942, is perceived as being substantially free of distortion when viewed from the determined observer perspective. Accordingly distortion correction and/or compensation is optimized for an observer whose position is provided, determined or assumed to be known.

Figure 41:
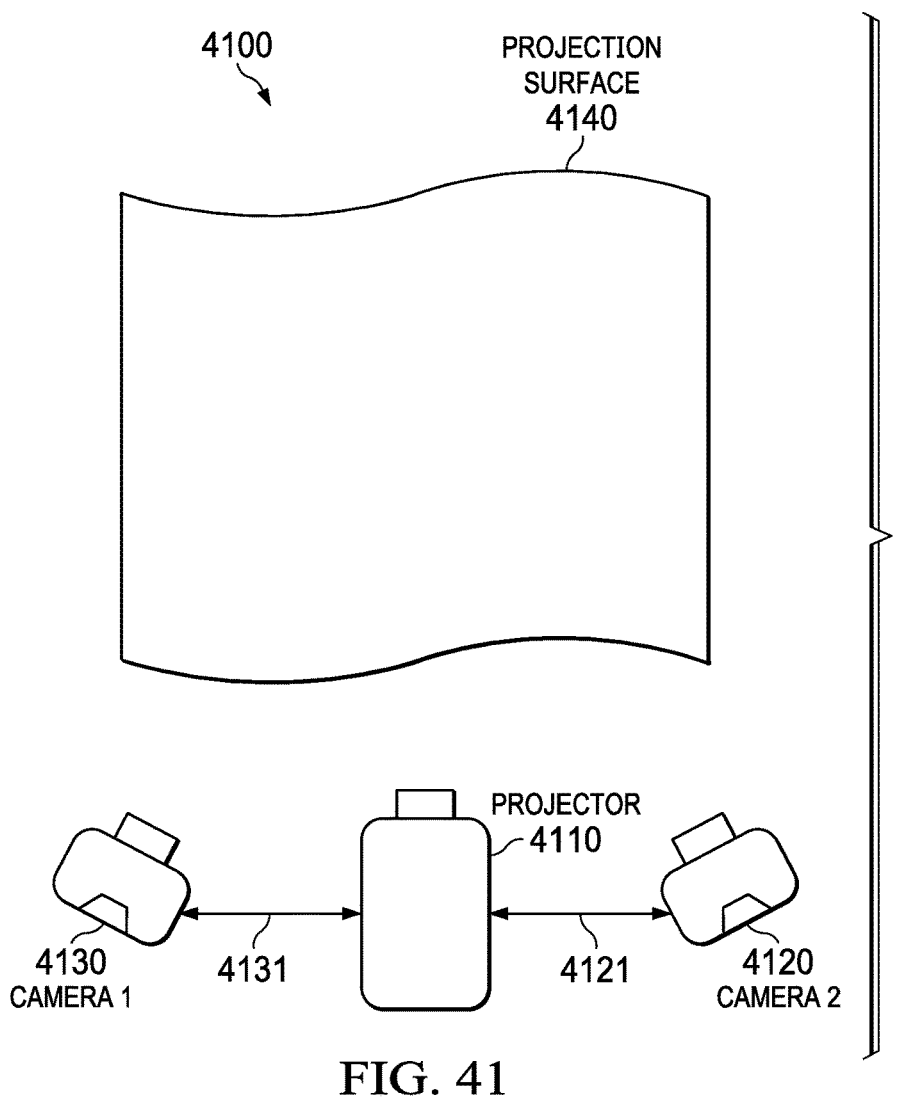
FIG. 41 is a diagram showing a dual-camera system geometry for a projector and a non-planar screen for characterizing and reducing distortion of an image displayed thereupon.

FIG. 41 is a diagram showing a dual-camera system geometry for a projector and a non-planar screen for characterizing and reducing distortion of an image displayed thereupon. In an example geometry 4000, a projector 4010 is arranged to project an image onto a screen 4040, which is non-planar (or otherwise asymmetrical). When the projector 4010 projects an image onto the screen 4040 (which is curved, for example), distortion occurs so the screen 4040 image appears distorted with respect to the image for projection.

As described following, the cameras 4020 and 4030 are arranged for automatically capturing views of the screen 4040 image for geometric compensation determination. For example, the first camera 4030 is distanced from (e.g., the projection lens of) projector 4010 by a baseline distance of 4031, whereas the second camera 4020 is distanced from (e.g., the projection lens of) projector 4010 by a baseline distance of 4021.

Figure 42:
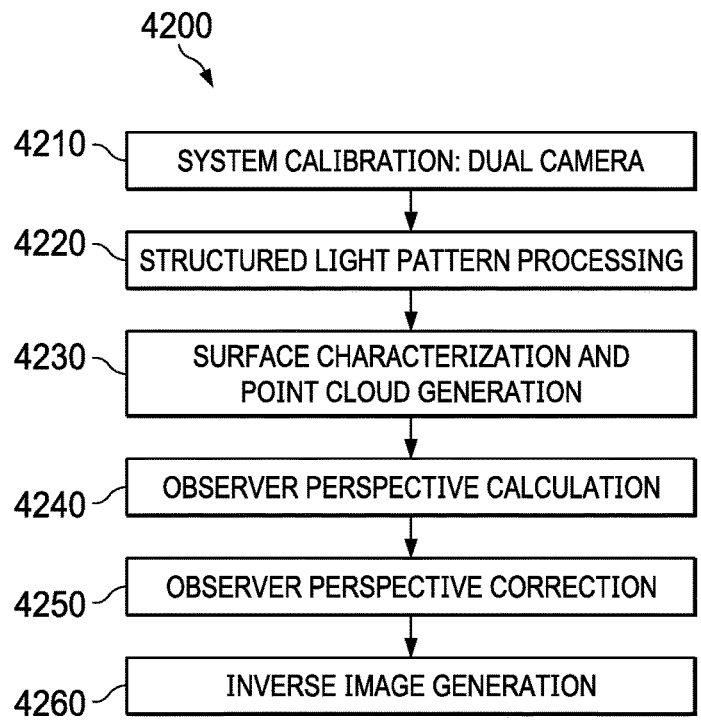
FIG. 42 is a flow diagram for dual-camera-assisted projection screen surface characterization and correction.

FIG. 42 is a flow diagram for dual-camera-assisted projection screen surface characterization and correction. In the dual-camera mode of operation, the projection screen surface is characterized along two separate vectors by capturing images projected on the screen surface. At least one single digital camera is mechanically and/or electronically coupled to the projection system (e.g., including a digital DLP® projector) when characterizing the projection screen surface. When a single camera is used in dual-camera mode, the single camera can be arranged to capture (from separate angles/vantage points) images projected on the screen at different times. For example, the camera can be moved or mirrors arranged so a single camera in a single location can capture from different vantage points the images projected onto the screen.

While the single-camera mode system described hereinabove accurately characterizes a projection surface and compensates for anomalies therein to reduce distortion, the single-camera mode system is dependent upon the accuracy of the camera-projector calibration. Accordingly, increased inaccuracies in calibration reduce the quality of such compensation.

The camera-projector calibration is dependent upon the focal length of the projector. Accordingly, when the focal length of the projector changes (such as when being "zoomed") the camera-projector calibration (e.g., files and settings) are no longer optimal, and the quality of the asymmetrical screen compensation decreases. For example, when the projector focal length (zoom) changes from a setting upon which the calibration is determined, the projector optical rays are reoriented so the intersection points (e.g., between the projector and camera rays) determined during calibration become less accurate for representing the projection screen surface.

The dependence upon the focal length of the projector often results in less-than-satisfactory results when the projector focal length is re-zoomed. Further, dependence upon the focal length of the projector affects the cost and precision of mass-scale production of systems implementing asymmetric screen surface characterization and compensation (e.g., selected manufacturing tolerances for the projection optics determined in response to a variable projector focal length and principal point are not usually achieved without incurring additional cost).

Mechanical sensors attached to the zoom and focus control rings of a projector can provide real-time feedback on the zoom and focus controls. Also, statistical methods can estimate a focal length of a projector by capturing and statistically analyzing images projected onto a screen. While control feedback and statistical methods can be used to detect a change in a projector focal length, the calibration files (e.g., dependent upon a different focal length) do not necessarily remain acceptably valid. For example, a considerable amount of calibration data and user expertise are often employed for acceptably (e.g., so the changes in compensation are not noticed by a human observer) responding to changes in the projector focal length. Further, such control feedback and statistical methods often implement relatively tight tolerances for manufacturing the projector optics.

In contrast, the dual-camera mode asymmetric screen surface characterization and compensation systems described herein can generate calibration files, wherein the calibration files are independent of any relationship with a particular focal length of a projector. In such a dual-camera-based asymmetric screen surface characterization and compensation system, a second digital camera is coupled mechanically and/or electronically to the projection system. The second camera is positioned in a different place (and oriented with a different orientation) from the first camera. The second camera is modeled as an optical ray source, which differs from the projector-based optical ray source of the single-camera mode systems.

Accordingly, the projector in the dual-camera mode asymmetric screen surface characterization and compensation system projects the structured light patterns for display, and the projected structured light patterns as displayed on a screen are captured by both of the dual cameras. As described hereinbelow, the optical rays of each camera originate in each respective camera center, pass through the centroids of the structured light elements and intersect on the projection screen surface.

The dependence of the optical rays upon the respective cameras theoretically eliminates dependence upon the projector as an origin for generation of calibration geometries. Accordingly, any post-calibration change in the projector zoom ratio and focus do not affect the robustness and accuracy of the calibration processing for determining variable geometries (including the determination of positioning and orientation of distant objects with respect to an observer). Manufacturing tolerances of dual-camera-mode asymmetric screen surface characterization and compensation systems (which are not necessarily functionally dependent on focal length as an input variable) are relaxed with respect to tolerances of single-camera mode asymmetric screen surface characterization and compensation system. Accordingly, satisfactory results can be obtained during the mass production of dual-camera-mode asymmetric screen surface characterization and compensation systems by determining system geometries in accordance with structured light-based surface metrology statistical processing.

The flow of dual-camera mode process 4100 begins in 4110, where the projection system is calibrated by camera-projector calibration techniques in accordance with a dual-camera pin-hole camera model. The dual-camera-based system calibration is described hereinbelow with respect to FIG. 43.

In 4120, the projection screen surface is characterized by capturing information (e.g., structured light patterns) projected on the projection screen surface. For example, sparse discrete structured light patterns are projected by the projector upon a projection screen surface in sequence and captured by the camera. The sparse discrete structured light patterns include points for representing the pixels of maximum illumination wherein each point can be associated with the peak of a Gaussian distribution of luminance values. The positions of various points in the sparse discrete structured light patterns in the captured frames are skewed (e.g., shifted) in response to non-planar or keystoned portions of the projection screen surfaces. The captured camera frames of the structured light patterns are stored in the ASIC's memory for processing and for generation of a three-dimensional point cloud (3D point cloud) for characterizing the projection screen surface. (Structured light pattern processing is described hereinabove with respect to FIG. 10 through FIG. 13.)

In 4130, the projection screen surface is characterized in accordance with optical ray intersection parameters (such as shape, distance and orientation with respect to the projector optical axis). The projection screen surface is characterized, for example, and stored as points of the 3D point cloud. Accordingly, the 3D point cloud includes a set of data points for modeling the screen surface. (Projection screen surface characterization is discussed above with respect to FIG. 14 through FIG. 22.)

In 4140, the observer position coordinates can be determined in various ways: retrieved from storage in the ASIC memory; entered by the observer at run-time; or determined at run-time in response to triangulation of points of a displayed image. The observer position coordinates can be determined by analysis of displayed images captured by a digital camera in a predetermined spatial relationship to the projector. When the observer position is determined by triangulating points in a captured image, the observer position can be assumed to be generally perpendicular to the projection screen (and more particularly, the orientation of the observer can be presumed to be perpendicular to a best fitted plane passing through the points in the 3D point cloud). (The calculations for determining an observer perspective are described hereinabove with respect to FIG. 23 through FIG. 29.)

In 4150, the three-dimensional points of the 3D point cloud are rotated and translated to internally model what an observer would perceive from the observer position. With the perspective of the observer being determined, points in the 3D point cloud are rearranged to form, in outline, a rectangular shape with the correct aspect ratio. The correction of points in the 3D point cloud is described hereinbelow with respect to FIG. 30 through FIG. 36.

In 4160, the rearranged points are transformed (e.g., rotated back) to the projector perspective for input as warping points to the warping engine. The warping engine generates a warped image (e.g., warped inverse image) in response to the warping points. Processing for the inverse image generation is described hereinbelow with respect to FIG. 37 through FIG. 40.

With reference to 4110 again, camera-to-camera calibration data is obtained (in the dual camera mode). The extrinsic parameters (e.g., camera-to-camera calibration data) of each of the cameras are defined with respect to the center of projection or other common point (e.g., projector origin and orientation). The two cameras system extrinsic parameters include the translation vector (e.g., distance from projector to each camera in millimeters) and the rotation matrix of each camera with respect to a common orientation (e.g., the projector orientation). For convenience (and to maintain some commonality with the equations described hereinabove), the origin can be selected to be the center of projection of the projector, from which the optical axis of the projector points towards the –z axis.

Figure 43:
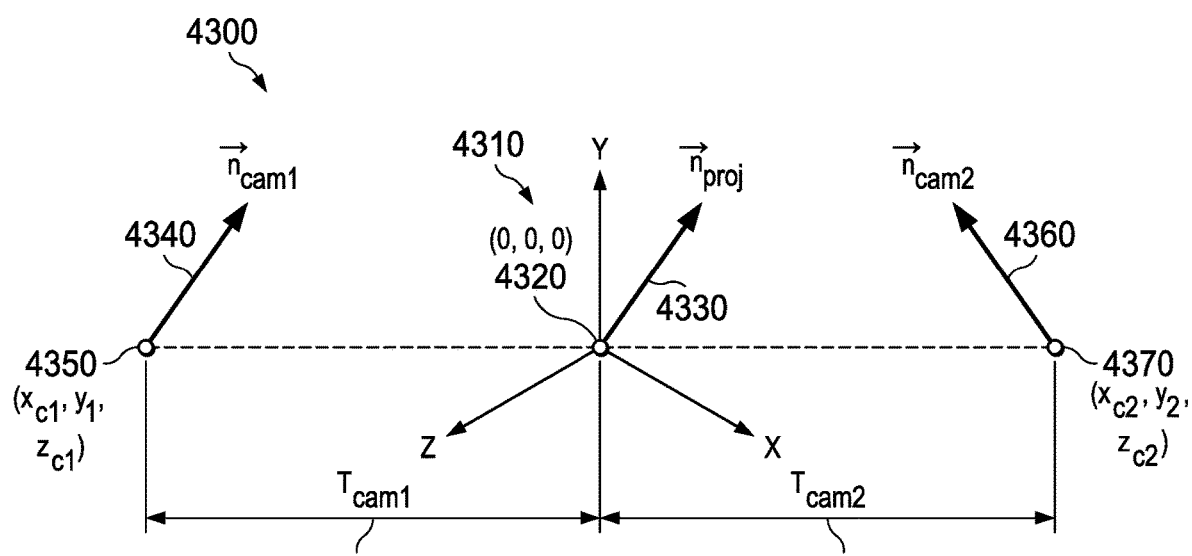
FIG. 43 is an orthographic perspective view of a geometry for system calibration of extrinsic dual-camera system parameters.

FIG. 43 is an orthographic perspective view of a geometry for system calibration of extrinsic dual-camera system parameters. In general, geometry 4200 shows extrinsic parameters of a dual-camera system for asymmetric screen characterization and compensation. For simplicity of explanation, the projector is assumed to be centered at the origin (0,0,0) and the optical axis (e.g. the normal vector) of the projector is assumed to point towards the negative-z axis. Accordingly, parameters for each of the dual cameras can be described with respect to the projector location (e.g., which is a location mutually external to both cameras), instead of being described with respect to one (or the other) camera.

The geometry 4200 includes a center of the projector 4220 positioned at the origin (0,0,0) and having an orientation 4210 defined by the x, y and z axes. The projector normal vector 4230 $\vec{n}_{proj}$ is oriented in the opposite direction of the z axis.

The translation vectors $T_{cam}$ include the position of a respective camera center $(x_c, y_c, z_c)$ to the origin and is expressed in millimeters. For example, a center of the camera 4250 is positioned at the point $(x_{c1}, y_{c1}, z_{c1})$ and includes a camera normal vector 4240 $\vec{n}_{cam1}$. The center of the camera 4250 is offset from the center of the projector 4220 by the offset distance $T_{cam1}$, which extends from point (0,0,0) to point $(x_{c1}, y_1, z_{c1})$. A center of the camera 4270 is positioned at the point $(x_{c2}, y_2, z_{c2})$ and includes a camera normal vector 4260 $\vec{n}_{cam2}$. The center of the camera 4270 is offset from the center of the projector 4220 by the offset distance $T_{cam2}$, which extends from point (0,0,0) to point $(x_{c2}, y_2, z_{c2})$.

Extrinsic parameters also include a rotation matrix $R_{cam}$ for the relative pitch, yaw and roll of each camera normal vector $\vec{n}_{cam}$ with respect to the projector normal vector (i.e. the optical axis) $\vec{n}_{proj}$ or other common point between the cameras 4250 and 4270.

Accordingly, two sets of translation vectors and rotation matrices are determined in calibration. The extrinsic (as well as the intrinsic) parameters for the two cameras 4250 and 4270 can be obtained by iterative calibration methods. The calibration data can be stored in a file in ASIC memory and retrieved in the course of executing instructions for performing the functions described herein.

With reference to 4120 again, the projection screen surface is characterized by capturing information projected on the projection screen surface. For example, sparse discrete structured light patterns are projected by the projector upon a projection screen surface in sequence and captured by the camera. The positions of various points in the sparse discrete structured light patterns in the captured frames are skewed (e.g., shifted) in response to non-planar or keystoned portions of the projection screen surfaces. The captured camera frames of the structured light patterns are stored in the ASIC's memory for processing and for generation of a three-dimensional point cloud (3D point cloud) for characterizing the projection screen surface. Because both cameras capture the displayed structured light patterns, the processing requirements are usually increased over a single-camera mode system. For an N×M sparse structured light element set of patterns, the number of images processed by the ASIC (e.g., encoded by Gray encoding) is:

$$X = \log_2(N) + \log_2(M) + 2 \qquad \text{(Eq. 93)}$$

In 1430, the projection screen surface is characterized in accordance with the intersections of pairs of optical rays (where each intersecting ray originates from a different camera), where the intersection is associated with a respective point of a structured light element displayed on the projection screen surface. The real 3D position of each one of the structured light elements projected onto the surface is calculated by determining the intersection between each pair of optical rays, each originating from respective cameras. The projection screen surface characterization is described hereinbelow with respect to FIG. 44.

Figure 44:
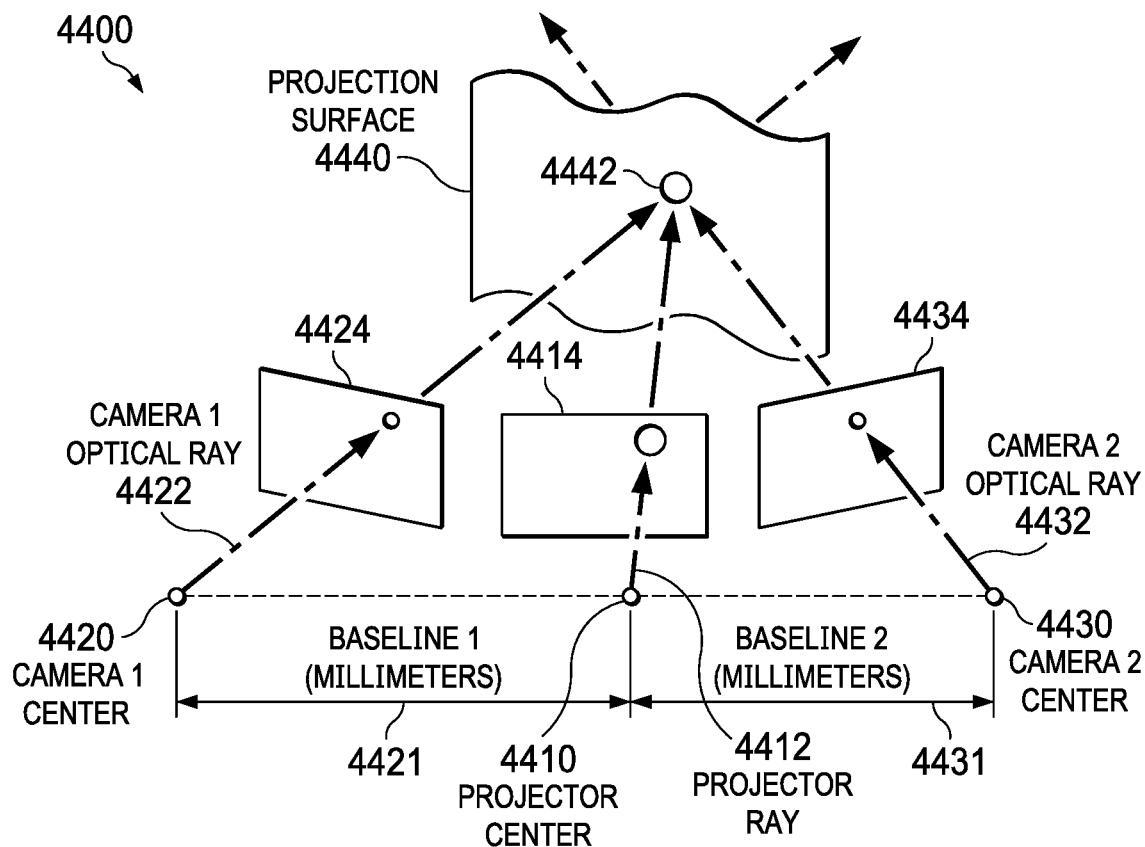
FIG. 44 is an orthographic perspective view of a geometry for construction of dual-camera optical rays for generating a three-dimensional point cloud for representing a projection screen surface.

FIG. 44 is an orthographic perspective view of a geometry for construction of dual-camera optical rays for generating a three-dimensional point cloud for representing a projection screen surface. In general, geometry 4300 includes a geometry for calculating the spatial information of the projection screen surface 4340. An actual three-dimensional position for each (e.g., 4342) of the structured light elements projected onto the projection screen surface can be calculated by determining the intersections between corresponding pairs of optical rays (e.g., 4322 and 4332) originating from the first camera and the second camera respectively.

The projector center 4310 is a point located at the origin (0, 0, 0) of a 3D Cartesian coordinate system. The projector center 4310 point is considered to be the center of projection. Projector rays 4312 originate at the center of projection 4310, pass through a centroid of each one of the structured light pattern elements in the projector image plane 4314, intersect the projection surface 4340 at point 4342 and extend into infinity.

The first camera center 4320 is a point located at a certain distance (baseline) 4321 from the center of projection 4310. The first camera center 4320 is determined by the camera-projector calibration data and is represented by a translation vector and a rotation matrix. Optical rays 4322 originate at the camera center 4320, pass through each one of the centroids of the camera captured structured light elements of the camera image plane 4324, intersect the projection surface 4340 at point 4342 and extend into infinity.

The second camera center 4330 is a point located at a certain distance (baseline) 4331 from the center of projection 4310. The second camera center 4330 is determined by the camera-projector calibration data and is represented by a translation vector and a rotation matrix. Optical rays 4332 originate at the camera center 4330, pass through each one of the centroids of the camera captured structured light elements of the camera image plane 4334, intersect the projection surface 4340 at point 4342 and extend into infinity.

Each one of the optical rays from the projector intersects a corresponding (e.g., matched) camera ray and intersect exactly at a respective point 4342 of the projection screen surface 4340. When the lengths of the baseline 4321 and baseline 4331 are determined (e.g., in real units), the real position of each intersection point 4342 can be determined. The set of intersection points 4342 lying on the projection screen surface form the 3D point cloud for characterizing the projection screen surface.

Accordingly, the formulation of the (dual-camera mode) cameras optical rays equations is similar to the (single-camera mode) projector optical rays equations in which optical rays are defined as vectors in 3D space, undistorted and normalized. The orientation of the optical rays is in response to the intrinsic parameters of each respective camera and distortion coefficients can be used to correct for the tangential and radial distortion introduced by the optics of a respective camera.

To compensate for the relative orientation of a camera with respect to the projector optical axis or other common point, each of the undistorted and normalized camera optical rays are rotated (e.g., multiplied by the extrinsic rotation matrix $R_{cam}$). The equations of the camera optical rays are accordingly defined as follows, in which each camera is defined in terms of the intrinsic and extrinsic parameters associated with the respective camera:

$$\vec{cr} = \begin{bmatrix} \frac{x_{cam} - cc_{cam,x}}{fc_{cam,x}} \\ \frac{y_{cam} - cc_{cam,y}}{fc_{cam,y}} \\ 1 \end{bmatrix} \quad \text{(Eq. 94)}$$

$$\vec{v_c} = R_{cam} \cdot \left( \frac{\vec{cr}}{\|\vec{cr}\|} \right) \quad \text{(Eq. 95)}$$

Figure 45:
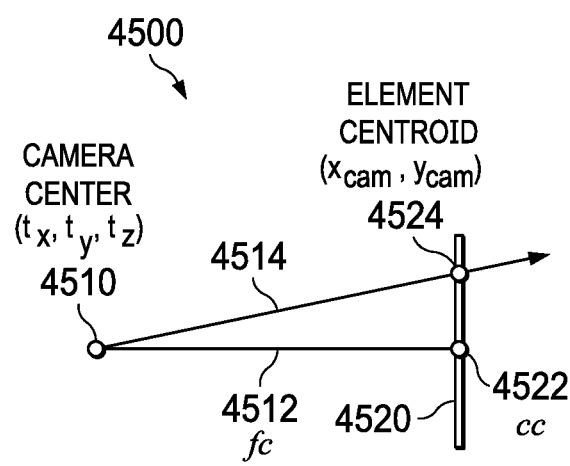
FIG. 45 is a side perspective view of a geometry for determination of camera optical rays.

FIG. 45 is a side perspective view of a geometry for determination of camera optical rays. In general, geometry 4400 shows the geometry of optical rays between a camera center 4410 and a projection screen surface 4420. The camera center 4410 is located at the origin (0,0,0) and includes a camera focal length fc 4412 with respect to the projection screen surface 4420. The projection screen surface 4420 includes a principal point cc 4422, which is a point by the focal length $f_c$ 4412 is characterized. An optical ray 4414 associated with a structured light element is projected from the origin 4420 for intersecting the camera screen surface 4420 at centroid 4424.

Figure 46:
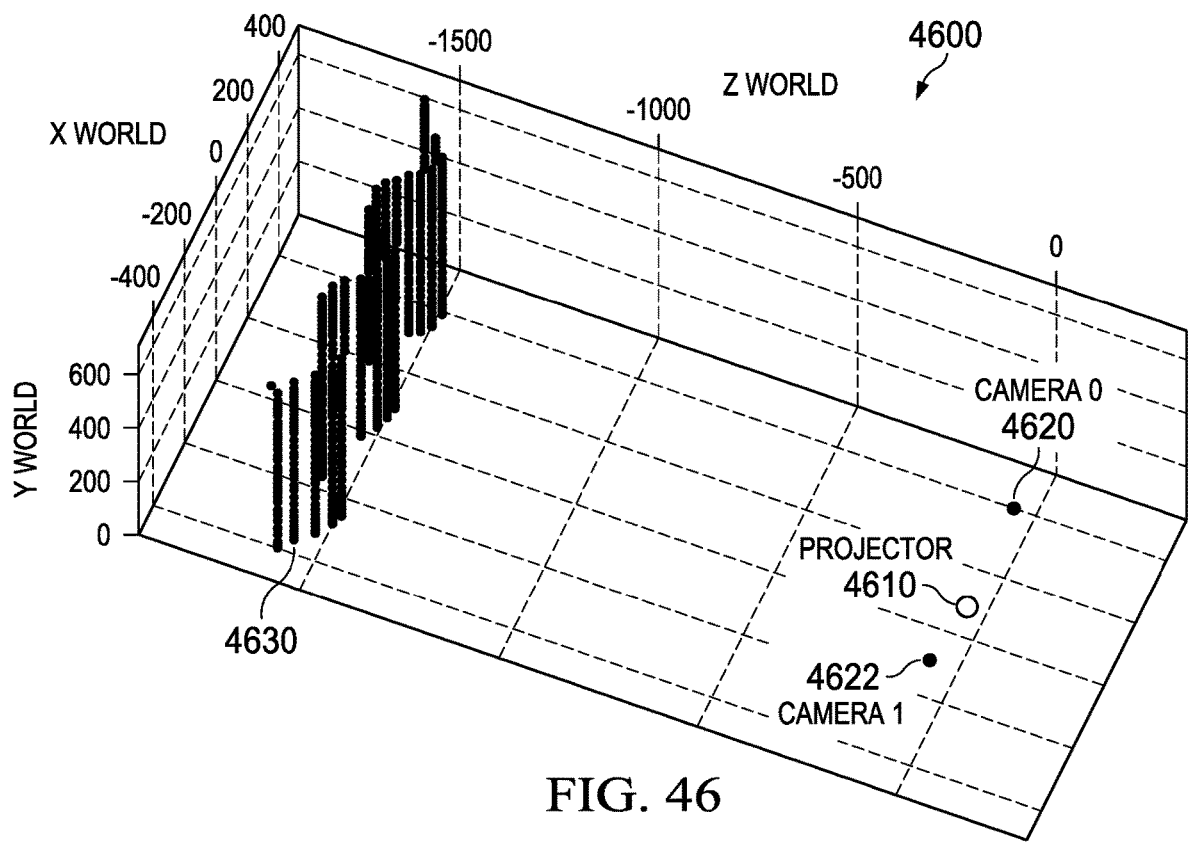
FIG. 46 is a perspective view of a system geometry for plane fitting of a three-dimensional point cloud.

FIG. 46 is a perspective view of a system geometry for plane fitting of a three-dimensional point cloud. In an example geometry 4500, the projector 4510 is arranged to project an image onto a non-planar (or otherwise asymmetrical) display screen, portions of which are non-perpendicular to the projector 4510. When the projector 4510 is arranged to project an image onto the display screen, so the display screen image appears to be distorted with respect to one or more of the camera 4520, camera 4522 and an observer (not shown) at other potential viewing location. Both cameras can be defined with respect to the center of projection (e.g., from projector 4510). Each point in the 3D point cloud 4530 represents a three-dimensional point on the non-planar (or otherwise asymmetrical) display screen.

With reference to 4130 again, the projection screen surface is characterized similarly to the projection screen surface characterization of the single-camera mode systems discussed above. Accordingly, the optical ray intersection parameters (such as shape, distance and orientation with respect to the projector optical axis) determine points of the 3D point cloud.

In 4140, the observer position coordinates can be determined in a manner similar to the observer perspective calculation of the single-camera mode systems discussed above. Accordingly, the observer position coordinates can be determined by analysis of displayed images captured by a digital camera in a predetermined spatial relationship to the projector. The analysis can include triangulation of centroid points captured in the displayed images.

In 4150, the observer perspective corrections can be determined in a manner similar to the observer perspective corrections of the single-camera mode systems described hereinabove; however, the depth recalculations are determined by homography transformations described with respect to FIG. 47.

Figure 47:
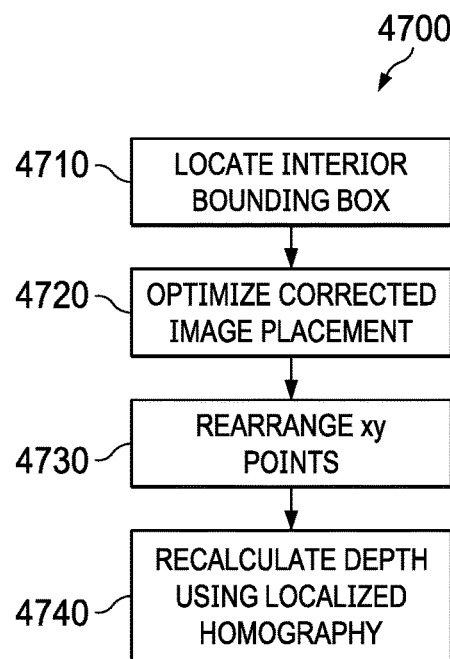
FIG. 47 is a flow diagram for identifying and correcting distortion perceived by the observer.

FIG. 47 is a flow diagram for identifying and correcting distortion perceived by the observer. Flow 4600 begins in 4610, where a location of interior bounding box is determined. The interior bounding box limits whichever points of the 3D point cloud are to be displayed after correcting for distortion as perceived from the position of the observer. Operation 4610 is similar to operation 2910 described hereinabove.

In 4620, the optimal image size and placement is evaluated. The optimal placement for the corrected image is evaluated in response to the edges of the IBB. Operation 4620 is similar to operation 2920 described hereinabove.

In 4630, the x-y components of the 3D point cloud interior points of the rotated point cloud are moved (e.g., respaced) to a respective new location inside the rectilinear interior bounding box. The local aspect ratio distortion is corrected by spacing the points in the x and y directions evenly. Operation 4630 is similar to operation 2930 described hereinabove.

In 4640, the depth information is determined in accordance with a homographic mapping of a corrected point in a geometric projection 3320 of the (e.g., uncorrected) 3D point cloud into an imager plane (e.g., see image plain 3740). For example, the neighboring points of the corrected point cloud are identified by the vector-angle searching on the uncorrected point irregular grid as described hereinabove with respect to a closest point ($\vec{p}_f$) 3420. However, the depth for the corrected point is determined in accordance with a local homography between the uncorrected point cloud quadrilateral (e.g., defined by the identified neighboring points) and mapping the corrected point to a corresponding rectangle (e.g., square) in the imager plane.

The rectangle in the imager plane can be addressed in response to the row and column indexes of the trapezoid corners in the uncorrected point cloud and the locations of the warping engine control points. (As described hereinabove, the point cloud and the warping engine are arranged as a rectangular array, where the array elements can be addressed via respective row and column indexes.)

Figure 48:
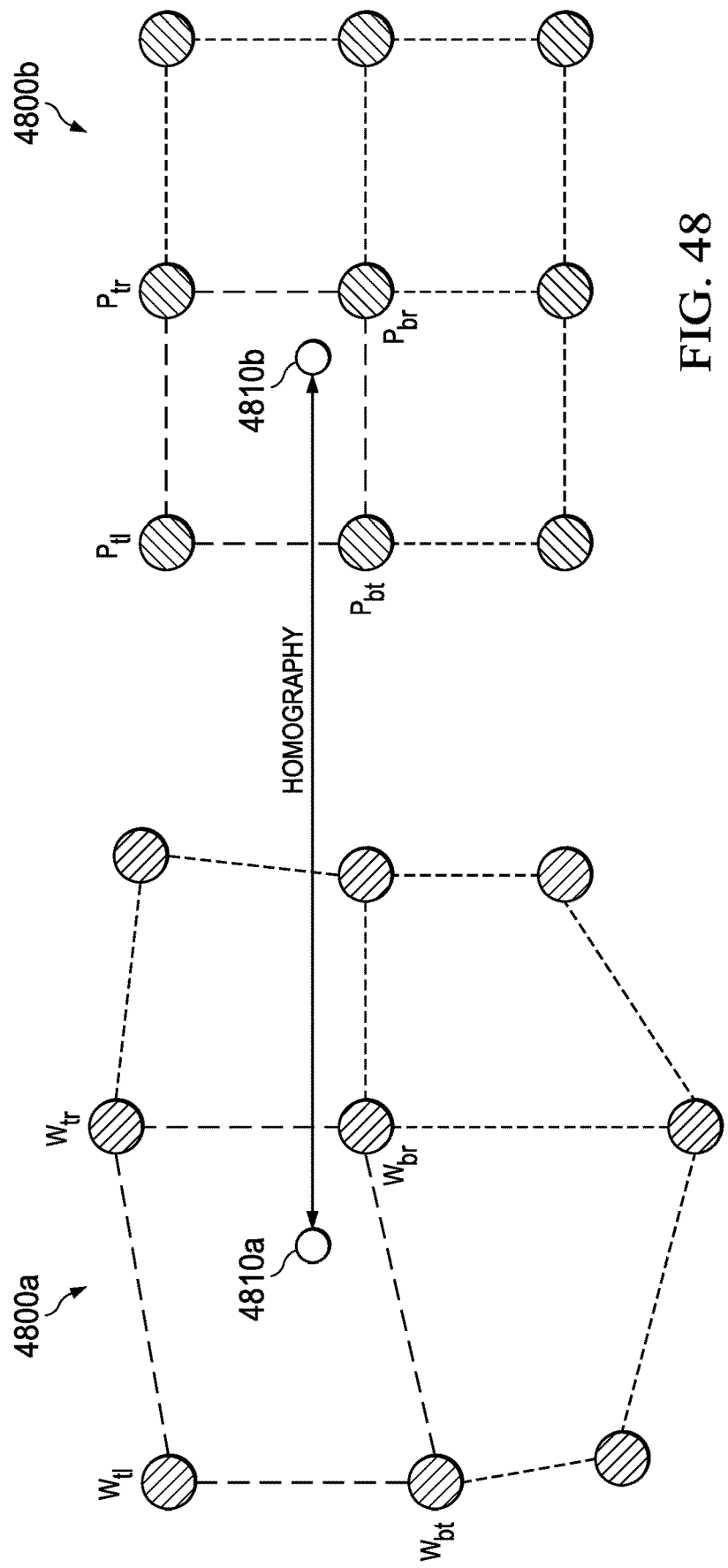
FIG. 48 is a diagram of a homographic transformation from an observer perspective of an uncorrected, untransformed (e.g., original) three-dimensional point cloud to a corresponding point in an imager plane in accordance with example embodiment.

FIG. 48 is a diagram of a homographic transformation from an observer perspective of an uncorrected, untransformed (e.g., original) three-dimensional point cloud to a corresponding point in an imager plane in accordance with example embodiment. For example, an irregular uncorrected point cloud grid includes a 3×3 matrix 4700a. A first quadrilateral defined by the points $W_{tl}$, $W_{tr}$, $W_{br}$ and $W_{bl}$ are identified as enclosing the corrected point 4710a. The corrected point 4710a is mapped to a corresponding point 4710b in the imager plane 4700b in accordance with local homography matrices. The corresponding point 4710b in the imager plane 4700b is enclosed by a second quadrilateral defined by the points $P_{tl}$, $P_{tr}$, $P_{br}$ and $P_{bl}$. The points $W_{tl}$, $W_{tr}$, $W_{br}$ and $W_{bl}$ correspond to respective points $P_{tl}$, $P_{tr}$, $P_{br}$ and $P_{bl}$, where the each corresponding pair of respective points can be uniquely addressed by the same row and column numbers.

Each local homography is encoded in a 3×3 matrix and represents the necessary perspective transform to map a point 4710a from the irregular uncorrected point cloud grid 4700a to a point 4710b of the imager plane 4700b. The grid of the imager plane 4700b is regular and corresponds to the grid of the warping engine control points. Because of the irregularity of the uncorrected point cloud x-y grid imager plane 4700a, corrected point mapping is implemented by local homography matrices: each quadrilateral in the irregular grid of the irregular uncorrected point cloud grid 4700a is related to a rectangle in the regular grid of the imager plane 4700b via a unique homography. For each quadrilateral-rectangle pair, the homography matrix is calculated by a weak correlation approach:

$$A = \begin{bmatrix} W_{tl,x} & W_{tl,y} & 1 & 0 & 0 & 0 & W_{tl,x}P_{tl,x} & W_{tl,y}P_{tl,x} \\ 0 & 0 & 0 & W_{tl,x} & W_{tl,y} & 1 & W_{tl,x}P_{tl,y} & W_{tl,y}P_{tl,y} \\ W_{tr,x} & W_{tr,y} & 1 & 0 & 0 & 0 & W_{tr,x}P_{tr,x} & W_{tr,y}P_{tr,x} \\ 0 & 0 & 0 & W_{tr,x} & W_{tr,y} & 1 & W_{tr,x}P_{tr,y} & W_{tr,y}P_{tr,y} \\ W_{br,x} & W_{br,y} & 1 & 0 & 0 & 0 & W_{br,x}P_{br,x} & W_{br,y}P_{br,x} \\ 0 & 0 & 0 & W_{br,x} & W_{br,y} & 1 & W_{br,x}P_{br,y} & W_{br,y}P_{br,y} \\ W_{bl,x} & W_{bl,y} & 1 & 0 & 0 & 0 & W_{bl,x}P_{bl,x} & W_{bl,y}P_{bl,x} \\ 0 & 0 & 0 & W_{bl,x} & W_{bl,y} & 1 & W_{bl,x}P_{bl,y} & W_{bl,y}P_{bl,y} \end{bmatrix}$$ (Eq. 96)

$$\vec{b} = \begin{bmatrix} P_{tl,x} \\ P_{tl,y} \\ P_{tr,x} \\ P_{tr,y} \\ P_{br,x} \\ P_{br,y} \\ P_{bl,x} \\ P_{bl,y} \end{bmatrix}$$ (Eq. 97)

$$\vec{h} = \begin{bmatrix} h_1 \\ h_2 \\ h_3 \\ h_4 \\ h_5 \\ h_6 \\ h_7 \\ h_8 \end{bmatrix}$$ (Eq. 98)

where the matrix A is an optimization or coefficients matrix, Vector $\vec{b}$ is the right hand side vector and vector $\vec{h}$ is the objective vector for including the coefficients of the homography matrix. Solving for vector $\vec{b}$:

$$A\vec{h} = \vec{b} \rightarrow \vec{h} = (A^T A)^{-1} A^T \vec{b}$$ (Eq. 99)

The homography matrix H is populated in accordance with Eq. 99:

$$H = \begin{bmatrix} h_1 & h_3 & h_3 \\ h_4 & h_5 & h_6 \\ h_7 & h_8 & 1 \end{bmatrix}$$ (Eq. 100)

The corrected point $\vec{p}_c$ is mapped to its corresponding location in the imager plane as follows:

$$\vec{v}_{in} = \begin{bmatrix} \vec{p}_{c,x} \\ \vec{p}_{c,y} \\ 1 \end{bmatrix}$$ (Eq. 101)

$$\vec{v}_{out} = H\vec{v}_{in}$$ (Eq. 102)

$$\begin{bmatrix} u_c \\ v_c \end{bmatrix} = \begin{bmatrix} \vec{v}_{out,x}/\vec{v}_{out,z} \\ \vec{v}_{out,y}/\vec{v}_{out,z} \end{bmatrix}$$ (Eq. 103)

where $$\begin{bmatrix} u_c \\ v_c \end{bmatrix}$$

is the pixel position of the corrected point (e.g., 4710*b*) in the imager plane.

Accordingly, the corrected point in imager plane space, $$\begin{bmatrix} u_c \\ v_c \end{bmatrix},$$

is calculated directly from the corrected and uncorrected point clouds from the observer perspective (e.g., so the projector perspective does not need to be recovered). In the dual-camera mode, corrected points can be directly mapped from the observer perspective to the imager plane. Accordingly, some of the intermediate operations in the single-camera mode (e.g., such as rotation to the projector perspective and projection from 3D real-world coordinates to the imager plane) are not necessary.

Figure 49:
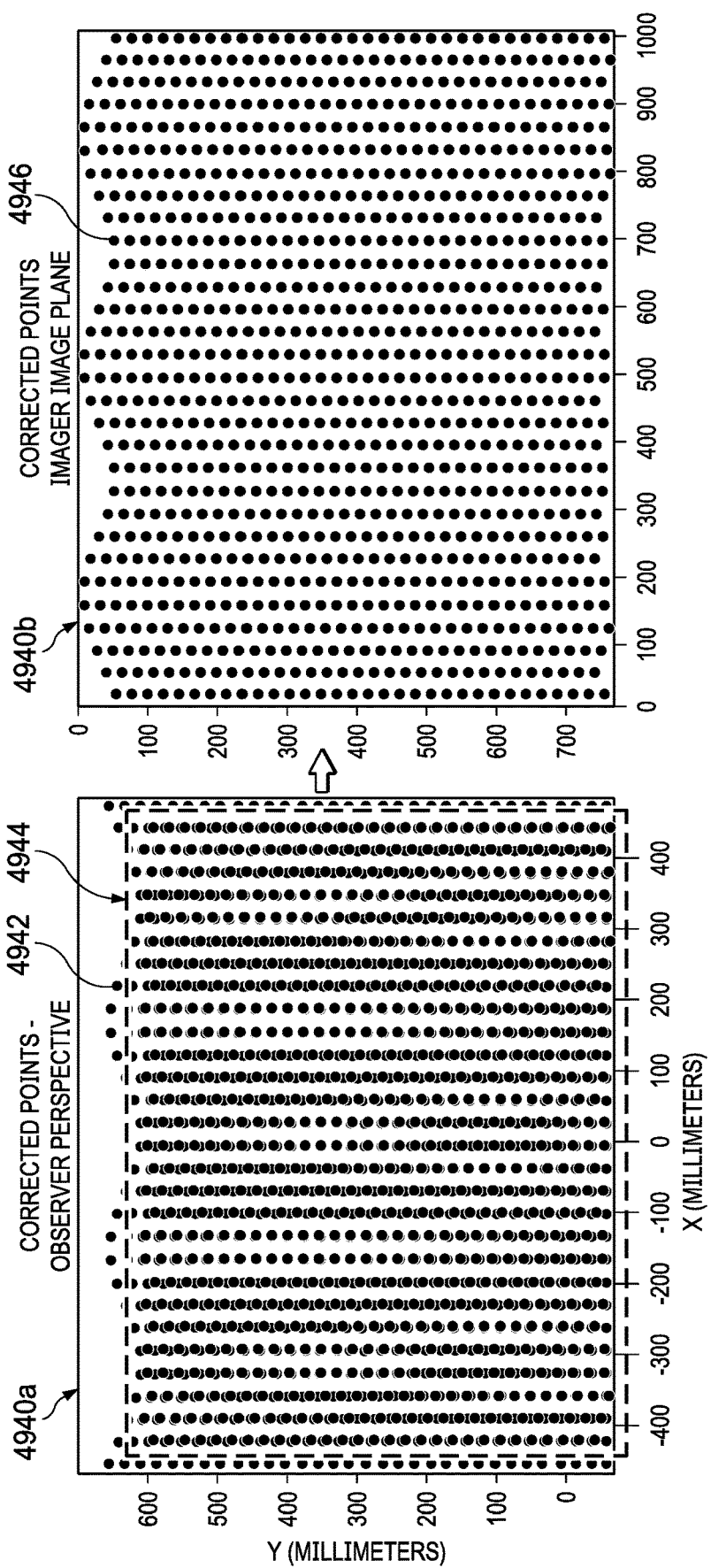
FIG. 49 is a diagram of a transformation of an observer-perspective compensated-depth 3D point cloud system geometry onto an image plane.

FIG. 49 is a diagram of a transformation of an observer-perspective compensated-depth 3D point cloud system geometry onto an image plane. For example, the observer perspective x-y plane (generally as 4840*a*) includes a geometric projection of the 3D point cloud 4842 into the observer perspective x-y plane and a rectilinear grid 4844 of corrected x-y spacing points in the observer perspective x-y plane.

The geometric projection of the 3D point cloud 4842 into the observer perspective x-y plane and the rectilinear grid 4844 of corrected x-y spacing points in the observer perspective x-y plane are transformed (similarly as described hereinabove with reference to FIG. 37 through FIG. 40) into an inverse image. For example, the imager plane 4840*b* includes a two-dimensional geometric projection of corrected control points 4846 (for generating the inverse image by the warping engine) in response to the geometric projection of the 3D point cloud 4842 into the observer perspective x-y plane and a rectilinear grid 4844 of corrected x-y spacing points in the observer perspective x-y plane.

Accordingly, the corrected control points 4846 are defined in pixel space rather than being defined in three-dimensional space. The corrected control points 4846 are input to the warping engine so the warping engine is arranged for receiving an image for projection and warping the received image for projection in response to the corrected control points 4846. The warped image for projection is projected on the characterized projection screen surface so, for example, the projected warped image is displayed on the characterized projection screen surface as being corrected (and/or compensated for) non-planarities or keystoning of the characterized projection screen surface.

Figure 50:
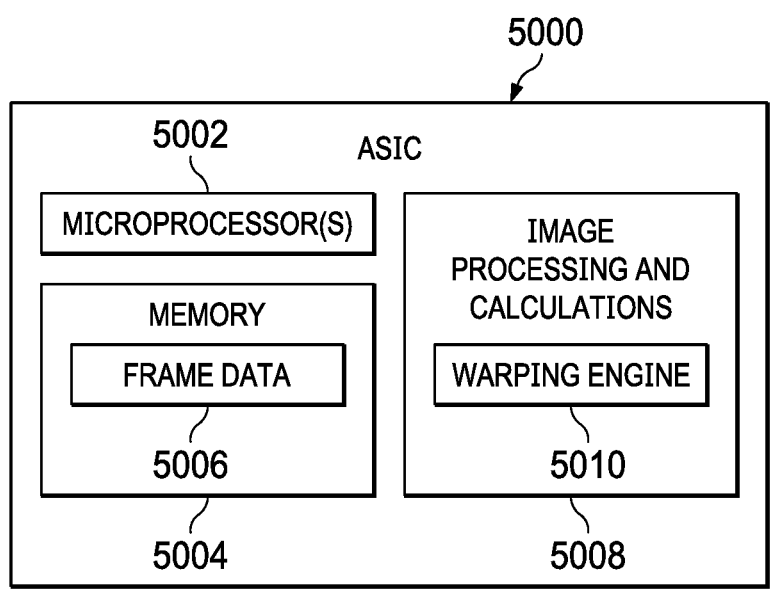
FIG. 50 is a high-level block diagram of an integrated circuit.

FIG. 50 is a high-level block diagram of an IC 4900. IC 4900 contains microprocessors 4902 and a memory 4904 in which the frame data 4906 for buffering a warped image for display is stored. Memory 4904 can include read-only-memory (ROM), random access memory (RAM), electrically erasable programmable read-only memory (EEPROM) and flash memory. The IC 4900 also includes an image processing and calculations module 4908. The image processing and calculations module 4908 is designed to perform the methods of camera-assisted asymmetric characterization and compensation as described herein. The image processing and calculations module 4908 includes a warping engine 4910 for hardware-assisted local-area warping of pixels for generating an inverse image for projection and display on a projection screen surface. The IC 4900 can be an application specific integrated circuit (ASIC), a system-on-chip (SoC) circuit and a field-programmable gate array (FPGA).

Modifications are possible in the described embodiments, and other embodiments are possible, within the scope of the claims.

What is claimed is:

1. A method comprising:
   generating, by a circuit, a surface characterization based on depth and slope information;
   determining, by the circuit, compensated control points based on the depth and slope information and the surface characterization; and
   generating, by the circuit, an inverse image based on the compensated control points.

2. The method of claim 1, wherein generating the surface characterization is further performed based on an observer position indication.

3. The method of claim 2, further comprising:
   determining a three-dimensional surface characterization, the three-dimensional surface characterization comprising data points corresponding to the depth and slope information for corresponding surface locations; and
   generating an observer perspective characterization based on the depth and slope information and the observer position indication, wherein determining the compensated control points is further performed based on the observer perspective characterization.

4. The method of claim 3, wherein the data points are first data points, wherein the surface characterization comprises second data points, the method further comprising generating the second data points based on the first data points and the observer position indication, the second data points being ordered based on a grid of control points arranged as input to a warping engine of a projector.

5. The method of claim 3, wherein determining the three-dimensional surface characterization is further performed based on triangulation of displayed elements on a surface.

6. The method of claim 5, further comprising determining the slope information for at least one data point of the data points in response to cross products of adjacent pairs of directional vectors extending from the at least one data point to other data points of the data points.

7. The method of claim 5, wherein determining the slope information for at least one data point is further performed based on depth information of other data points of the data points.

8. The method of claim 7, wherein determining the depth information for the at least one data point is further performed based on slope information of the at least one data point.

9. The method of claim 7, wherein determining the depth information for the at least one data point is further performed based on slope information of at least one other data point of the data points.

10. The method of claim 1, comprising generating a flattened surface characterization in response to the surface characterization, wherein the flattened surface characterization comprises two-dimensional points corresponding to surface positions.

11. A circuit configured to:
generate a surface characterization based on the depth and slope information;
determine compensated control points based on the depth and slope information and the surface characterization; and
generate an inverse image based on the compensated control points.

12. The circuit of claim 11, wherein generating the surface characterization is further performed based on an observer position indication.

13. The circuit of claim 12, wherein the circuit is further configured to:
determine a three-dimensional surface characterization, the three-dimensional surface characterization comprising data points corresponding to the depth and slope information for corresponding surface locations; and
generate an observer perspective characterization based on the depth and slope information and the observer position indication, wherein determining the compensated control points is further performed based on the observer perspective characterization.

14. The circuit of claim 13, wherein the data points are first data points, wherein the surface characterization comprises second data points, the circuit further configured to generate the second data points based on the first data points and the observer position indication, the second data points being ordered in accordance with a grid of control points arranged as input to a warping engine of a projector.

15. The circuit of claim 13, wherein determining the three-dimensional surface characterization is further performed based on triangulation of displayed elements on a surface.

16. The circuit of claim 15, wherein the circuit is further configured to determine the slope information for at least one data point of the data points in response to cross products of adjacent pairs of directional vectors extending from the at least one data point to other data points of the data points.

17. The circuit of claim 15, wherein determining the slope information for at least one data point is further performed based on depth information of other data points of the data points.

18. The circuit of claim 17, wherein determining the depth information for the at least one data point is further performed based on slope information of the at least one data point.

19. The circuit of claim 17, wherein determining the depth information for the at least one data point is further performed based on slope information of at least one other data point of the data points.

20. The circuit of claim 11, wherein the circuit is further configured to generate a flattened surface characterization in response to the surface characterization, wherein the flattened surface characterization comprises two-dimensional points corresponding to surface positions.

21. An apparatus comprising:
a projector configured to project structured light elements, wherein the structured light elements are iteratively displayed in a geometric progression;
a camera configured to receive the displayed structured light elements as captured structure light elements; and
at least one processor coupled to the projector and to the camera, the at least one processor configured to:
determine a three-dimensional surface characterization based on the captured structure light elements, the three-dimensional surface characterization comprising data points corresponding to depth and slope information for corresponding surface locations;
generate an observer perspective based on the depth and slope information and an observer position indication;
generate a surface characterization based on the depth and slope information;
determine compensated control points based on the depth and slope information, the observer perspective, and the surface characterization; and
generate an inverse image based on the compensated control points.

22. The apparatus of claim 21, wherein the projector is further configured to project the inverse image.

* * * * *